US006888434B2

(12) United States Patent
Nordberg

(10) Patent No.: US 6,888,434 B2
(45) Date of Patent: May 3, 2005

(54) NUCLEAR FUSION REACTOR INCORPORATING SPHERICAL ELECTROMAGNETIC FIELDS TO CONTAIN AND EXTRACT ENERGY

(76) Inventor: John T. Nordberg, 8700 Shiloh Ct., Eden Prairie, MN (US) 55347-1727

( * ) Notice: Subject to any disclaimer, the term of this patent is extended or adjusted under 35 U.S.C. 154(b) by 0 days.

(21) Appl. No.: 10/840,082

(22) Filed: May 6, 2004

(65) Prior Publication Data

US 2004/0251996 A1 Dec. 16, 2004

Related U.S. Application Data

(63) Continuation of application No. 09/939,316, filed on Aug. 24, 2001.
(60) Provisional application No. 60/228,212, filed on Aug. 25, 2000.

(51) Int. Cl.⁷ ................................................ H01F 5/00
(52) U.S. Cl. ...................................... 335/296; 335/299
(58) Field of Search ............................... 335/296–301; 376/121–143

(56) References Cited

U.S. PATENT DOCUMENTS

| 3,378,446 A | 4/1968 | Whittlesey |
|---|---|---|
| 3,764,466 A | 10/1973 | Dawson |
| 3,967,215 A | 6/1976 | Bellak |
| 4,202,725 A | 5/1980 | Jarnigan |
| 4,354,999 A | 10/1982 | Priest |
| 4,448,743 A | 5/1984 | Bass |
| 4,552,742 A | 11/1985 | Mayer |
| 4,618,470 A | 10/1986 | Salisbury |
| 4,639,348 A | 1/1987 | Jarnigan |
| 4,735,762 A | 4/1988 | Lasche |
| 4,826,646 A * | 5/1989 | Bussard ...................... 376/129 |
| 5,139,731 A | 8/1992 | Hendry |
| 5,152,955 A | 10/1992 | Russell |
| 5,182,075 A | 1/1993 | Gotoh et al. |
| 5,818,649 A | 10/1998 | Anderson |
| 5,818,891 A | 10/1998 | Rayburn et al. |

OTHER PUBLICATIONS

Book: *The Fusion Quest*, T. Kenneth Fowler, The Johns Hopkins University Press, 1997.
Website print–out: *Starship–Design: Dirtside Fusion Energy*, University of Oregon, pp. 1–2, Aug. 15, 2001.
*Stabilization of Kink Instabilities by Eddy Currents in a Segmented Wall and Comparison With Ideal MHD Theory*, A.M. Garofalo, E. Eisner, T.H. Ivers, R. Kombargi, M.E. Maeul, D. Maurer, G.A. Navratil, M.K. Vijaya Sankar, E. Taylor, Q. Xiao, Columbia University, New York.
*Fusion, Nuclear*, Encyclopedia of Energy, Daniel N. Lapedes, Editor, pp. 301–429, 1976.
*Linear Magnetohydrodynamic Stability in Reversed Field Pinch with Distant and Multiple Resistive Walls*, R. Paccagnella, Padova, Italy.

(Continued)

Primary Examiner—Ramon M. Barrera
(74) Attorney, Agent, or Firm—Patterson, Thuente, Skaar & Christensen, P.A.

(57) ABSTRACT

A nuclear fusion reactor system includes a reactor core containing nuclear fusionable material and a plurality of conducting spheres arranged adjacent each other with at least two of said conducting spheres adjacent the reactor core. The reactor core and the conducting spheres form a electro/magnetic circuit such that fusion of fusionable material in the reactor core establishes an electro/magnetic flow around the electro/magnetic circuit. Preferably, a spherical electromagnetic confinement field is initiated around the reactor core such that fusion of the nuclear fusionable material generates a plasma which interacts with the spherical electromagnetic confinement field in a magnethydrodynamic manner. Preferably, electrical energy is inductively extracted in response to the electro/magnetic flow through a coil arrangement located around at least one of the conducting spheres.

19 Claims, 83 Drawing Sheets

OTHER PUBLICATIONS

*MAGO: An Innovative Approach to Magnetic Target Fusion*, Physics Division Technology Review, Los Alamos National Laboratory, Los Alamos, New Mexico.

Website Print–out: *Spotlights on Portuguese S&T and Innovation*, Centre for Nuclear Fusion, pp. 1–4.

*Propogation of a Spheromak*, M. Vandas, S. Fischer, P. Pelant, M. Dryer, Z. Smith, T. Detman, Journal of Geophysical Research, vol. 102, No. A11, pp. 24,183–24,193, Nov. 1997.

* cited by examiner

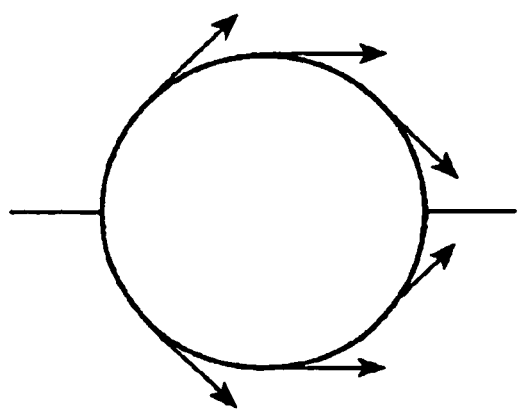 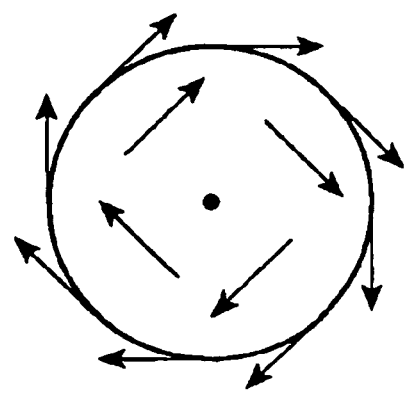
Side View of Core
Tangential Electrical Field
End View of Core
Tangential Magnetic Field
Figure 24(a)
Figure 24(b)

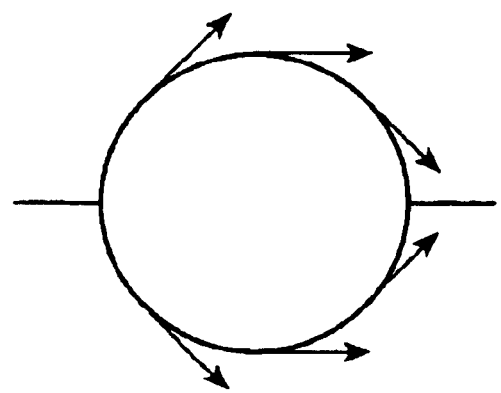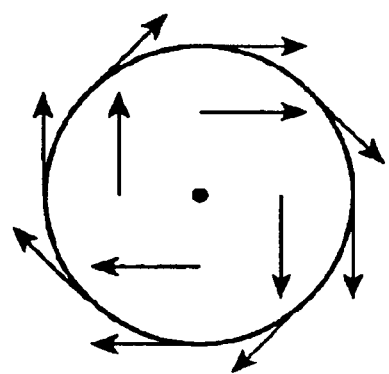
Side View of Core
Tangential Magnetic Field
End View of Core
Tangential Electrical Field
Figure 25(a)
Figure 25(b)

Interaction of
a normal coil's E & B fields with
a conducting sphere's E & B fields.

Interaction of
a Rowland Ring coil's E & B fields with
a conducting sphere's E & B fields.

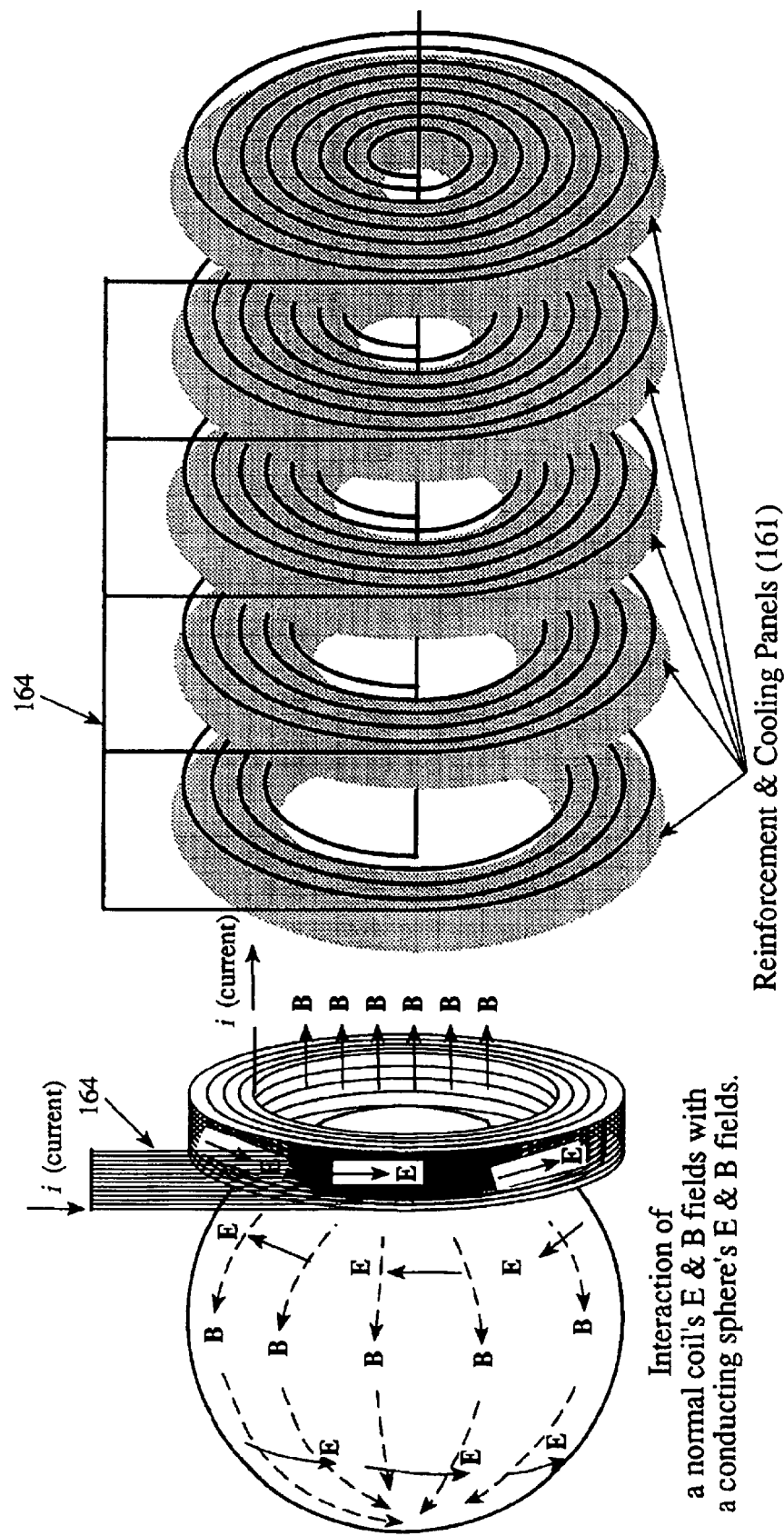

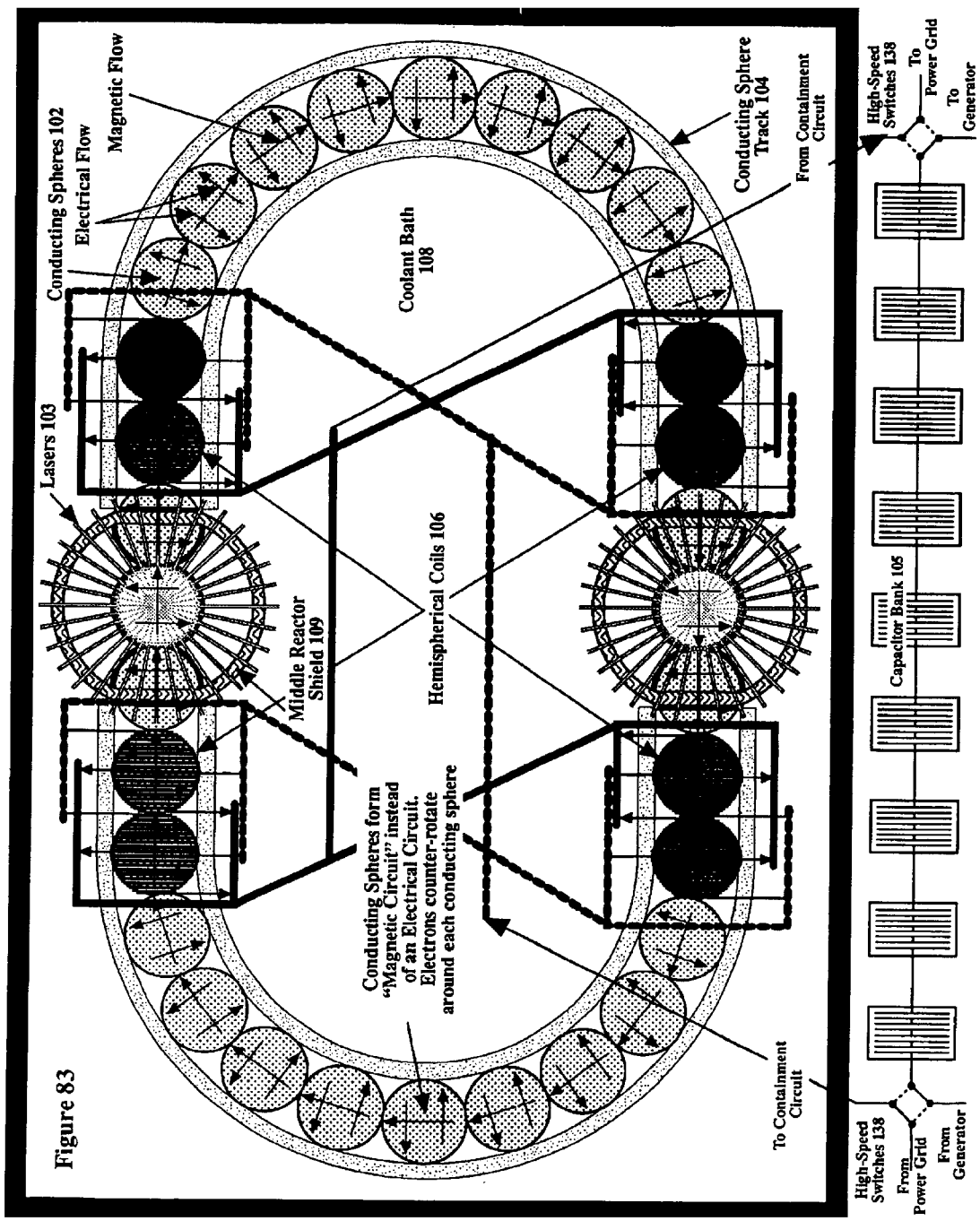

NUCLEAR FUSION REACTOR INCORPORATING SPHERICAL ELECTROMAGNETIC FIELDS TO CONTAIN AND EXTRACT ENERGY

RELATED APPLICATIONS

This application is continuation of U.S. patent application Ser. No. 09/939,316, entitled "NUCLEAR FUSION REACTOR INCORPORATING SPEHERICAL ELECTROMAGNETIC FIELDS TO CONTAIN AND EXTRACT ENERGY," filed Aug. 24, 2001, which claims priority to U.S. Provisional Application No. 60/228,212, filed Aug. 25, 2000, both of which are herein incorporated by reference in their entirety.

FIELD OF THE INVENTION

The present invention relates to the field of commercial electric energy production. More particularly, the present invention is directed to methods and an apparatus for the production of electrical power via nuclear fusion reactors utilizing spherical electromagnetic fields to compress, contain and extract energy released during the fusion burn. Benefits of the spherical electromagnetic field include precise control and containment of the fusion burn while limiting instabilities, increased fusion burn length, controlled release of energy and an ignition source for the field.

BACKGROUND OF THE INVENTION

Current estimates of fossil fuel supplies for the world's energy supply indicate that production will drop below consumption within 10 to 20 years. The availability of alternative energy sources that do not utilize fossil fuels such as hydroelectric, solar, wind, geothermal, tidal power can be expected to be increased. One currently available power source, that of nuclear fission reactors, could be relied upon, if needed. However, nuclear fission reactors have become very unpopular due to their risk and highly radioactive waste products.

One potential choice for future energy production, that has always been described favorably, is nuclear fusion. One benefit of fusion reactors is they do not rely on dangerous radioactive heavy elements, as do fission reactors. Other benefits include a nearly inexhaustible fuel supply coupled with a much smaller, approximately 1,000 times smaller, volume of waste products. While the fusion process does create some radioactive waste products, the volume is small, and the radioactivity is mild and short-lived compared to fission waste products. Fusion waste products are estimated to have half-lives of tens of years rather than the thousands of years for fission waste products. In summary, nuclear fusion reactors hold the promise of unlimited, essentially clean power. For a general background on nuclear fusion, reference is made to Lapedes, *Encyclopedia of Energy* (1976), and Wilhelmsson, *Fusion: A Voyage Through the Plasma Universe* (2000).

The problem is, other than in nuclear fusion bombs, scientists have been unable to get more energy out of a nuclear fusion reaction than has been used to start the reaction. In other words, nuclear fusion reactors, to date, have failed in the goal to produce energy because they consume more energy than they produce. Ultimately, the goal of nuclear fusion reactors is to create more power than is used to start the process.

The most important common problem in all past nuclear fusion reactor designs is the formation of instabilities in the plasma that have resulted in less than ideal burns. While many types of instabilities have been described in the past, a physical understanding of the cause of these instabilities has been elusive. The reactor designs of the current invention are in part based upon a new physical understanding of the cause of plasma instabilities, how they can be eliminated, and how they can be used when they do result.

The second most important problem in all past nuclear fusion reactor designs is the efficient creation of electrical power from the energy produced by the fusion reaction. Efficient conversion of extracted energy into electrical power is needed. Most designs have assumed the heat produced by the fusion process will be extracted to drive steam turbine and generator systems. Thermal transfer using the heat produced by the fusion process is not the most efficient manner of converting extracted energy into electrical power.

The third most important goal of nuclear fusion reactors is to create energy economically. This goal has not been achieved by prior designs because they failed to produce any net energy.

Many designs rely on pulses of fusion burns. In other words, the fusion process does not continuously burn for extended periods of time. To be economical, the fusion burns should last for extended periods of time.

Researchers have approached the problem of creating nuclear fusion reactors in a variety of ways. Perhaps the most fundamental element of the reactor design is the geometric shape of the reactor. The shape of the reactor is critical in all elements of the fusion process including ignition of the fusion reaction and confinement of the active plasma and its corresponding instabilities.

Inertial Confinement Fusion (ICF) is a method by which fusion has been initiated through an implosion reaction using lasers, neutral particle beams or ion particle beams. ICF reactor designs have succeeded in advancing fusion research by successfully reaching high temperatures and densities. While the shape of the confinement reactor in ICF designs has been generally spherical, the walls of a reactor chamber for current ICF designs are full of holes and apertures by which the lasers or particle beams are introduced and by which sensors and other instrumentations access the reactor chamber. The resulting chamber presents a very irregular and asymmetrical chamber for the containment of the fusion burn. Unlike other reactor designs, active electromagnetic containment fields are not utilized as part of the ICF design.

A number of reactor designs use toroidally-shaped (donut-shaped) confinement arrangements for the reactor, or variations on a toroidally-shaped reactor. These include:

Standard Tokamak Fusion: Tokamak fusion reactor designs contain the fusion fuel plasma in a toroidally-shaped electromagnetic containment field. These designs have been able to contain plasmas for extended periods of time, reach high temperatures and develop high densities.

Spherical Tokamak Fusion: The cross section of a normal Tokamak is circular. The cross-section of a "spherical" Tokamak is more elongated in the vertical direction.

Stellarators: In general, there is little difference between Tokamaks and Stellarators—they are both toroidal. The orbit of plasma in a Tokamak is planar—i.e., there is no vertical motion. The orbit of plasma in some Stellarator designs is non-planar—i.e., there is vertical motion.

Reversed-Field Pinch (RFP): Reversed-Field Pinch devices are similar to a Tokamak in that the plasma is confined by both toroidal and poloidal magnetic fields. The main difference is the relative strength of the magnetic fields.

Field Reversed Configuration (FRC): The Field Reversed Configuration is another toroidal system with magnetic field lines arranged differently.

Some of the earliest devices for creating high-temperature plasmas used cylindrical patterns. These designs included:

Theta Pinch: Theta Pinch designs take the form of a long tube or a skinny torus. The Theta Pinch uses an electrically induced magnetic field to compress and heat the plasma.

Mirror Machines: A Mirror Machine operates essentially like a Theta Pinch except a strong magnet is placed around each end of the tube in an attempt to deflect the plasma backwards towards the opposite end of the tube.

Z-pinch: The idea of the Z-Pinch, best embodied in Sandia National Laboratory's Z-Pinch device, is to suddenly apply a massive voltage across a cylindrical pattern of wires, causing the wires to vaporize. The cross-product of the Electric and Magnetic fields produced, described using the Poynting Vector, or classically as the Electromagnetic Momentum, of the induced fields, collapses the plasma in a cylindrical pattern.

MAGO: Russian researchers have developed a device called "MAGO." This device passes a large electrical pulse through an approximately cylindrical copper chamber. The geometry of this device is not spherical. In the MAGO system a deuterium and tritium gas is placed in the approximately cylindrical copper chamber. Next, a massive electromagnetic pulse heats the gas to a plasma state. This gas then flows past an inner nozzle, further heating areas of the plasma.

An intermediate approach between magnetic confinement devices and inertial confinement devices called Magnetized Target Fusion (MTF) has been used by the military to study fusion bombs. In a MTF device, a "magnetized target plasma" is placed within a containment vessel and is explosively imploded. In essence, these devices are bombs. In one planned device by Los Alamos National Laboratory, Los Alamos documents describe potential plans to create a quasi-spherical compression by cylindrically compressing a spherically shaped liner.

Unfortunately, none of the aforementioned devices have accomplished the ultimate goal of extracting commercial energy through the use of nuclear fusion. There remains no viable design for a commercial fusion reactor. Accordingly, it would be desirable to provide a design for a nuclear fusion reactor system that could achieve this goal and overcome the problems encountered with existing designs.

SUMMARY OF THE INVENTION

The present invention discloses a new method and apparatus for the commercial production of electricity through the use of a nuclear fusion reactor. All embodiments of these reactor designs will share common features. First, fusible matter is compressed and heated in a roughly spherical geometry until the nuclear fusion process begins. Second, the fusion burn is surrounded and wholly or partly contained by a spherical electromagnetic confinement field. Third, the electric and magnetic fields of the outwardly moving particles will interact with the surrounding spherical electromagnetic confinement field in a magnetohydrodynamic (MHD) fashion. Fourth, the MHD interaction will setup a voltage, or a magnetic field differential, across the surrounding spherical electromagnetic confinement field in the core area that can be tapped directly or indirectly for commercial electric power. Finally, in all designs the length of the fusion burn will be lengthened by the external spherical electromagnetic confinement field.

The key to creating and maintaining the spherical electromagnetic confinement field is the use of spherical reactor cores and conductors. A key in creating harmonic fields is the careful design of electromagnetic induction coils that can be used to transfer energy to and from the containment circuit. In particular, the use of hemispheric coils promises to provide very clean harmonics at a relatively low cost. While there are many material and design variations possible in these designs, they all are intended to create powerful spherical electromagnetic fields around the fusion bum. In the past there has been no design for fusion reactors that places spherical electromagnetic fields around the fusion bum in order to impart energy to the fuel, to contain and ignite the fuel, and to extract energy from the fusion bum using MHD. These designs are the first to offer inexpensive, practically unlimited, almost totally clean energy.

The exact features and materials of designs that can create a spherical electromagnetic field that will compress, ignite, and extract energy from the fusion fuel can vary considerably. However, each of the design variations requires a description of: the electromagnetic containment circuit, the core area, the method of positioning the fuel, the method of compressing and igniting the fuel, and the method of containing and extracting energy from the bum using MHD and other techniques. Some hybrid variations of these reactor designs combine features from earlier magnetic confinement reactor designs and inertial confinement reactor designs with the new and unique features of these spherical electromagnetic confinement designs.

In all cases, the main goal of each reactor design is to create commercially usable electrical energy.

In some designs, amorphous carbon will be subjected to high pressures, high temperatures, and strong electromagnetic fields. Therefore, a secondary product of these reactor designs may be the manufacture of diamonds though conversion of amorphous carbon.

As mentioned previously, a variety of designs have been developed as potential methods of extracting energy from a fusion reaction. There are key differences between all of these methods and the designs of the present invention.

In ICF designs, the reaction is imploded, the fusion burn starts, instabilities form and the process explodes. However, ICF designs have failed to produce more energy than is consumed. ICF reactor designs based on lasers are not considered viable long-term options for commercial power plants because of their poor efficiency in converting electrical energy into the intense beams needed for inertial confinement. There are several key distinguishing features between prior art ICF designs and the new designs of the present invention. First, prior inertial methods have not attempted to stop the resulting explosion via active confinement. Second, prior inertial methods have not attempted to create a harmonic burn or influence the quality of the fusion burn via electromagnetic fields. Third, inertial methods have not attempted to use MHD to absorb the exploding energy. Fourth, previous ICF designs have often utilized a surrounding spherical chamber or shield. However, the spherical chamber has only been used as a shield from the explosive process and has played no role in keeping the fusion process burning or harmonic. Indeed the chambers are usually pierced with many sensors, holes, ports and other devices. Such sensors, holes, and protrusions through the reactor wall are completely eliminated or minimized in the new reactor designs of the present invention. While such sensors provide useful scientific information on the fusion burn, it is believed that such sensors create a non-harmonic situation that reduces the quality of the burn. The key differences of the present invention as compared to prior inertial methods are that prior ICF spherical containment chambers have not used intentionally created, spherical electromagnetic fields set up over the surface of the containment shield to electromagnetically contain the fusion burn, influence the fusion burn, or extract electrical power via the MHD process.

The spherical designs of the present invention differ from those of the toroidal reactor designs for a number of reasons. First, the geometry of the torus is less than ideal for containment in comparison to the geometry of a sphere. To properly utilize a plasma in a MHD process, the plasma velocity must be at right angles to the MHD's magnetic field. It is believed, from the theory on which these reactors are designed, that plasma instabilities expanding in a spherical electromagnetic confinement field expand at a right angle to the external electromagnetic field, or are deflected back towards the center of the plasma. In a torus, the plasma may interact with the containing magnetic field at other than a 90° angle. This allows instabilities within a torus to grow and penetrate the containment field. Second, the geometry of a torus also prevents the coil windings around the torus from being perfectly symmetrical. There is more area on the outside of the torus than on the inside. This geometry prevents the containment field from being symmetrical. Instabilities are more likely to penetrate the outer side of the torus than the inner side. In a spherical chamber, there is no preferential side to the chamber. Finally, the plasma orbit within a torus-shaped cavity can induce electromagnetic fields that are extremely unpredictable. These forces are induced at the moment of fusion burn. These instabilities grow too quickly for human operator or computer controlled response and allow the plasma to penetrate the confining fields. The reactor designs of the present invention have electromagnetic fields in place prior to the fusion burn to respond to instabilities as they occur. Because the center of mass of the plasma in the spherical designs of the present invention does not move or orbit, it does not have any orbital induced instability that might make it more difficult to contain the plasma. Instabilities exploding outward from the center of mass of the plasma in a spherical confinement field encounter electromagnetic fields at right angles allowing either the direct conversion of instability energy to electricity via the MHD process or the deflection of the instability back toward the center of mass of the fusion burn. This contrasts problems that are present in all toroidal designs including Tokamaks, Spherical Tokamaks, Stellarators, RFP devices and FRC devices. They all suffer in stability and containment when compared to the spherical electromagnetic confinement field of the present invention.

There are also major design differences between the spherical geometry of the current invention and designs using a cylindrical reactor. In a cylindrical reactor, the plasma is not confined equally in all directions as it is in the spherical reactor of the present invention. The plasma can escape down the ends of the cylindrical tube with the resulting motion of the plasma inducing various types of instabilities. This is the precise mode of failure for Mirror Machines as they have been unable to contain all of the various instabilities that form as the plasma moves and changes direction within the device.

The reactor designs of one embodiment of the present invention share the same plasma collapse technique as that of a Z-Pinch device. However, the cylindrical pattern in a Z-Pinch is not spherical. Because it is not spherical, additional instabilities form. The resulting instabilities disrupt the pattern of the fusion burn. Another key difference between Z-Pinch designs and the present invention is that Z-Pinch devices have made no attempt to actively contain the fusion burn after implosion. Z-Pinch devices have no external spherical electromagnetic confinement fields and there is no attempt to extract energy from Z-Pinch devices using these fields and the MHD process.

There are key differences between the external cylindrical containment geometry of the MAGO device and the spherical reactor designs of the present invention. First the external containment geometry is approximately cylindrical rather than spherical. Second, the nozzle inside of the MAGO cylinder essentially compresses the plasma outwards. Secondary forces from the outer wall do compress the plasma back inwards. However, in the new spherical designs in this application, the portion of the plasma that is to be fused is always compressed and focused towards the center of the fusion burn. With respect to the MAGO device, the fusion burn would need to occur within the solid nozzle portion of the device if it were to have the fusion burn occur in the center of the device. Third, the MAGO device makes no attempt to actively contain and prolong the fusion burn. Fourth, the MAGO device makes no attempt to extract the energy from the fusion burn via MHD. Fifth, the geometry of the MAGO device is not harmonic, energy basically bounces around this non-symmetrical cavity. Variations in subsequent fusion burns, combined with the erratic bouncing of energy inside the device, will cause the physical locations of fusion burns to be inconsistent, unpredictable, and essentially non-harmonic. These differences distinctly differentiates the MAGO devices from the designs of the present invention.

There are major design differences between the spherical reactor designs of the present invention and MTF devices. MTF devices do not attempt to create a prolonged burn. Instead they are explosively imploded. MTF geometry is cylindrical or "quasi-spherical" rather than the true spherical designs of the present invention. Furthermore, MTF designs do not utilize an MHD process to either contain or extract energy from the fusion burn. Finally, the destruction of the MTF containment chamber is a distinguishing feature in comparison to the new designs of the present invention. In developing a commercially viable fusion reactor design, the spherical reactor designs of the present invention seek to avoid the destruction of the confinement device with each pulse.

Whatever the precise merits, features, and advantages of the above-cited references and the hundreds, if not thousands, of attempted variations on these references; no fusion design has achieved or fulfilled the purpose of providing more nuclear energy output than was put into the device with the exception of the hydrogen bomb. None of the variations have worked with respect to the intended goal of producing usable, commercially available energy. None of these devices have attempted to actively contain the fusion plasma in a spherical geometry. None of the devices attempts to surround the fusion burn in a spherical electromagnetic field. None of the devices attempts to use spherical MHD electrical energy conversion. None of the devices attempts to create an extended, harmonic, spherical burn.

There are numerous major embodiments of these reactor designs and hundreds of significant variations to the present invention. The version described as the preferred embodiment is chosen above the other designs based solely upon its likelihood of early success. It will be easier to build because it uses a hybrid of technologies and materials currently available to the scientific and engineering communities.

BRIEF DESCRIPTION OF THE DRAWINGS

FIG. 24($a$) is a side view of the core tangential electrical field.

FIG. 24($b$) is an end view of the core tangential magnetic field.

FIG. 25($a$) is a side view of the core tangential magnetic field.

FIG. 25($b$) is an end view of the core tangential electric field.

FIG. 29($b$) is a cross-section view of a fueled reactor core.

FIG. 34($b$) is a cut-away view of a reactor core inside a plasma container shield following the application of a massive voltage.

FIG. 34($c$) is a cut-away view of a reactor core inside a plasma container shield between electromagnetic pulses.

FIG. 37($b$) is a cut-away view of a reactor core following the implosion of fuel imploded via traditional inertial confinement methods and electromagnetic fields induced across the sphere.

FIG. 38($b$) is an isolated cut-away view of a reactor core as massive voltage is applied across the wire.

FIG. 38($c$) is an isolated cut-away view of a reactor core with induced magnetic fields.

FIG. 38($d$) is an isolated cut-away view of a reactor core at fusion reaction ignition.

FIG. 39($b$) is a cut-away view of a reactor core with expanding plasma.

FIG. 39($c$) is a cut-away view of a reactor core with plasma returning to the reactor core.

FIG. 39($d$) is a cut-away view of the reactor core at time of ignition of the next fusion reaction.

FIG. 54(a) is a cut-away cross-sectional view of the interaction of a helical coil and the electromagnetic field of a conducting sphere.

FIG. 54(b) is a cut-away cross-sectional view of the interaction of parallel helical coils and the electromagnetic field of a sphere.

FIG. 83 is a top-view of an oval track with two cores.

DETAILED DESCRIPTION OF THE PREFERRED EMBODIMENTS

Overall Layout

Figure 1:
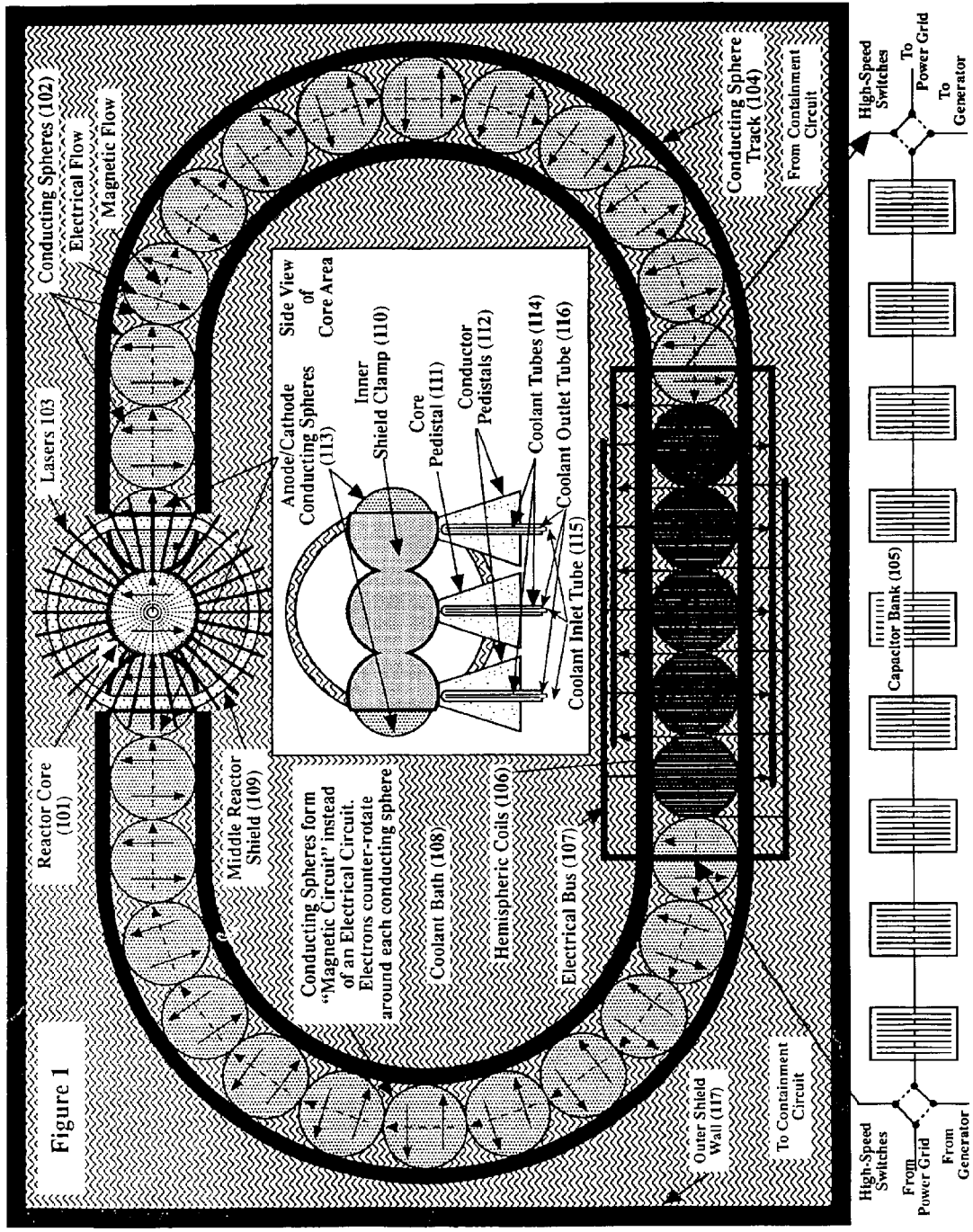
FIG. 1 is a top view of an embodiment of the reactor design.

Refer now to FIG. 1, which is an overall drawing of the preferred embodiment of the present invention. It has one reactor core 101 and thirty-one conducting spheres 102 laid out in an oval pattern.

The Core

Reactor core 101 is a hollow sphere with many layers of conducting and non-conducting materials. The center of reactor core 101 is the intended location of the fusion reaction. The reaction may initially occur slightly offset from this center point but this does not affect the overall design. A main goal of the overall reactor design is to have fusion reactions occur at the center of the reactor core 101, and not to have fusion reactions occur at the centers of the conducting spheres 102. Therefore, conditions at the centers of the conducting spheres 102 are designed to inhibit nuclear fusion reactions.

Conducting Spheres

Figure 2:
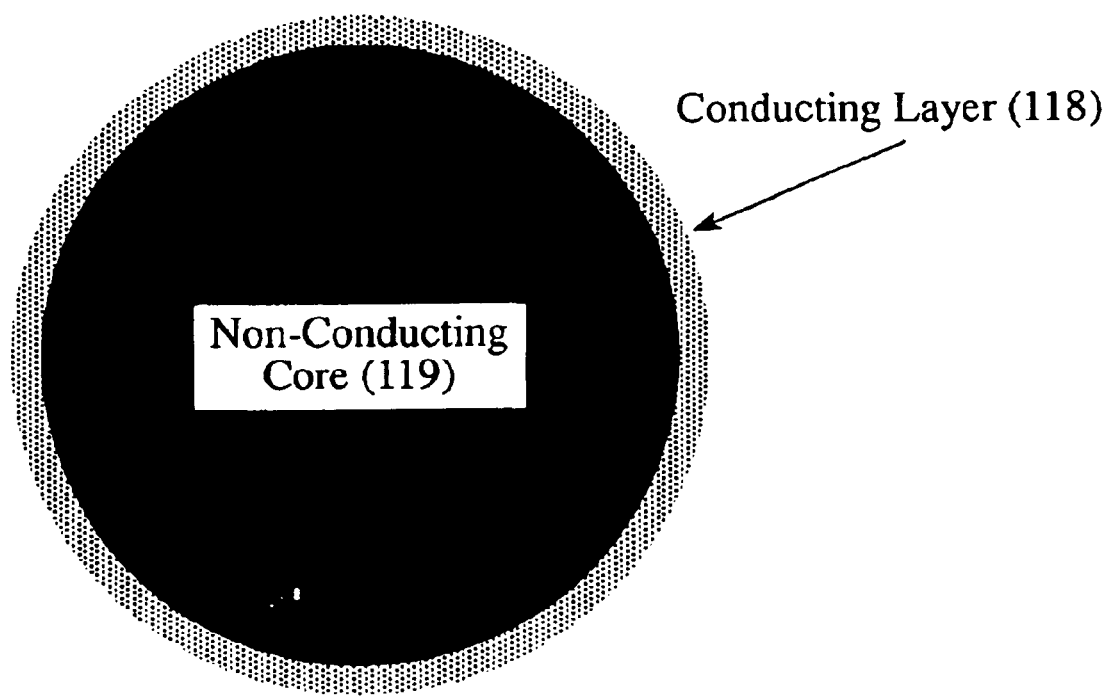
FIG. 2 is a cut-away view of a conducting sphere.

The conducting spheres 102 in the preferred embodiment are completely solid as shown in FIG. 2. In other embodiments, the conducting spheres 102 can be hollow or contain plasma. The conducting layer 118 of a conducting sphere is made of a layer of conducting material. The non-conducting core 119 of a conducting sphere 102 is made of a non-conducting material, or it can be a vacuum. Some variations of the conducting spheres 102 could be filled with gases that are not likely to form fusible plasmas—including, but not limited to Xenon. Such variations are not recommended because of the possibility of electrical arcing inside of the conducting spheres 102. It is extremely important that the possibility of electrical arcing be minimized in these designs. Electrical arcing inside conducting spheres 102 has the potential to destroy all key components in these reactor designs.

Figure 3:
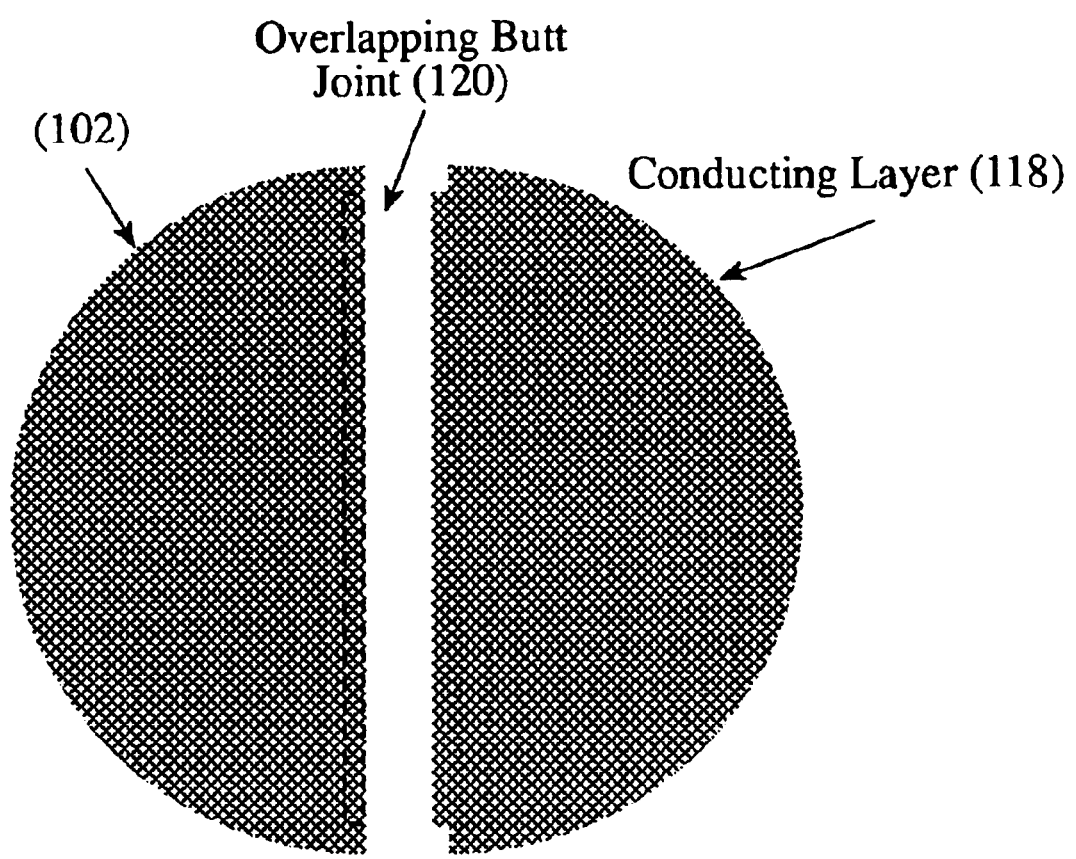
FIG. 3 is an exploded view of a conducting sphere.

The dimensions for the preferred embodiment of conducting sphere 102 are an outer diameter of 5 meters with an outer layer thickness of 15.25 cm. The material chosen for the conducting layer 118 for this preferred embodiment is a Copper-Niobium alloy, Cu—Nb. The material for the non-conducting core 119 is amorphous Carbon. The conducting layer 118 of the conducting spheres 102 and the reactor cores 101 should be polished to a very smooth finish to help improve the electromagnetic harmonics on these surfaces. The inner surface of conducting layer 118 of the conducting spheres 102 and the reactor cores 101 should be as smooth as possible. In some designs, the smoothness of the inner layer may be limited by manufacturing techniques. The weight and size of all conducting spheres 102 should be uniform. The conducting spheres 102 will likely be formed in two hemispheres with a heat-shrunk overlapping butt joint 120 as shown in FIG. 3.

The amorphous carbon fill will be placed into the conducting sphere 102 through an orifice 121 that will be plugged and smoothed to match the surrounding Cu—Nb material.

If the surfaces of the conducting layer 118 of the conducting spheres 102 or reactor cores 101 are not smooth and or if the material is not consistent, then the conductivity and electromagnetic harmonics may be disrupted to some extent. It is believed, from theory, that every effort should be made to reduce any influence that may cause a non-harmonic electromagnetic wave pattern in the conducting spheres 102 or reactor cores 101. For example, the material used to plug the orifice 121 should be identical to the conducting layer 118 and the orifice 121 should be cleaned of any fill material after filling and before plugging.

Figure 4:
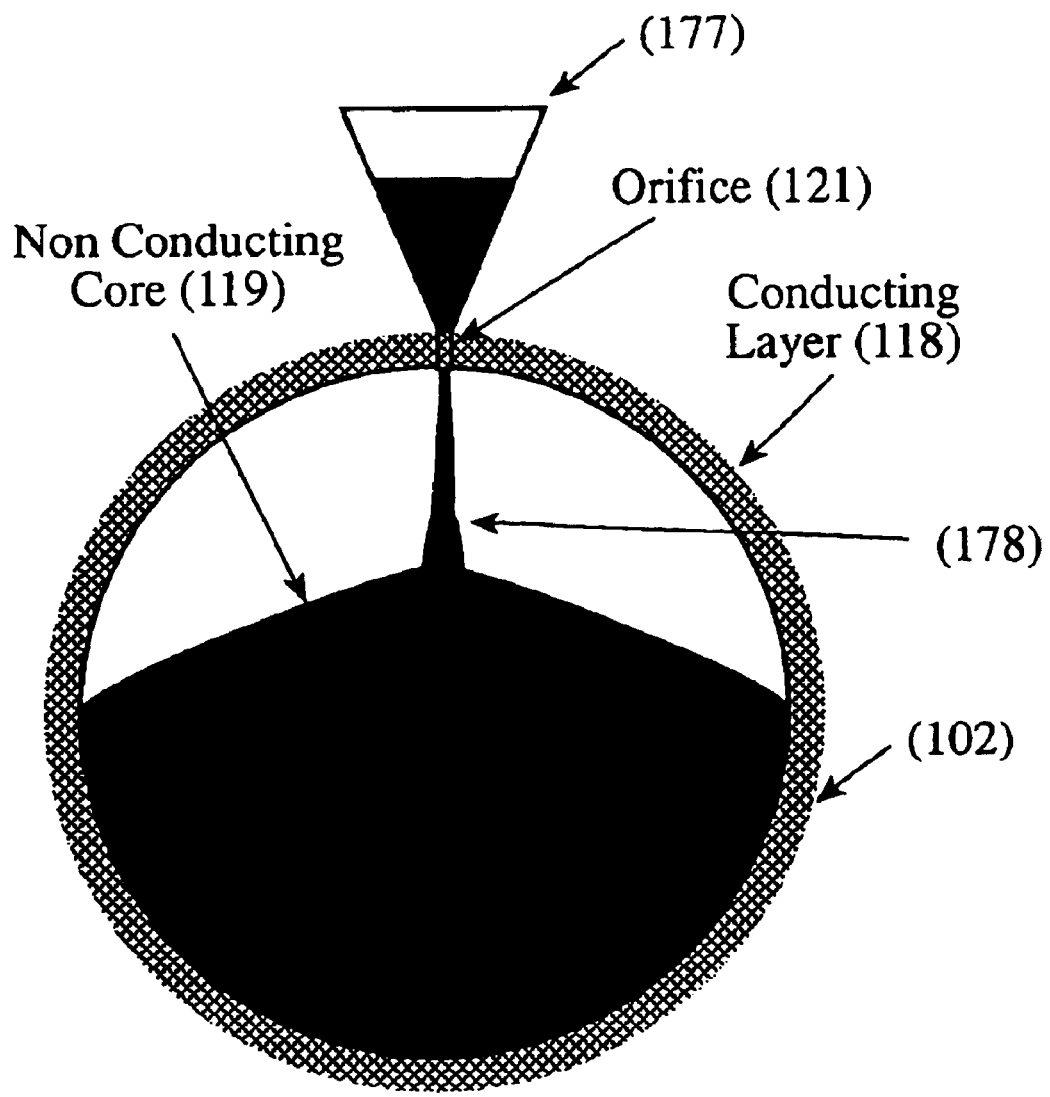
FIG. 4 is a cut-away view of the fill process for a conducting sphere.

One possible method for filling the conducting spheres 102, using funnel 177 to pour non-conducing fill 178 through orifice 121 can be seen in FIG. 4. An example of such non-conducting fill 178 would be amorphous carbon. Since non-conducting fill 178 may settle after filling, steps—such as, but not limited to, vibration in the presence of a vacuum during the filling process—should be taken to insure that the entire cavity is filled compactly. The weight of non-conducting fill 178 should be uniform in all conducting spheres 102.

Figure 5:
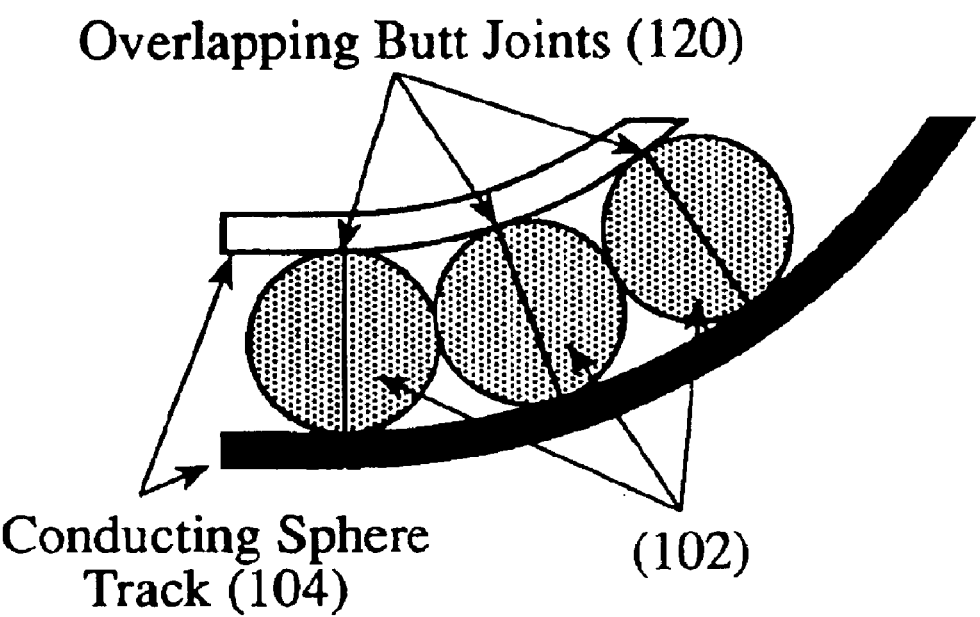
FIG. 5 is an isolated top view of the conducting sphere track.

The heat shrunk overlapping butt joints 120 of the conducting spheres 102 should be aligned perpendicular to the central axis of the conducting sphere track 104, as shown in FIG. 5. This may help the harmonics of the magnetic circuit.

It is expected that the heat shrunk overlapping butt joints 120 will be fused solid after repeated use. The strong electromagnetic fields involved will weld the heat shrunk overlapping ball joints 120 together. It may be beneficial, for quality control reasons, to subject the conducting spheres 102 to a preliminary current in order to pre-weld the heat shrunk overlapping butt joints 120 so as to allowing testing of the quality of weld.

When the conducting spheres 102 are refurbished, facilities and equipment will be needed to:
- move the conducting spheres 102 whether intact or damaged,
- cut open the conducting spheres 102,
- remove the non-conducting fill 178,
- carefully crush the non-conducting carbon fill 178 and, remove any diamond crystals,
- melt and recycle the conducting material, and
- recycle non-conducting fill 178.

The preferred embodiment has conducting spheres 102 of equal diameter. However, other embodiments may have conducting spheres 102 with unequal diameters. For example, the straight line embodiment shown in FIG. 59 could have anode/cathode conducting spheres 113 that are larger than reactor core 101. Similarly, conducting spheres 102 could be larger than anode/cathode conducting spheres 113. Preferably, the size of the conducting spheres 102 and anode/cathode conducting spheres 113 would be larger multiples of the reactor core 101 wavelength. The embodiment could have several advantages. One being the strengthening of the spherical electromagnetic confinement field 140.

Reactor Core

Figure 6:
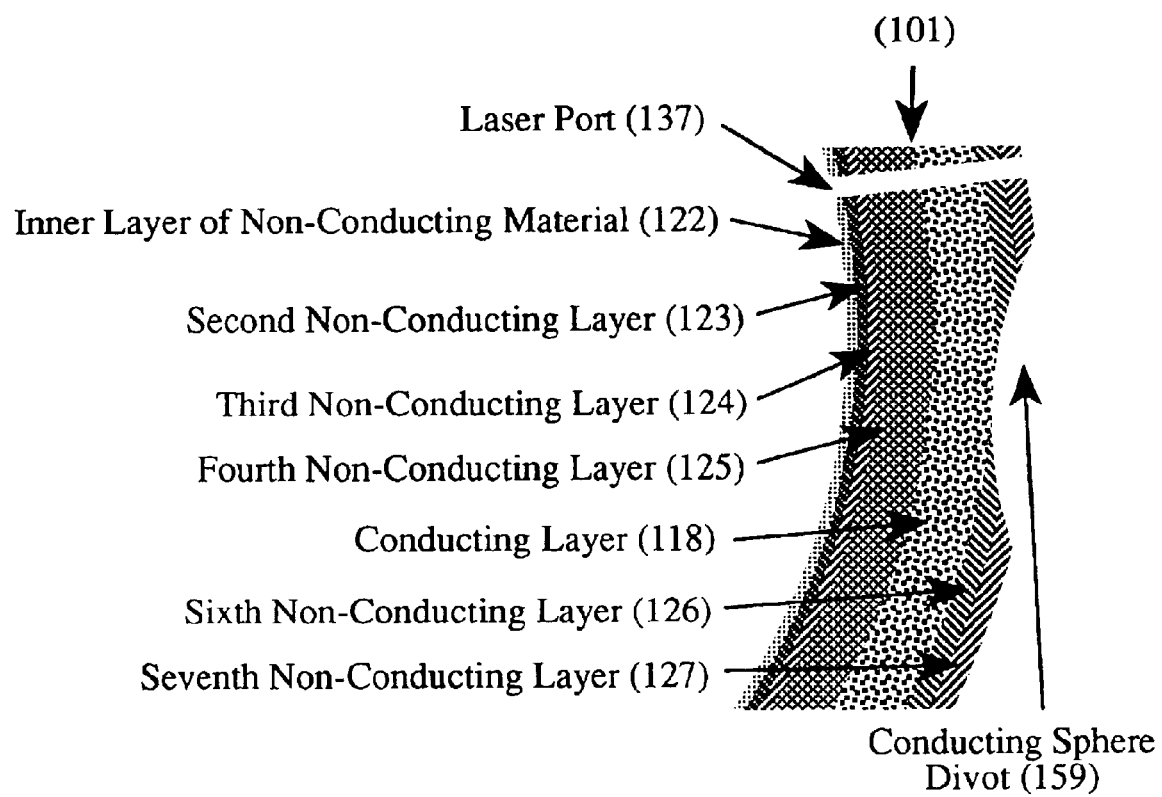
FIG. 6 is a cross-section view of the reactor core.

The cross-section of the reactor core 101 is shown in FIG. 6. To summarize, an initial reactor core 101 design could be designed as such:

1) An inner layer of non-conducting material 122 made up of an Ultra High Temperature Ceramic such as: hafnium diboride silicon carbide; or, zirconium diboride composite; or, other compounds resistant to high temperatures. The exact thickness of this layer is unknown at this time due to the classified nature of these ceramics. The estimated required thickness is 1 inch. These materials are estimated to be able to withstand temperatures up to 5,000° F. Preferably, this inner layer of material will have a composition that includes some Boron. Neutral elementary particles such as neutrons may have enough energy to penetrate the spherical electromagnetic confinement field 140. Boron is known to be able to stop neutrons. The purpose of the inner layer will be to shield the outer layers from massive thermal shock and neutrons. This layer is not essential to the design of the core and may inhibit to the strength of the electromagnetic fields in the conductive layer, and may be omitted. It is primarily intended to lengthen the useful life of the core.

2) A second non-conducting layer 123 that is composed of material that can withstand high temperatures, thermal shock, compressive forces from without, explosive forces from within and can stop neutrons. An example of such second non-conducting layer 123 is a 1 inch wall composed of a reinforced carbon-carbon matrix (RCC) impregnated with Boron. The second non-conducting layer 123 is likely manufactured as two interlocking hemispheres. The second non-conducting layer 123 could also be manufactured as one piece around the inner layer of non-conducting material 122. Preferably, the material would have a low activation, which means the material would not be negatively affected by neutrons coming from the nuclear reaction resulting in the creation of radioactive material. The second non-conducting layer 123 is not essential to the design of the reactor core 101 and may inhibit the strength of the electromagnetic fields in the conductive layer. It is primarily intended to lengthen the useful life of the reactor core 101.

3) A third non-conducting layer 124 that is composed of material that can withstand high temperatures, thermal shock, compressive forces from without and explosive forces from within. An example of such third non-conducting layer is one composed of 1 inch of RCC. Third non-conducting layer 124 is likely manufactured as one piece around the inner layer of non-conducting material 122 and second non-conducting layer 123. In another embodiment, the second non-conducting layer 123 and the third non-conducting layer 124 may be combined into one layer. The third non-conducting layer 124 is not essential to the design of the reactor core 101 and may inhibit the strength of the electromagnetic fields in the conductive layer. The third non-conducting layer 124 is primarily intended to lengthen the useful life of the reactor core 101.

4) A fourth non-conducting layer 125 that is composed of a material that can withstand massive thermal shocks and lessen the thermal shock to the next layer towards the outside of the core. The fourth non-conducting layer 125 could be composed of 5 inches of Silica made rigid by ceramic bonding. This is the same material used in Space Shuttle heat shields. The fourth non-conducting layer 125 is likely manufactured as two interlocking hemispheres. The fourth non-conducting layer 125 may also be manufactured as multiple interlocking tiles attached to the outside of third non-conducting layer 124. The fourth non-conducting layer 125 is not essential to the design of the reactor core 101 and may inhibit the strength of the electromagnetic fields in the conductive layer. The fourth non-conducting layer 125 is primarily intended to lengthen the useful life of the reactor core 101.

5) A conducting layer 118 that is highly conductive, low resistance, economical, capable of being formed into spherical shells of the size needed and that can withstand the internal electromagnetic forces—e.g., Coulombic and Hall—created by massive electromagnetic fields used in these designs. Such an conducting layer 118 could be composed of Cu—Nb—Copper-Niobium—that is approximately 6 inches thick. The conducting layer 118 will likely be manufactured as two interlocking hemispheres that are heat-shrunk to each other with a lap-joint situated at the eventual equator of the electromagnetic field. An improvement to this design would be to replace this material with a superconductive material. In some variations, the conducting layer 118 may be a plasma instead of a solid. In some embodiments, this conducting layer 118 is critical. In the "No Core" embodiment of the current invention, the conducting layer 118 is omitted.

6) A sixth non-conducting layer 126 composed of material that can withstand high temperatures, thermal shock and explosive forces from within. The sixth non-conducting layer 126 might be composed of 2 inches of RCC. The sixth non-conducting layer 126 will likely be manufactured as two interlocking hemispheres. The sixth non-conducting layer 126 has a conducting sphere divot 159. This allows the anode/cathode conducting sphere 113 to sit next to the conducting layer 118 of the reactor core 101. Without the conducting sphere divot 159, the harmonics of the electromagnetic fields would not flow smoothly from sphere to sphere.

7) A seventh non-conducting layer 127 is composed of material that can withstand high temperatures, thermal shock and explosive forces from within. The seventh non-conducting layer 127 might be composed of 2 inches of RCC. The main purpose of the seventh non-conducting layer 127 would be to add additional structural strength to the sixth non-conduction layer 126 but with strands of Carbon and with the joint at 90°. The seventh non-conducting layer 127 is likely manufactured as two interlocking hemispheres. The seventh non-conducting layer 127 has a conducting sphere divot 159. This allows the anode/cathode conducting sphere 113 to sit next to the conducting layer 118 of the reactor core 101. Without the conducting sphere divot 159, the harmonics of the electromagnetic fields would not flow smoothly from sphere to sphere.

8) Laser ports 137 preferably are drilled through the reactor core 101 in order to allow the laser or ion beams to impart their energy to the fuel pellet 136. The laser ports 137 may be simple holes, or may be capped with a transparent material, such as one of the various materials tested for inertial confinement reactor designs.

In this version of the core wall, the total wall thickness is approximately 18 inches of which ⅓—i.e., 6 inches—is conductive.

Placement of Conducting Spheres and Trough Description

Figure 7:
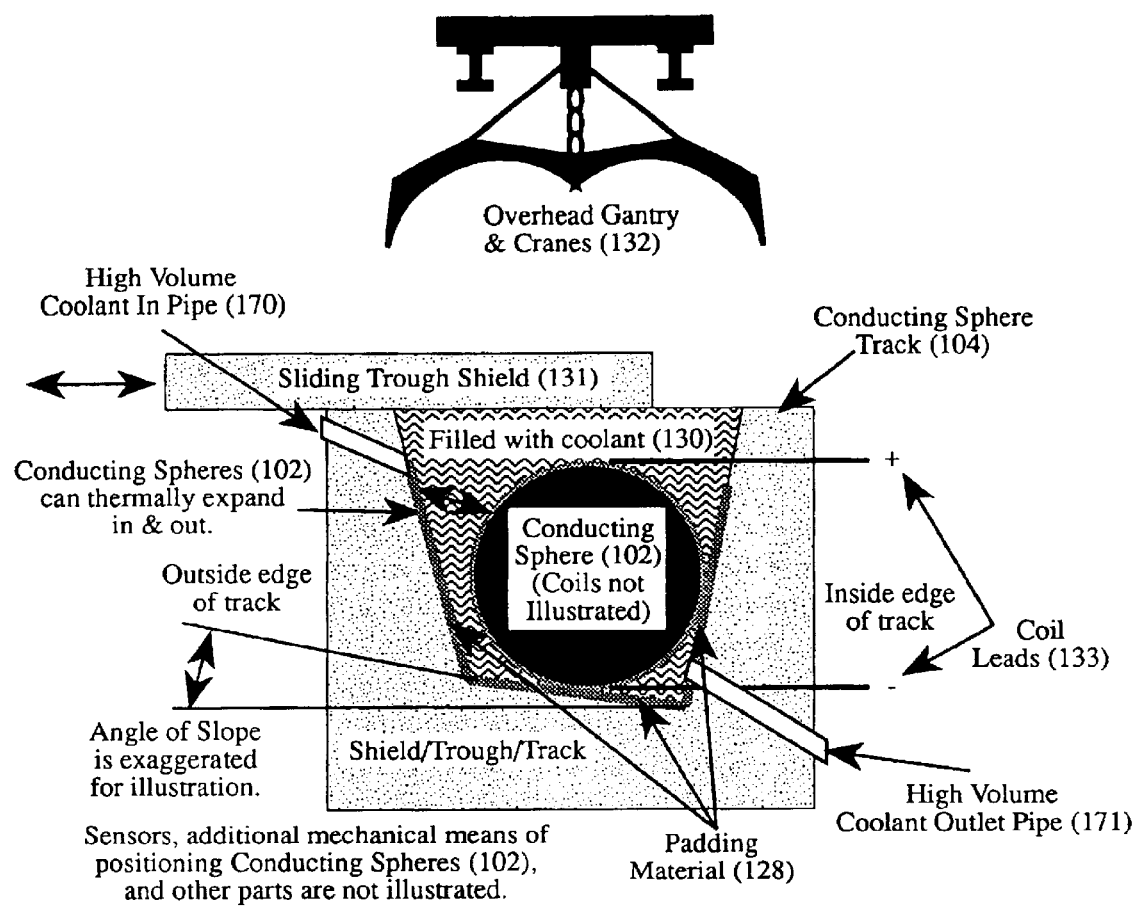
FIG. 7 is an elevational cross-section view of the conducting sphere track.

The bulk of the conducting spheres—29 out of 31—sit in the conducting sphere track 104. The conducting sphere track 104 could be made of a non-conducting material such as cement. A cross-section of the conducting sphere track 104 is shown in FIG. 7.

If cement is used, then it should not be reinforced with a metal such as traditional rebar. Instead it should be reinforced with non-conducting material such as plastic or glass fibers. Conductive reinforcement materials such as traditional metal rebar in the cement would be too close physically to the intense electromagnetic fields in the conducting spheres 102. The close proximity of the intense electromagnetic fields in the conducting spheres 102 to the rebar could cause many problems, including but not limited to: induction of electromagnetic fields in the rebar; heating of the rebar; cracking of the cement, and disruption of harmonics in the conducting spheres 102 and reactor cores 101.

The inner walls of the conducting sphere track 104 may be lined with padding material 128 such as, but not limited to, vulcanized rubber. The padding material 128 should be able to withstand high temperatures and exposure to the chosen coolant 130. The purpose of padding material 128 is to help protect the surface texture and geometrical shape of the conducting spheres 102. If the conducting spheres 102 are nicked or dented when placed into the trough, or if the weight of the conducting spheres 102 gradually flattens them, then the electromagnetic harmonics of the conducting spheres 102 would be reduced or lost.

The padding material 128 should be sloped towards the center of the trough. (The slope is exaggerated in FIG. 7 for illustration purposes. In reality, the slope would be very minor.) In essence, the conducting spheres 102 are gently pulled in towards the center of the trough by the force of gravity. This slope will allow the conducting spheres 102 to thermally expand outward and inward allowing the conducting spheres 102 to remain aligned and positioned next to each other on the conducting sphere track 104.

The conducting sphere track 104 should have numerous, high-volume coolant inlet pipes 170 and high-volume coolant outlet pipes 171. This would allow the conducting sphere track 104 to be quickly filled with a coolant 130, and quickly drained. The coolant 130 could be water or other conductive coolants if coil wires 165 and the conducting layer 118 of the conducting spheres 102 are coated with a non-conducting insulation, but preferably would be a non-conductive, high thermal transfer substance such as liquid Flourinert®. Cooling of the conducting spheres 102 and reactor cores 101 will help maintain the conductivity of the circuit and help maintain the harmonics of the spherical electromagnetic confinement field 140. For example, if the temperature of a conducting sphere 102 dramatically increased, then the conductivity of the conducting sphere 102 will change and, due to thermal expansion, the wavelength of the main harmonic would change.

The top of the conducting sphere track 104 should have sliding trough shields 131 that can be quickly moved on or off the trough portion of the conducting sphere track 104. While over the trough, the sliding trough shields 131 will help provide shielding from magnetic fields and in case a conducting sphere 102 ruptures. When the sliding trough shields 131 are retracted, it will allow the conducting spheres 102 and other components such as the hemispherical coils 106 to be checked, adjusted, or quickly replaced.

There should be a means to quickly replace the massive conducting spheres 102 and hemispherical coils 106. This can be accomplished via overhead gantry and cranes 132.

There should be coil leads 133 that attach the hemispherical coils 106 to the main electrical bus 107, the capacitor banks 105 and the power grid. These coil leads 133 can penetrate through any side of the conducting sphere track 104, or through the sliding trough shields 131. The coil leads 133 should be highly conductive, evenly spaced around the conducting sphere track 104, and as short and straight as possible. The coil leads 133 will be cooled by the coolant 130 within the trough of the conducting sphere track 104 and by the coolant bath 108 outside of the conducting sphere track 104. (An additional cooling jacket may be required— especially if the coil leads 133 are superconductive—within the concrete portion of the conducting sphere track 104 but is not utilized in this design.) In addition to the above details, the conducting sphere track 104 will have numerous sensors to monitor physical conditions such as: temperature, strain, electric fields, magnetic fields, diameters of conducting spheres 102, etc., and may have pistons or mechanisms to adjust the position of the conducting spheres 102.

Placement of the Anode/Cathode Conducting Spheres

Figure 8:
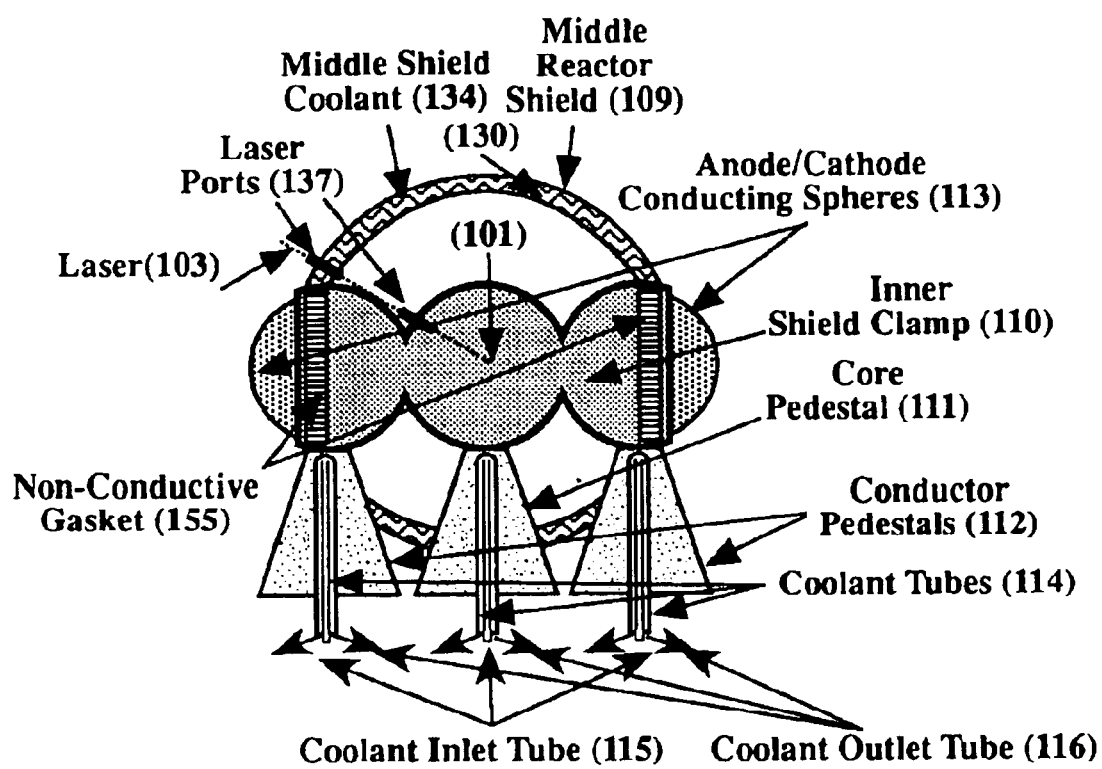
FIG. 8 is an elevational cross-section view of the central reactor core area.

FIG. 8 shows some of the major details in the central reactor core area. The term "anode" and "cathode" with respect to this electric circuit is purely arbitrary. Either conducting sphere 102 that is adjacent to the reactor core 101 could act as an anode or cathode in an electric circuit, or neither, in a magnetic circuit. The term "anode/cathode" as used in reference to the conducting spheres 113 simply refers to the two conducting spheres 102 that are closest to the reactor core 101. The anode/cathode conducting spheres 113 and reactor core 101 must be aligned next to each other. In this embodiment, the three spheres are held in position by an inner shield clamp 110. This inner shield clamp 110 is designed with two halves that act in a clamshell fashion. When the middle reactor shield 109 opens, so does the inner shield clamp 110.

The middle reactor shield 109 is made with double walls. The walls are made of a strong material that would resist heat and puncture due to the explosion of a reactor core 101 or anode/cathode conducting sphere 113. There are some stainless steels—such as 316 stainless steel—that are not very reactive to neutrons. Low reactivity for metals is important. After a period of use, the shield material will become radioactive and will need to be replaced. This will be one of the biggest sources of radioactive waste products from such power plants. The preferred embodiment will use 316 stainless steel. Other materials, including, but not limited to reinforced Carbon/Carbon matrixes could be used for the middle reactor shield 109.

Inside the two layers of the middle reactor shield 109 is the middle shield coolant 134. The coolant 130 is Flourinert® in the preferred embodiment. It is pumped through the middle reactor shield 109 at a high rate. In some variations, this coolant 130 could be replaced by some other fluid, gas, or material appropriate for cooling.

The anode/cathode conducting spheres 113 sit on non-conducting conductor pedestals 112 of fiber reinforced cement. The center of each conductor pedestal 112 contains coolant tubes 114 for coolant to flow in and out. In this design, and there are many other possible designs, the coolant flows into the conductor pedestals 112 through the central coolant inlet tube 115, and flows out of the conductor pedestals 112 through the coolant outlet tube 116. The purpose of cooling the conductor pedestals 112 is so the conductor pedestals 112 do not become "hot spots" beneath the anode/cathode conducting spheres 113. The coolant 130 should also be carefully monitored so as not to cool the conductor pedestals 112 too much, creating "cold spots" beneath the conducting spheres 102. Hot spots or cold spots would affect the conductivity and harmonics of the conducting layer 118 of the conducting spheres 102 and the reactor cores 101 and thus reduce the effectiveness of the spherical electromagnetic confinement fields 140.

Laser ports 137 pierce the middle reactor shield 109, inner shield clamp 110, and the reactor core 101. In the preferred embodiment, the final focusing crystal of the laser 103 is located in the laser ports 137 that are in the middle reactor shield 109. The laser ports 137 through the inner shield clamp 110 and the reactor core 101 are just holes and are not capped with any material. (A clear, strong, heat resistant material with a high amount of boron would be ideal if they were capped.) Non-conductive gaskets 155 are located between the middle reactor shield 109 and the inner shield clamp 110 to reduce the possibility that current flow between the anode/cathode conducting spheres 113 and the middle reactor shield 109 could take place.

The core pedestal 111 and the conductor pedestals 112 could be located on vertical hydraulic lifts that allow them to move up and down for easier opening and closing of the middle reactor shield 109, the inner shield clamp 110, and to allow fine adjusting of the supported anode/cathode conducting spheres 113 as they thermally expand and contract through temperature variations.

Placement of the Reactor Core

While the reactor core sits in the inner shield-clamp 110, its weight is also supported by a non-conducting pedestal made of fiber reinforced cement, called the core pedestal 111.

The center of the core pedestal 111 also contains coolant inlet tube 115 and coolant outlet tube 116. The purpose of cooling the core pedestals 111 is so they do not become a "hot spot" beneath the reactor core(s) 101. The coolant 130 should also be carefully monitored so as not to cool the core pedestal 111 too much, creating a "cold spot" beneath the reactor core(s) 101.

Placement of Fusion Fuel

Initially, the fuel pellet 136 will be in the form of spherical Deuturium-Tritium pellets, presumably purchased from government sources. (Eventually, if the power of these reactor designs reaches expected levels, the use of Tritium may be avoided, allowing cheaper and easier to produce D—D pellets, and possibly other combinations of light elements.) The pellets will be prepositioned within the replaceable reactor core 101 by a three-dimensional grid of ablatable wires 135 made of materials such as glass fibers— see FIG. 9.

Laser Ports

The middle reactor shield 109, the inner shield clamp 110, and the reactor core 101 will have small holes—laser ports 137—that will allow the fusion pellet target to be imploded using traditional inertial confinement techniques. The preferred embodiment will use lasers. The design of the lasers and related equipment could be identical to the currently envisioned facility called the National Ignition Facility, or similar to many other inertial confinement devices. It is important that the laser ports be as evenly spaced around the reactor core to assist in imploding the fusion pellet in a spherical fashion. (The NIF facility currently envisions compressing Holoraum cylinders rather than the older type of spherical D-T pellets envisioned for this preferred embodiment.)

The laser ports 137 in the side of the reactor core 101 are needed for this preferred embodiment in order to allow the laser energy to reach the fuel pellet 136. Lasers 103 are needed in this design for the purpose of igniting the fuel pellet 136. After the initial ignition of the fuel pellet 136, the lasers 103 are not needed.

The problem of having laser ports 137 in the side of the reactor core 101 is the disruption of the harmonics of the electromagnetic fields in the conducting layer 118 of the core. The electromagnetic harmonics within the reactor core 101 will be disrupted, to some extent, by the laser ports 137.

This disruption is a result of the electrons flowing around the laser ports 137 rather than through the conducting material that has been removed to make the laser ports 137. If the diameters of the laser ports 137 are large, then the disruption of the harmonics will be larger. Since the disruption of the harmonics is not desired, the diameters preferably should be minimized.

In some prior art, laser ports 137 have used some kind of glass or crystal structure. The design of these components has been extremely difficult. The design of such "windows" for the laser ports 137 that pass through the inner shield clamp 110 and the reactor core 101, in these designs at least, does not seem necessary. In this preferred embodiment, these inner laser ports 137 are simply holes. The final focusing optics for the lasers 103 are located just outside of, or within, the laser ports 137 that pass through the middle reactor shield 109. Their design can be very similar or identical to such components already designed for the National Ignition Facility.

The size of the holes for the laser ports 137 that pass through the inner shield clamp 110 and the reactor core 101 will depend on the diameter of the laser 103. Tests with specific reactor core 101 materials and laser 103 energies will be needed. If the diameters of the laser ports 137 are too small, then the laser 103 will be diffracted by the laser ports 137, and the energy will not reach the fuel pellet 136. If the diameters of the laser ports 137 are slightly too small, then the lasers 103 will vaporize some of the conducting layer 118 of the reactor core 101 and plug the laser ports 137. If the diameters of the laser ports 137 are just right, then the lasers 103 will slightly vaporize some of the conducting layer 118 of the reactor core 101 but not plug the laser ports 137. With a slight amount of vaporized conducting layer 118 within the laser ports 137, and with the diameter of the laser ports 137 minimized, when the massive pulse of electromagnetic energy that forms the spherical electromagnetic confinement field 140 passes over the reactor core 101, then electrons and the electromagnetic pulse will arc through the laser ports 137, instead of around the diameter of the laser ports 137, and this will help to minimize the disruption of the electromagnetic harmonics within the reactor core 101.

If the laser ports 137 are simply holes, the question is, "Will material pour out the laser ports 137 when the fusion reaction occurs?" If there was no electromagnetic confinement field, then the answer would be yes. However, with an electromagnetic confinement field in place, all of, or the majority of the plasma 150 would be blocked.

An added benefit of the laser ports 137 is to lessen forces on the reactor core 101 in an explosive event that might rupture the core wall. Energy escaping through the laser ports 137 would impact the—middle reactor shield 109, thus effectively spreading out the energy over a greater area.

Laser Port Distribution

The positions and distributions of the laser ports 137 over the reactor core 101 is important. The key engineering factor is how the ports can be positioned to fire around the anode/cathode conducting spheres 113 and core pedestal 111 and conductor pedestal 112. In general, it is preferable to implode the fuel pellet 136 in a spherical pattern. The anode/cathode conducting spheres 113, core pedestal 111 and conductor pedestal 112 create "blind spots" where laser ports 137 can not be positioned. If needed, this problem can be minimized by having some of the "end" lasers 103 aimed slightly off-center. They can be aimed more towards the ends of the fuel pellet 136—that is, the ends, or "poles" that face the anode/cathode conducting spheres 113.

An estimated minimum of about 14 laser ports 137 is needed to adequately implode the fuel pellet 136 in a spherical pattern. Since the laser ports 137 reduce the electromagnetic harmonics on the reactor core 101, the number of laser ports 137, and thus lasers 103, preferably should be minimized. However, if too few of lasers 103 are used, then the plasma 150 will not implode spherically, and the initial plasma instabilities 139 would be too large for the spherical electromagnetic confinement fields 140 to contain. The optimum number of laser ports 137 can not be stated at this time because of the number of variables involved. The laser 103 beam diameter is important. The laser wavelength is important. The energy per beam is a factor. The diameter of the fuel pellet 136 is important.

Figure 10:
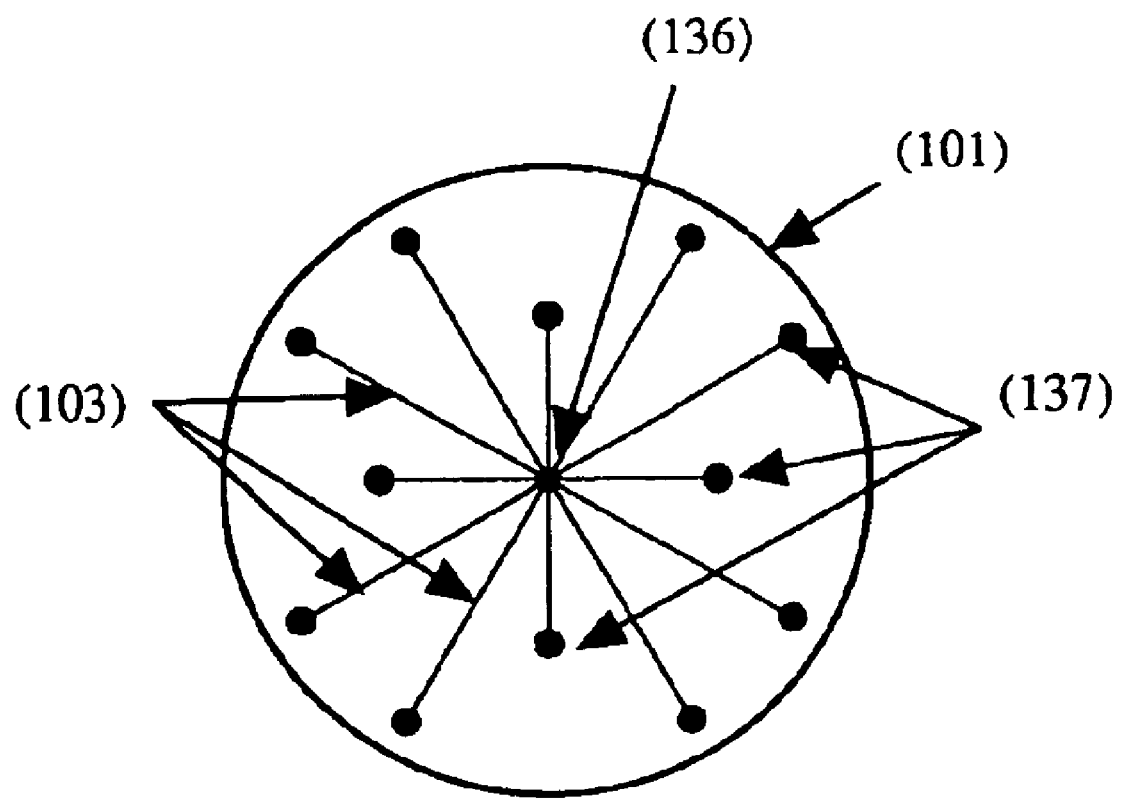
FIG. 10 is a perspective view of the reactor core including laser ports.

Too many lasers 103 could be used. For example, 50 lasers 103 would probably be too many, creating too much of a disruption in the harmonics of the spherical electromagnetic confinement fields 140. In addition, the cost of the additional lasers 103 could become prohibitive. For the preferred embodiment, 24 laser ports 137 will be used. Their approximate positions are shown in FIG. 10. The dots in FIG. 10 show the positions of the laser ports 137. The circular line represents the reactor core's 101 outer diameter. The radial lines represent the spherical angles from the laser ports 137 to the fuel pellet 136 projected onto a two-dimensional surface. FIG. 10 represents the view of the reactor core 101 from inside the oval conducting sphere track 104 looking outwards. There are only 12 laser ports 137 visible on this side. Another 12 laser 137 ports would be on the opposite side (i.e., the outside view of the reactor core 101). The angles are chosen to fire around the anode/cathode conducting spheres 113 and the conductor pedestals 112. There are many patterns that the laser ports 137 could be laid out in to obtain a harmonic bum, this pattern is just one example and is not intended to represent the only manner in which the laser ports 137 could be positioned. In some designs, no lasers 103, and thus, no laser ports 137, are used at all.

Figure 11:
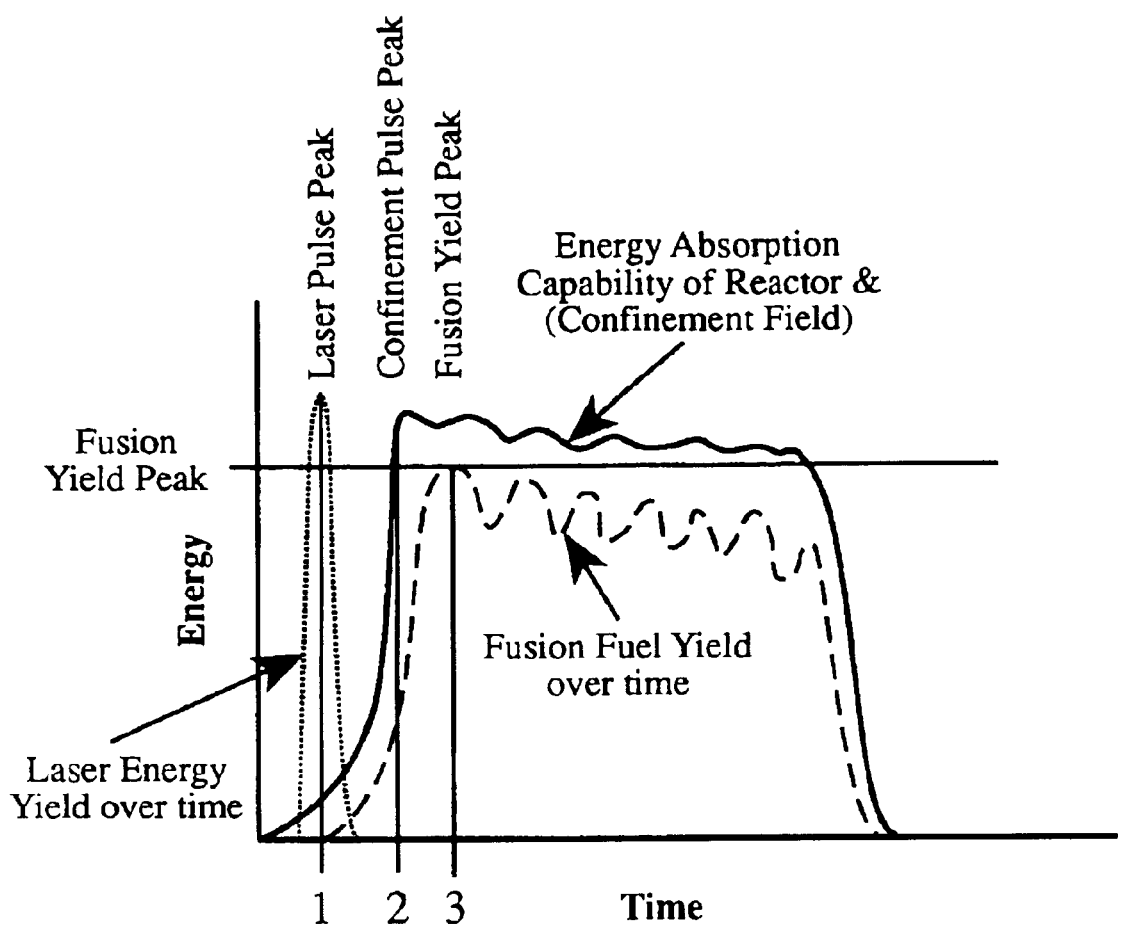
FIG. 11 is a graph of energy versus time for the fusion reaction.

In this preferred embodiment, the confinement field pulse comes after the laser pulse for the reasons just discussed. If the spherical electromagnetic confinement field 140 is too strong when the laser 103 pulses pass through the laser ports 137, then premature arcing may occur across the laser ports 137 in front of the laser 103 pulses, ionizing some of the conducting layer 118, and blocking the energy of the lasers 103. If the spherical electromagnetic confinement field 140 is too weak when the plasma 150 explodes, then the fusion reaction will not be adequately confined. Thus, timing is critical in this design, as is shown in FIG. 11.

Tests must be performed to time the delay between when the laser 103 pulses pass through the laser ports 137 and when the plasma 150 (fusion burn) starts to explode outwards. Further tests must be performed to determine the time needed for the energy from the capacitor bank 105 to pass through the electrical bus 107, through the hemispherical coils 106, to induce fields in the conducting spheres 104, pass through the confinement circuit, and build up to a value that will arc across the laser ports 137 in the reactor core 101. When the reactor is triggered, the timing of the lasers 103 must be designed so that the peak of the laser 103 pulse at time "1" is just prior to the timing of the peak of the spherical electromagnetic confinement fields 140 at time "2". (The total time width of the laser 103 pulse and fuel pellet explosion pulse will probably be only about 1 nanosecond. An estimate of the total width of the confinement pulse from triggering to peak will probably be about 4 to 5 $\mu$seconds—based upon the estimated discharge rate of the capacitor bank 105—if the Marx modules described later are used. Therefore, it is likely that the triggering of the confinement pulse will be required to begin prior to the triggering of the laser 103 pulse.)

The delay and duration of each pulse after its triggering is unknown at this time and will be specific to each reactor design. In the example of timing in FIG. 11, the confinement pulse is triggered prior to the triggering of the laser 103 pulse. The laser 103 pulse may need to be triggered first, or they may need to be triggered at the same time. The key detail is the confinement field peak at time "2" lies between the laser 103 pulse peak at time "1" and the fusion yield peak at time "3".

Middle Reactor Shield

Surrounding the reactor core 101 and the anode/cathode conducting spheres 113 is a middle reactor shield 109. This middle reactor shield 109 is made up of strong material capable of halting debris from an exploding or rupturing reactor core 101. The center of the double walls is filled with a coolant 130.

The middle reactor shield 109 is of a clam-shell type. The two halves slide open for access to the central components. In the preferred embodiment, the two halves slide outwards, rather than up and down. This allows the overhead gantry and cranes 132 to easily drop replacement anode/cathode conducting spheres 113 and reactor cores 101 into place. (Design variations for the middle reactor shield 109 may include one wall with no coolant 130, multi-wall shields with or without coolant 130.) Middle reactor shield 109 materials may be conducting or non-conducting. For the preferred embodiment, 316 stainless steel will be used. (Another possible metal alloy based on Vanadium—V-15Cr-5Ti—would be a good example of a suitable material. Metals would have to be resistant to radiation induced swelling and ductility loss and offer low residual activation. Other important considerations are: relatively high thermal conductivity; low thermal expansion coefficient and low modulus.) If the middle reactor shield 109 material is conducting, then non-conductive gaskets 155 must be placed between the middle reactor shield 109 and the anode/cathode conducting spheres 113—see FIG. 8. The non-conductive gaskets 155 material could be a vulcanized rubber, possibly ceramic, or other materials. In essence, the bulk of the electromagnetic confinement pulse must follow the conducting material in the conducting spheres 102 and the reactor Core 101 and not over the middle reactor shield 109. Laser ports 137 through the middle reactor shield 109 are required for the lasers 103. The geometry of the middle reactor shield 109 is spherical, centered around the center of the reactor core 101 so as not to disrupt the electromagnetic harmonics of the reactor core 101.

Inner Reactor Clamp/Shield

Attached to inside of the middle reactor shield 109 is an inner optional shield clamp 110. The middle reactor shield 109 is a clam-shell type, non-conducting, approximately two inches thick of RCC. This inner shield clamp 110 provides additional shielding and stability in the core area but may be omitted if it disrupts the harmonics of the reactor core 101, or if it is found that the additional shielding and stability are not needed. The middle reactor shield 109 clamps into position around the anode/cathode conducting spheres 102 and the reactor core 101. Holes in the inner shield clamp 110 are positioned to mirror the laser ports 137. The diameter of the holes can be larger than the holes through the sides of the reactor cores 101.

Description of Electrical Currents

The conducting spheres 102 and the reactor core 101 create an electric or magnetic circuit. Potentially, a voltage could be set up so that current flows around the circuit. In this situation, the circuit will be called an electrical circuit, and the reactor is acting in the electric mode. Alternatively, currents can be set up over the conducting spheres to induce a magnetic potential across each conducting sphere. In this situation, the circuit will be called a magnetic circuit, and the reactor is acting in the magnetic mode. The preferred embodiment of these reactor designs uses a magnetic circuit. If this reactor design were designed to be an electrical circuit, then there would result large-scale transport of electrons around the oval track of the circuit. Large-scale transport of electrons would be relatively dangerous and destructive to the circuit.

Figure 12:
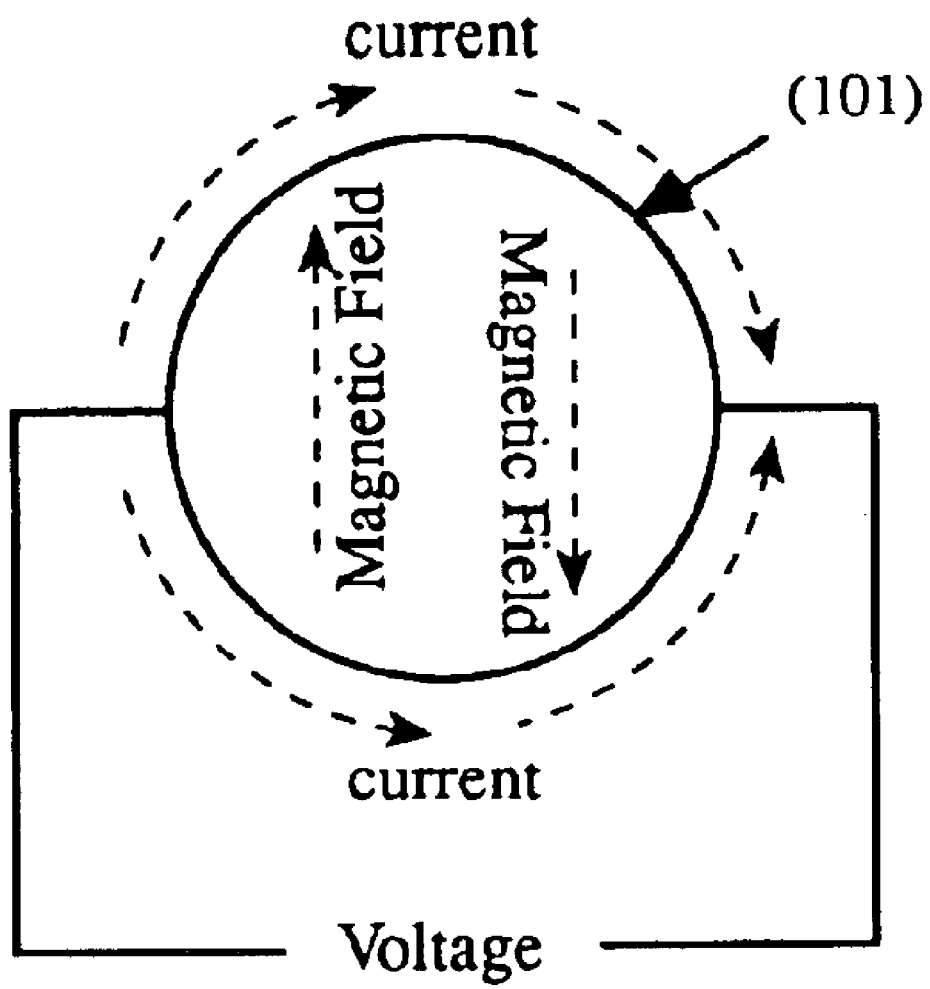
FIG. 12 is an elevational cross-section view of a sphere with an electric circuit.

FIG. 12 demonstrates how, if a voltage is set up over the poles of a sphere, then an electric circuit is made. The arrows that represent the direction of the current show how large-scale transport of electrons would flow over the reactor core 101 and accumulate on one pole of the reactor core 101. The magnetic field would obey the left-hand rule on the left hemisphere, and the right-hand rule on the right hemisphere.

Figure 13:
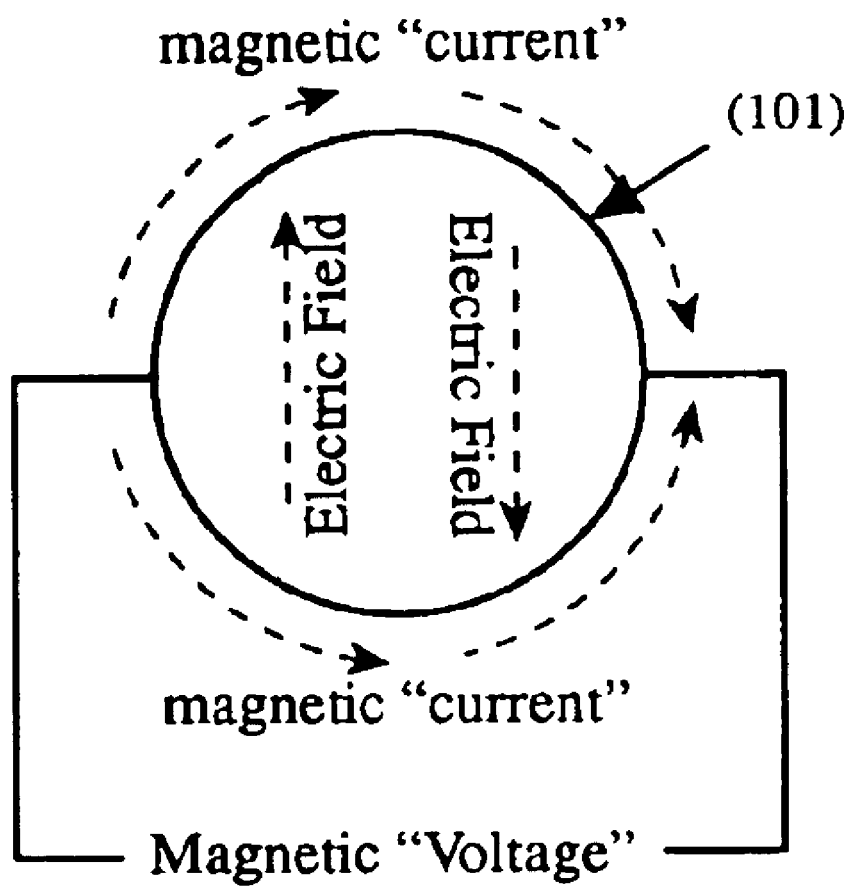
FIG. 13 is an elevational cross-section view of a sphere with a magnetic circuit.

If this reactor design were designed to be a magnetic circuit, then there would result large-scale transport of electrons around the outer diameters of the conducting spheres 102 and reactor core(s) 101. FIG. 13 demonstrates how, if a magnetic voltage is set up over the poles of a sphere, then a magnetic circuit is made. The arrows that represent the direction of the magnetic "current" show how large-scale transport of the magnetic field would flow over the reactor core 101. The electric field would obey the left-hand rule on the left hemisphere, and the right-hand rule on the right hemisphere. Thus, the large scale flow of electrons would counter-rotate around the opposite hemispheres of the conducting spheres 102 and reactor core(s) 101 and would not accumulate on one pole.

The preferred embodiment of these fusion reactor designs uses a magnetic circuit.

Tests indicate that the poles of this configuration become hot, apparently due to the faster rotating electrons. This dictates that magnetic circuit designs have very high cooling capabilities.

In order to induce the magnetic fields in the magnetic circuit in the preferred embodiment of these reactor designs, inductive coils will be used. There are many types of coils that can be used.

Hemispheric Coils

Figure 14:
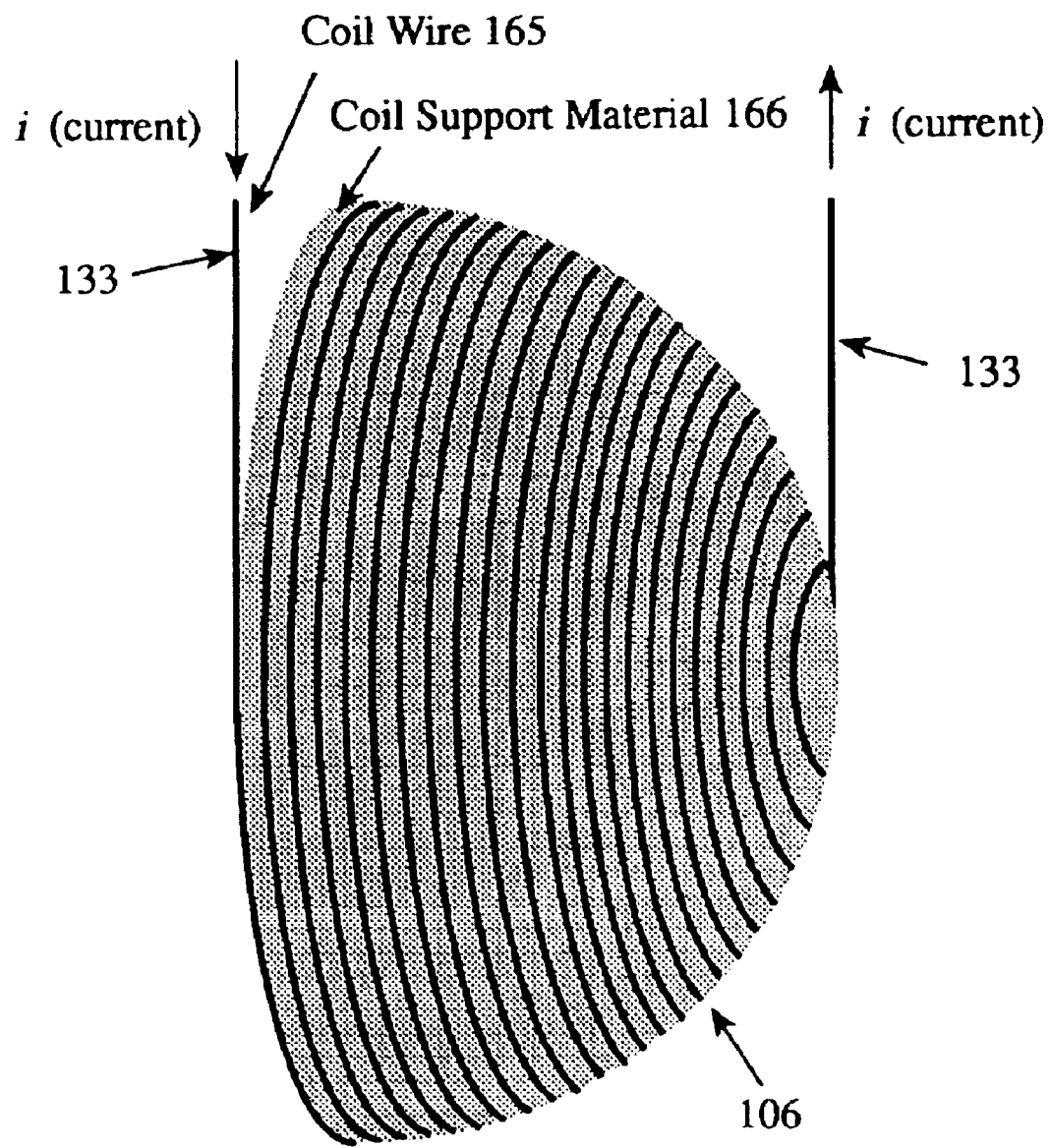
FIG. 14 is an elevational view of the hemispherical coil.

Hemispheric coils 106, as depicted in FIG. 14, have not been used or named before. U.S. Pat. No. 5,146,197 describes the use of spherical type coils for nuclear magnetic resonance (NMR) and magnetic resonance imaging (MRI), however, no suggestion is made in this patent to use such spherical coils for nuclear fusion. Basically, the coil wire 165 is wrapped around one hemisphere of coil support material 166. Appropriate coil support materials include but are not limited to ceramic or RCC. The coil wire may or may not be insulated.

Other coil types could be used. Advantages of a hemispheric coil 106 are: they can use a constant current to create a magnetic field because the flux area is changing, and they create a symmetrical magnetic wave pattern over the conducting spheres 102. The symmetrical magnetic wave pattern would be conducive to creating a harmonic spherical electromagnetic confinement field 140 over the reactor core 101. The disadvantage of using a hemispheric coil 106, is the pole area becomes very hot. This is one reason cooling is required in the conducting sphere track 104. Further, the placement of the high-volume coolant inlet pipes 170 should be such that the coolant 130 is aimed at the poles of these hemispheric coils 106.

Figure 15:
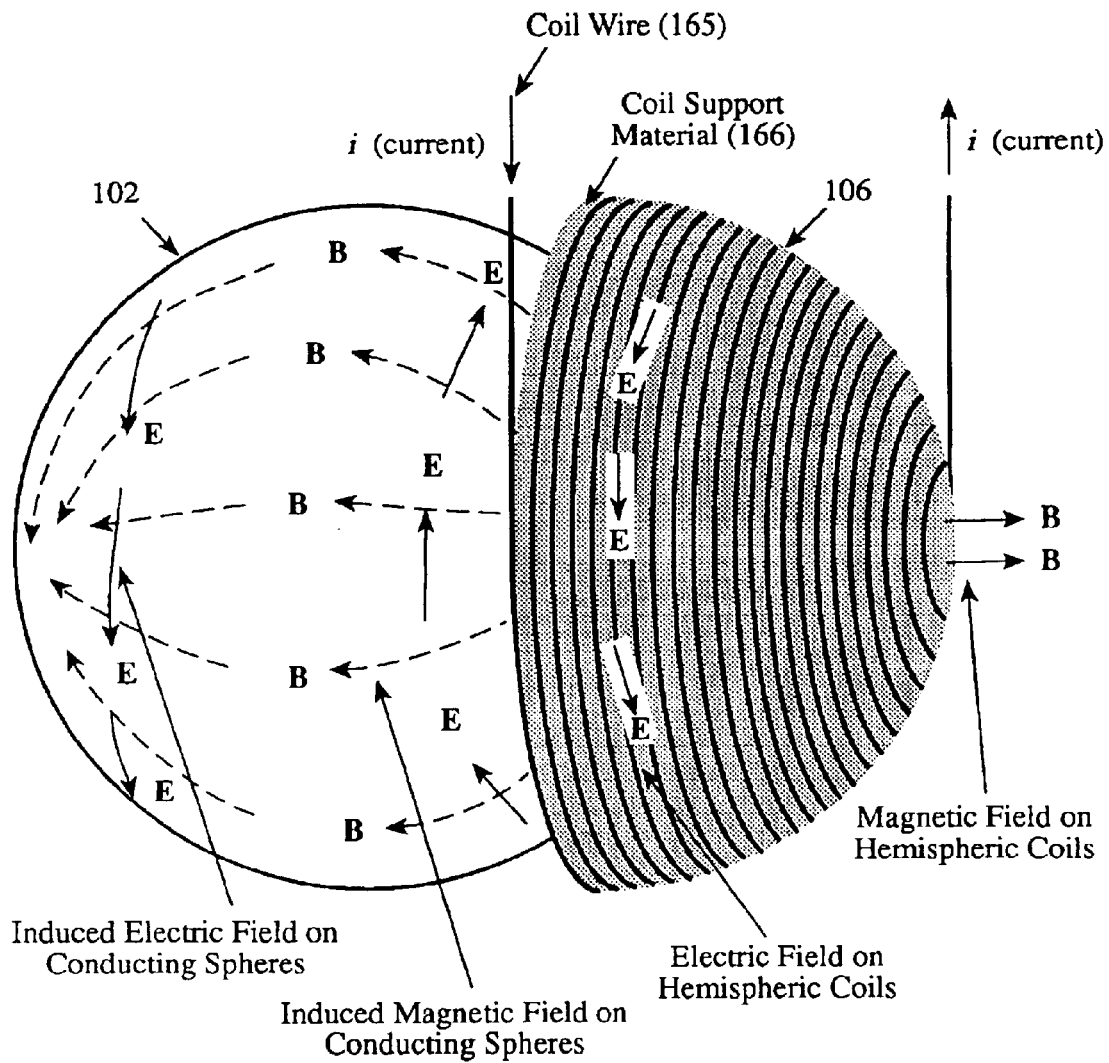
FIG. 15 is a cross-section view of the hemispherical coil in place over a conducting sphere.

Because the geometrical design of a hemispheric coil 106, the flux area of the hemispheric coil 106 is decreasing or increasing in a sine wave manner depending on the direction of current flow. Since the magnetic flux is changing, this will induce an EMF across the hemispheric coil 106 according to Faraday's Law of Induction. The direction of flow of fields over a conducting sphere 102 will oppose the fields in the hemispheric coil 106. The fields on the conducting spheres 102 will be induced by the fields in the hemispheric coils 106. Thus, a magnetic field will be set up across the poles of the conducting sphere 102, and the large-scale transport of electrons in the conducting sphere 102 will counter-rotate around each hemisphere of the conducting sphere 102 as indicated in FIG. 15.

Figure 16:
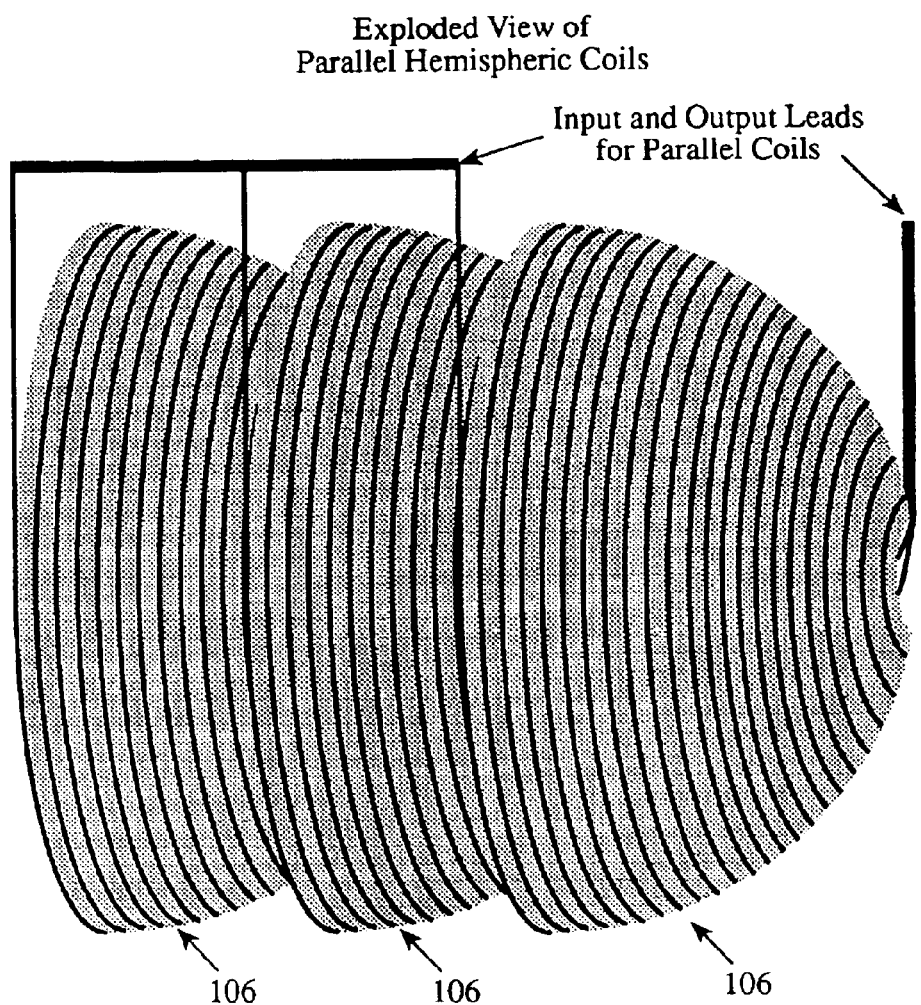
FIG. 16 is a cross-section view of layered hemispherical coils in parallel.

Just as it is possible to layer normal cylindrical coils, it should be possible to create a more powerful magnetic force by layering the hemispheric coils 106. Such a coil would be like a cup in a cup as shown in FIG. 16.

Figure 17:
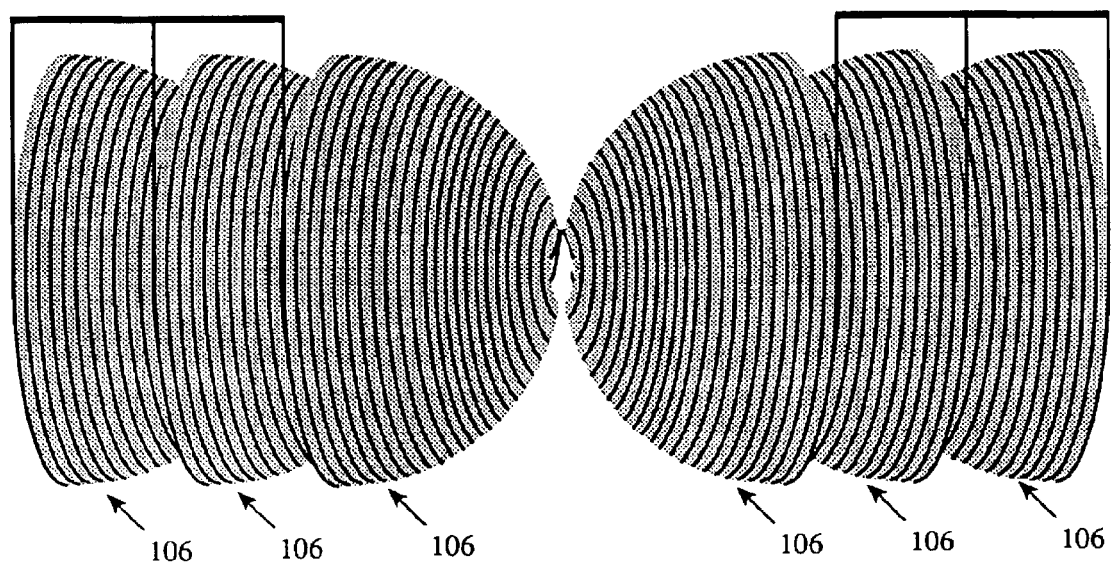
FIG. 17 is a cross-section view of layered hemispherical coils wired in series.

Based upon geometry, it is believed that hemispherical coils 106 hold great promise and are used in the preferred embodiment. Alternate coil designs will be discussed later and can replace the hemispherical coils 106 if needed. The wiring of the hemispherical coils 106 could be connected in parallel or in series. It is believed the best choice will be in parallel over one conducting sphere 102, and in series from conducting sphere 102 to conducting sphere 102. FIG. 17 discloses this method for connecting the hemispherical coils 106. However, in the preferred embodiment, single layer hemispherical coils 106 wired in series directly to the electrical bus 107 are used.

Energy Source to Initially Drive the Coils

As in all other fusion reactor designs, these reactor designs need an external energy source to start up. This external energy source could come from a variety of power sources such as: coal, oil, hydroelectric, fission, etc. Most external power plants would not have sufficient power to start the fusion process. Thus, some sort of energy collection system is needed.

Capacitor Banks

In many other fusion reactor designs, banks of capacitors are charged. This design utilizes such preexisting equipment. As an example, the Los Alamos National Laboratory is building a device called Atlas. This device will use a 36 MJ array of 240 kVolt Marx modules. These modules can be discharged rapidly. They can deliver a peak current of 45 to 50 MA with a 4 to 5 $\mu$second rise time.

The exact amount of capacitors that are needed for the preferred embodiment is not known at this time. This design is scalable. To meet the design goal of 1 to 3 Tesla of induced magnetic fields over the conducting spheres 102 and reactor core(s) 101, additional capacitors and coils could be added as needed.

Applying Current to the Coils

The design would use preexisting equipment to switch the capacitors to the coils. While tests with each reactor design would be needed, it is assumed that massive capacitor banks 105 must be discharged in unison. High-speed switches 138 have been employed for such purposes in other designs and could be purchased for this application. (For example, some inertial confinement reactors use synchronized laser-triggered, gas-insulated switches.)

When the energy in the capacitor banks 105 is discharged into the hemispherical coils 106, then electromagnetic fields would develop in the conducting layer 118 of each conducting sphere 102, and these fields would induce electromagnetic fields in adjacent conducting spheres 102. The anode/cathode conducting sphere 113 would induce the fields within the reactor core 101.

A key question is whether all of the energy in the capacitor bank(s) 105, should be released at once, with one triggering, or, should the initial pulse be followed up with more pulses. The answer is, it depends on economics. The Marx modules are obviously expensive. The initial pulse is the most critical. It helps to confine the initial explosion of the fusion fuel and creates the spherical electromagnetic confinement field that allows these designs to extract energy in the MHD process. However, to the lengthen the duration of the fusion burn, additional time in the spherical electromagnetic confinement field 140 would be beneficial. The long-term costs of adding additional energy storage in the capacitor bank(s) 105 would be less than the additional energy captured from the fusion reactions. The bulk of the cost is expended in the initial confinement pulse, not adding additional time to the pulse.

Figure 18:
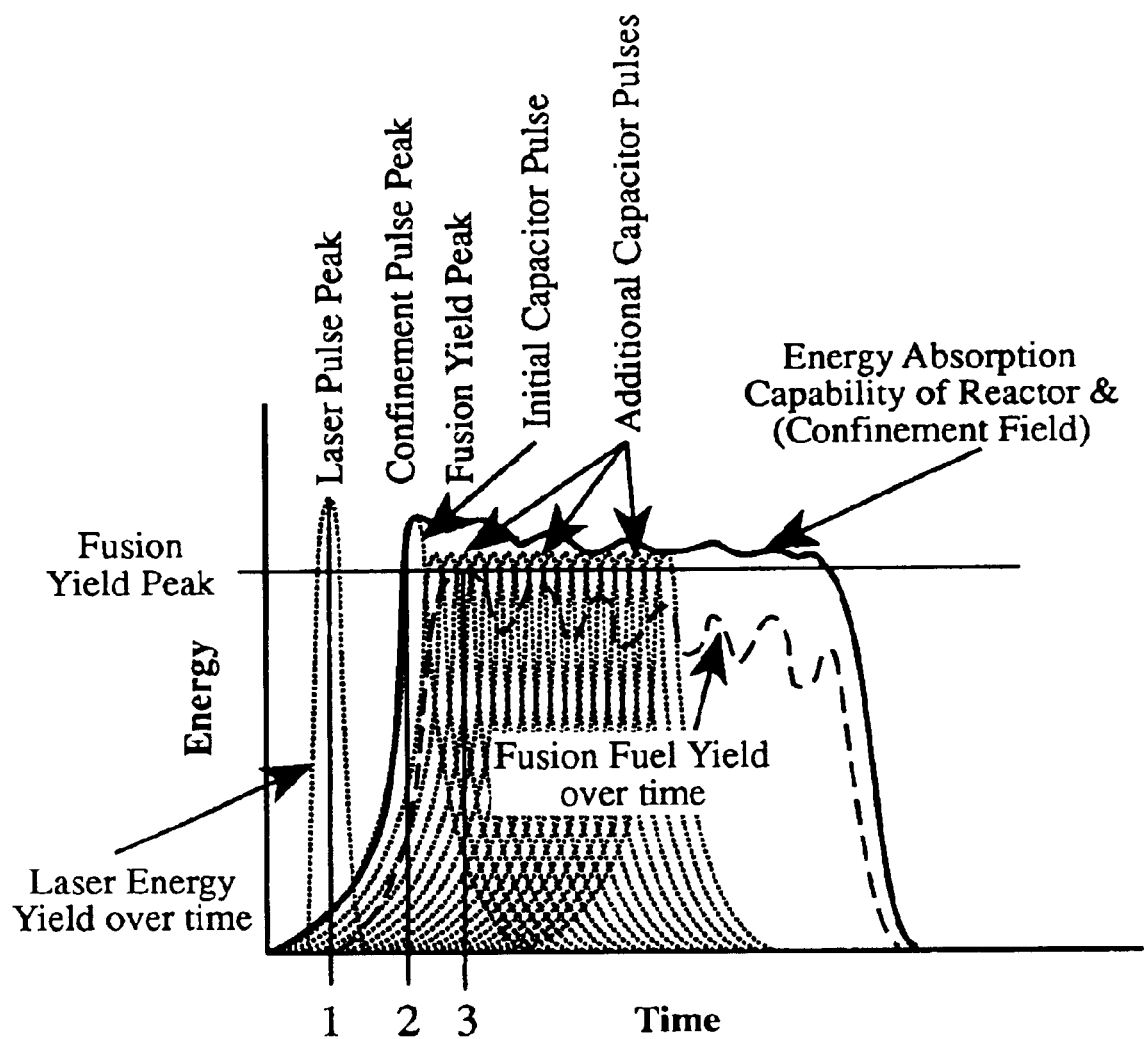
FIG. 18 is a graph of energy versus time for the fusion reaction using pulsed bursts of energy from a capacitor bank.

The frequency at which initial pulses are triggered will be determined by the resonance of the reactor core 101. This rate is a function of the primary wavelength of the system. If designed correctly, this wavelength will be determined by the wavelength of the conducting spheres 102. An example of how an initial pulse of energy could be released by a capacitor bank 105, followed by additional pulses of energy by additional capacitors, is shown in FIG. 18. Additional pulses of confinement energy from capacitors would not be needed if, as predicted, the instabilities from the fusion burn combine with the initial pulse of confinement energy to continuously maintain the confinement field over the course of the fusion burn.

Magnetic Field Goals

Due to the custom nature of early reactor designs, and the number of design variables to be tested, it is impossible to state exactly what the goal of the magnetic field over the reactor core 101 should be. For example, while the conducting material for the conducting spheres 102 will initially be a copper alloy, the conductivity of the manufactured conducting spheres 102 must be tested. Obviously, an initial purchase of capacitors could be made and additional modules added on until a sufficiently high magnetic field is achieved. If sufficiently high magnetic fields are not initially attained, it is likely that additional active cooling of the reactor core 101 and conducting spheres 102 may be needed. It is believed that an initial goal of 1 Tesla would be a difficult but reasonable goal. It is also believed that small fields could still allow commercially viable designs.

Organizations such as the National High Magnetic Field Laboratory have reach quasi-continuous magnetic fields of 65 Tesla in small bore magnets, and have numerous magnets with magnetic fields in the 20–45 Tesla range, including a 30 Tesla continuous magnetic field resistive magnet. If current design goals are met, organizations such as the National High Magnetic Field Laboratory are expected to reach 100 Tesla in a non-destructive magnet. Magnetic fields of up to 820 Tesla have been reached using destructive magnets at the Los Alamos National Laboratory.

Incremental increases in reaching higher magnetic fields in test magnets are being made by through the use of superconductors, by improving cooling, through alloy selection, by using better capacitors—or other energy sources—reinforcement structures, etc. The modular designs of all of the new reactor designs in the present invention allow new and improved materials and devices to be tested, and first generation components to be replaced later, by more advanced components—especially in the three key components; the reactor cores 101, the conducting spheres 102, and the coils 106, 147 and FIG. 51.

Reactor Core Spherical Electromagnetic Confinement Field 140 Field Goal

The power that is transmitted to the focal point of the core can be found by using the following expressions:

$$P = \vec{S} \cdot A \qquad \text{Equation \#1}$$

(Power is equal to the Poynting Vector times the area of the sphere.)

$$\vec{S} = \frac{1}{\mu_0} \vec{E} \times \vec{B} \qquad \text{Equation \#2}$$

(The Poynting Vector is proportional to the cross product of the electric and magnetic fields.)

$$E = cB \qquad \text{Equation \#3}$$

(The electric field is proportional to the magnetic field times the speed of light.)

$$A = 4\pi r^2 \qquad \text{Equation \#4}$$

(The surface area for a sphere.)
Solving:

$$P = \frac{1}{\mu_0} \vec{B}^2 c 4\pi r^2 \qquad \text{Equation \#5}$$

As an example of what this implies for these reactor designs, if a magnetic field can be generated at the surface of a 5 meter conducting sphere with a value of 1 Tesla, then the power transmitted towards the focal point of the sphere would be:

$$P = \frac{1 \ [T^2] \ 3 \times 10^8 \ [m/s] \ 4\pi \ 25 \ [m^2]}{4\pi \times 10^{-7} \ [Wb/A \cdot m]} \qquad \text{Equation \#6}$$

$$= 1 \ [T^2] \ 3 \times 10^{15} \ [m/s] \ 25 \ [m^2][A \cdot m/Wb]$$

$$= 75 \times 10^{15} \left[\frac{kg \cdot m^2}{s^3}\right]$$

Thus, a 1 Tesla field over a 5 meter sphere would focus 75 petawatts at the core of the reactor. A magnetic field of 1.5 Tesla would focus 168.75 petawatts at the core of the reactor. A magnetic field of 2 Tesla would yield 300 petawatts. A magnetic field of 3 Tesla would yield 675 petawatts. A magnetic field of 4 Tesla would yield 1.2 exawatts. All of these example energies are very extreme. This is energy that is focused towards the center of the reactor core 101. It is referred to as the spherical electromagnetic confinement field 140. (In some design variations, the spherical electromagnetic confinement field 140 will be relied upon to ignite the fusion fuel.)

With a spherical electromagnetic confinement field 140 that has enough power, the steps to production of usable fusion energy are ready to begin.

General Steps for Operation of Reactor.

It is believed that the invention operates as follows:
1) The capacitor bank(s) 105 for both the containment circuit and the lasers 103 are charged.
2) A reactor core 101, with a spherical fuel pellet 136—held in place at the center of the reactor core 101 by three abatable glass wires 135 in the x, y, and z axis—is placed on the central core pedestal 111.
3) The inner shield clamp 110 and middle reactor shields 109 are closed.
4) The conducting sphere track 104 and middle reactor shield 109 are filled with coolant 130 and cooled. Coolant 130 is pumped through the conductor pedestal 112 and core pedestal 111.
5) The sliding trough shields 131 are closed.
6) The overhead gantry and cranes 132 are retracted.
8) High-speed switches 138 allow energy stored in the capacitor banks 105 to flow into the laser circuit and the containment circuit. The lasers 103 are allowed to fire so that their peak energy is applied to the fuel pellet 136 slightly ahead of when the peak of the containment energy sweeps around the containment circuit and is applied to the reactor core 101.
9) The current through the hemispherical coils 106 induces electromagnetic fields over the conducting layer 118 of the conducting spheres 102. These fields create a magnetic circuit around the containment circuit, i.e., the electrons in the conducting spheres 102 do not flow around the circuit, they counter-rotate around each conducting sphere 102, as shown in FIG. 13, and create a strong magnetic field at each pole of the conducting spheres 102. The cross-product of the Electric and Magnetic fields—the Poynting Vector—creates a strong central pointing field in each conducting sphere 102. The non-conducting core 119 within each conducting sphere 102 would be heated and compressed, but not enough to start a fusion burn as is intended in the reactor core 101. In the reactor core 101, a strong spherical electromagnetic confinement field 140 will start to develop.
10) The lasers 103 implode the fuel pellet 136 and creates a nucleus of fused material.
11) The spherical electromagnetic confinement field 140 over the reactor core 101 grows as the peak energy starts to flow through the containment circuit. (Extra capacitors are triggered—as needed—to lengthen the duration of the spherical electromagnetic confinement field 140.)
12) Using high-speed switches 138, the containment circuit is switched from the capacitor bank 105 to the energy grid.
13) In general, the spherical electromagnetic confinement field 140 that is set up over the reactor core 101 inhibits the nucleus of fused material from exploding. A more precise way of saying this, is the fused fuel is inhibited from decaying. In general, the spherical electromagnetic confinement field 140 will compress the fusion burn uniformly in all directions, helping the fusion burn to be harmonic. In general, some instabilities 139 will be ejected from the surface of the fusion burn in jet-like flows.
14) The outward exploding streams of plasma instabilities 139 will setup flows at right angles to the spherical electromagnetic confinement field 140. The exploding streams of plasma 150 will interact with spherical electromagnetic confinement field 140 that surrounds the core in a MHD fashion. The outward exploding streams of plasma 150 will push out on the spherical electromagnetic confinement field 140 via the MHD effect. The inward pointing spherical electromagnetic confinement field 140 will push back on the exploding streams of plasma 150. The rate of flow of the outward exploding streams of plasma 150 will be slowed. The energy lost in the slowing of the outward moving streams of plasma 150 will be transferred to the spherical electromagnetic confinement field 140, effectively increasing its strength, and creating an increased magnetic differential across the reactor core 101.
15) The increased magnetic differential creates a magnetic flow, analogous to a current flow, around the containment circuit. A current flow will be induced in the hemispherical coils 106 by the magnetic flow around the containment circuit. The induced current from the hemispherical coils 106 is allowed to flow out into the energy grid. High efficiency is obtained because fusion energy is directly converted into electricity, and the excess energy in the spherical electromagnetic confinement field 140 is recycled.

16) The active confinement of the fusion burn by the spherical electromagnetic confinement field 140 will allow the fusion burn to have a duration that is longer than without active containment.

17) The central nucleus of fused fuel continues to eject exploding streams of plasma 150—or possibly pulsates—until the fuel is consumed. Then, when the fuel is almost totally consumed, the process stops. The rate at which energy is released from the fusion burn will depend on the harmonics of the burn. Smoother harmonics will allow a slower release of energy. Poorer harmonics will release energy faster.

18) Heat is extracted from the coolant 130 in the middle reactor shield 109 and the coolant bath 108 and is used to drive secondary steam turbine generators.

19) When the reactor core 101 is cooled sufficiently, the outer shield doors are opened and the reactor core 101 is replaced. The sliding trough shields 131 are retracted. Parts are inspected and replaced as needed.

20) The next cycle begins.

The length of the burn will be affected by many variables such as: materials selected for conducting spheres 102, the reactor core 101, and the size of the capacitor bank 105. These variables do not affect the general design concepts that patent protection is being applied for, but may affect the details of specific patent variations.

Theory of Operation

Figure 19:
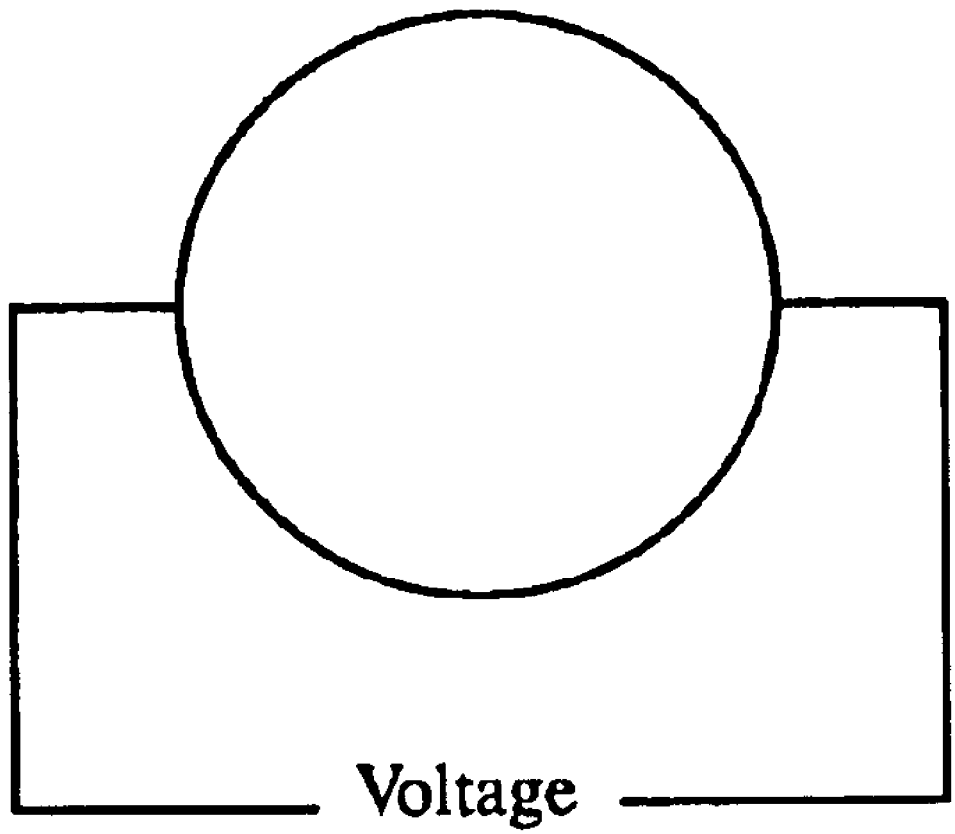
FIG. 19 is a cross-section view of a sphere with voltage applied.
Figure 20:
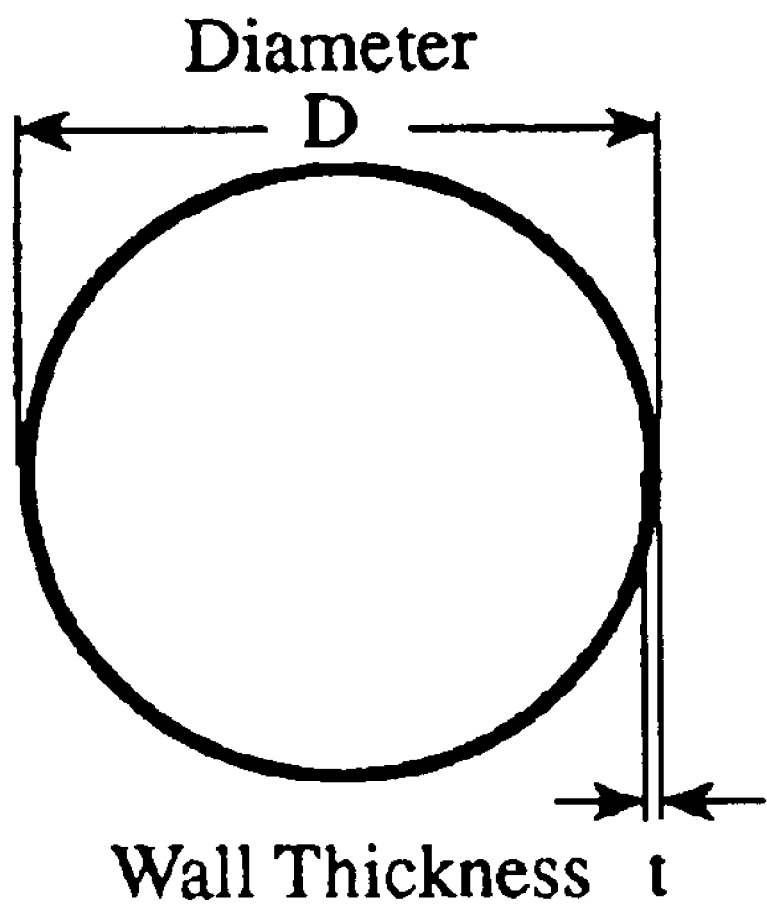
FIG. 20 is a cross-section view of a sphere.

The simplest way to describe the idea of spherical confinement, is to take a hollow sphere made of a conducting material—e.g., copper—and to set up a voltage across the sphere as shown in FIG. 19. It is important that the sphere is: symmetrical, smooth, of consistent material, and of consistent wall thickness. Also important is that the diameter of the sphere be much larger than the thickness of the wall of the sphere as shown in FIG. 20.

D>>t

The voltage across the sphere will create a current across the sphere. However, on one hemisphere the current density is decreasing as the current spreads out over the greater surface area of the sphere, and on the other hemisphere the current density is increasing as the current comes together at the pole. This change in the current density will induce magnetic fields at right angles on the surface of the sphere. Another way of describing this is the electric flux is changing due to the geometry of the conducting sphere. The changing electric flux induces magnetic fields.

Magnetic Fields

Figure 21:
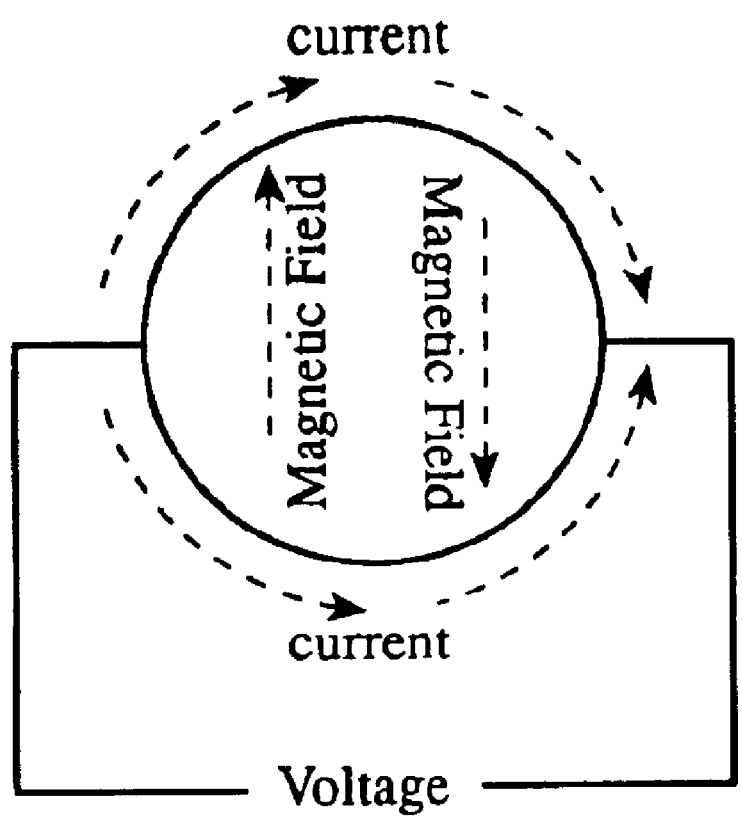
FIG. 21 is a cross-section view of a sphere with an electrically induced magnetic field.

If the voltage is set up so the current passes from left to right in this example, then the magnetic fields will form parallel to the equator of the sphere, as indicated in FIG. 21. As the current passes over the surface of the sphere, the electrical field will change due to the geometry of the sphere. This changing electrical field induces magnetic fields on the surface of the sphere at right angles the electrical field according to the right hand rule. Since the electrical field is decreasing on the left hemisphere there is a negative sign, thus explaining why the magnetic field is turning around that hemisphere according to the left hand rule. In essence, the flux of the electrical current is being forced to spread out, by flowing over the sphere, and then is being forced to come back together again. Forcing the current to change direction in such a manner, induces the magnetic fields.

For purposes of the present invention, this central conducting sphere may be referred to as the "core." The core can be described as manufactured with numerous layers of different materials, or as a plasma 150. In a group of reactor designs described in one embodiment of the present invention—called "No Core" Reactors—the core will be made of no materials at all—only spherical electromagnetic confinement fields 140.

The Poynting Vector

One of the important characteristics of an electromagnetic wave is that it can transport energy from point to point. The rate of energy flow per unit area for an electromagnetic wave can be expressed by the vector S, and it is called the Poynting Vector after John Henry Poynting (1852–1914), who first described it.

Figure 22:
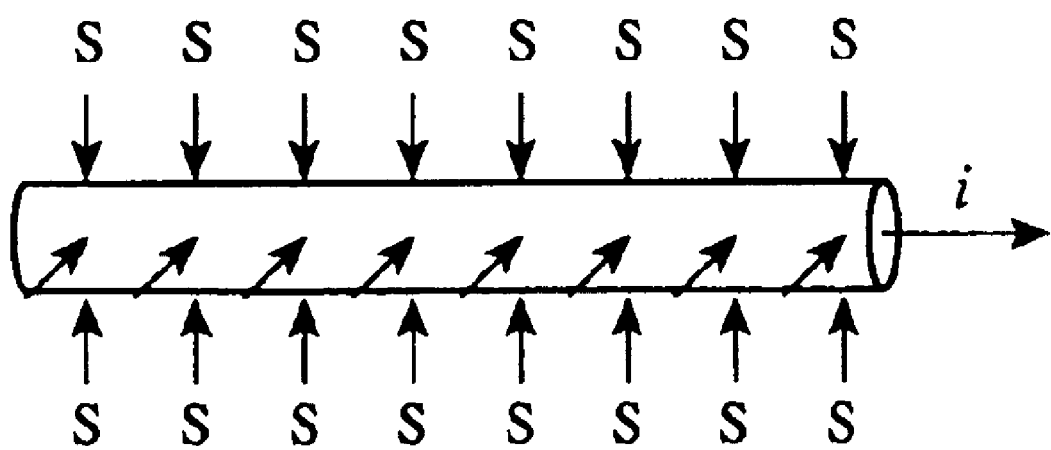
FIG. 22 is a cross-section view of a wire with center pointing Poynting Vectors.
Figure 23:
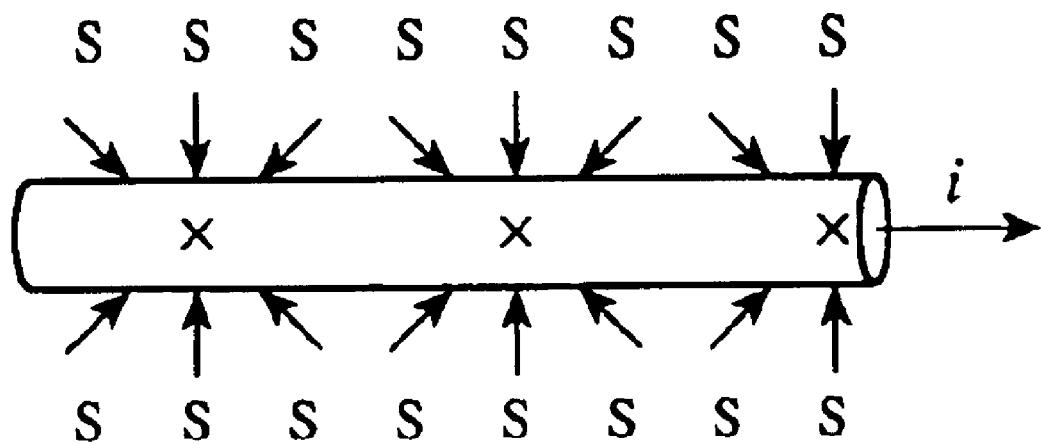
FIG. 23 is a cross-section view of a wire with varying directions for Poynting Vectors.

For current flowing through a typical wire with constant circular cross section, the Poynting Vector almost always points inwards towards the center of the wire, as shown in FIG. 22. In high voltage and/or high current situations, especially in thick conductors, waves can set up in the conductor, creating a varying direction for the Poynting Vector, as shown in FIG. 23. Normally, such waves are a major problem. Spherical electromagnetic waves such as these can explode wires, and have been known to crush pipes in a sausage-link-like fashion when the pipes were struck by lightning. Many wire designs—such as cables used with lightning rods—are composed of thin filaments 164, twisted or woven, to minimize this effect, see FIG. 50. This natural pattern of spherical waves will be utilized in a beneficial manner in the present invention. In many parts of the designs of the present invention, steps must be taken to prevent such instabilities from exploding components. (This is sometimes referred to as, "the exploding wire phenomenon" and will be explained more in depth hereinafter.)

In prior nuclear fusion experiments, "instabilities" may have been the result of unintended, or unexpected spherical electromagnetic waves in the plasma 150 (i.e., the induced cross-product of the time varying, and/or, area varying Electric and Magnetic fields.)

The Poynting Vector can be expressed by the equation:

$$\vec{S} = \frac{1}{\mu_0}\vec{E} \times \vec{B} \qquad \text{Equation 7}$$

In this form, i.e., with this constant—the Poynting Vector can be described using SI Basic Units or SI Derived Units. In SI Derived Units, S is often expressed in terms of watts/meter$^2$. In SI Basic Units, S is expressed in terms of kg/second$^3$. The direction of the vector S gives the direction in which the energy moves. The vectors E and B refer to the instantaneous vectors for the Electric and Magnetic fields.

Over the surface of the cores in the fusion reactors described here, the instantaneous vectors for E and B are usually tangential to the core's spherical surface. There are two primary possibilities for how the electric and magnetic fields are oriented over the core. These two possibilities can be equated to "electric" circuits and "magnetic" circuits.

In one of the two primary orientations of electric and magnetic fields described in these fusion reactors, the electric fields E are aligned so that they travel from pole to pole over the conducting sphere, while the magnetic fields B point at a right angle to E—essentially parallel to the equator of the conducting spheres, as shown in FIG. 24(a) and FIG. 24(b).

In the other of the two primary orientations of electric and magnetic fields described in these fusion reactors, the magnetic fields B are aligned so that they travel from pole to pole over the conducting sphere, while the electric fields E point at a right angle to B—essentially parallel to the equator of the conducting spheres. This particular arrangement of electric and magnetic fields—essential for "magnetic" circuits—will be the preferred field orientation and is required for the "No-Core" reactor design, as shown in FIG. 25(a) and FIG. 25(b).

Analyzing the Poynting Vector on a Conducting Sphere or Core

Figure 26:
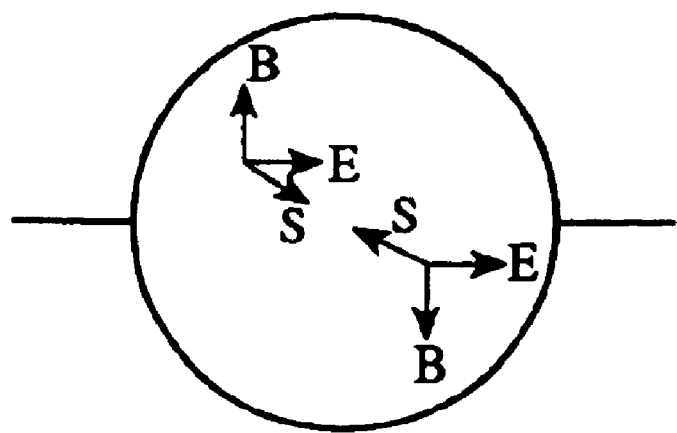
FIG. 26 is a three-dimensional view of a sphere with Poynting Vectors pointing to the center of the sphere.

At any point on the surface of a Conducting Sphere or Reactor Core, the electric and magnetic field can be analyzed. By analyzing the cross-product of the electric and magnetic fields, the Poynting Vector can be found. At all points on the surface of the sphere the cross-product S is directed towards the center of the sphere. Two example points of analyzing the Poynting Vector for a sphere are shown in FIG. 26.

Figure 27:
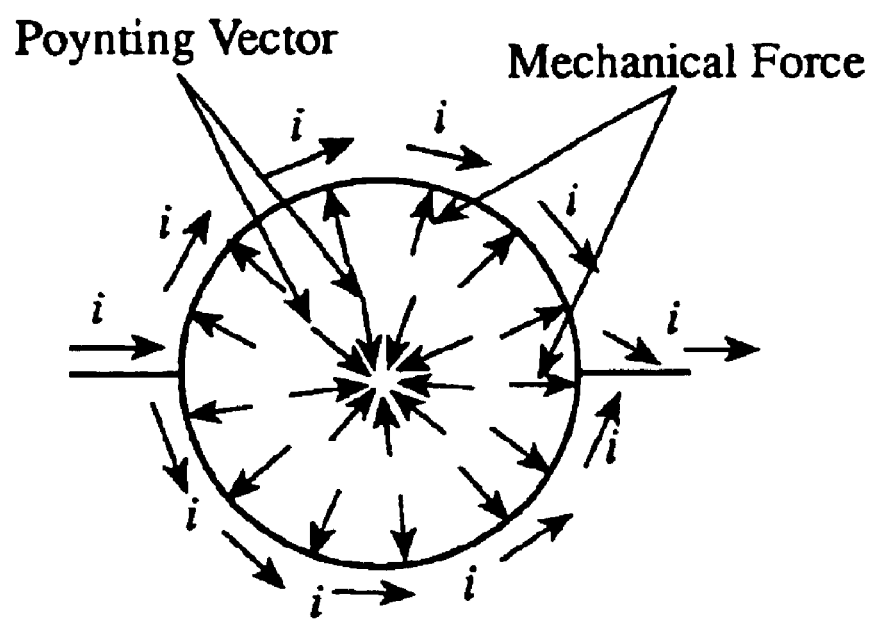
FIG. 27 is a cross-section view of a sphere.

The Poynting Vector can be expressed in different forms, but in general, energy is being transported to the focal point—to the center of the sphere. In essence, the electrical current is being forced to spread out and then allowed to come back together again by the geometry of the conducting sphere 102, or reactor core 101. If a current was traveling down a long, straight conductor, then forced to spread out because of a bulge in the conductor, then there must be a force pointing towards the center of the bulge. The equal and opposite force, equivalent to the mechanical force that is spreading the electrical current apart over the sphere's region, is the central pointing energy transport that can be expressed in the form of the Poynting Vector as shown in FIG. 27.

The larger the voltage applied across the conducting sphere 102, the larger the current across the conducting sphere 102. The larger the current across the conducting sphere 102, the larger the electric and magnetic fields. The larger the electric and magnetic fields, the larger the amount of energy that is focused on the focal point—at the center of the reactor core 101.

It is critical to note that, if a conducting sphere 102 or reactor core 101 is thin-walled, structurally weak, or in plasma form, then the electromagnetic fields will collapse and implode the conducting Sphere 102 or reactor core 101. This is a problem if the conducting sphere 102 or reactor Core 101 needs to be designed not to collapse. Such a collapsing and implosion can be a benefit if it used as an ignition technique to ignite a plasma into a fusion burn. However, in general, to prevent conducting spheres 102 or reactor cores 101 from vaporizing, imploding, crushing, rupturing or some other catastrophic event, and in order to provide massive central pointing impulses of energy at the center of the reactor core, the conducting spheres 102 and reactor cores 101 must be relatively large, strong, and massive rather than small, and thin.

Plasma Fusion within the Core

A significant early question is, how could a fusion reaction be induced in the reactor core 101 of the reactors designs of the present invention? The first two key issues are: how is the fuel placed in the reactor core 101; and, how is the fuel ignited? The next section on MHD will address the issue of how energy will be extracted. There are numerous techniques that could be used to place the fuel inside the core.

Figure 28:
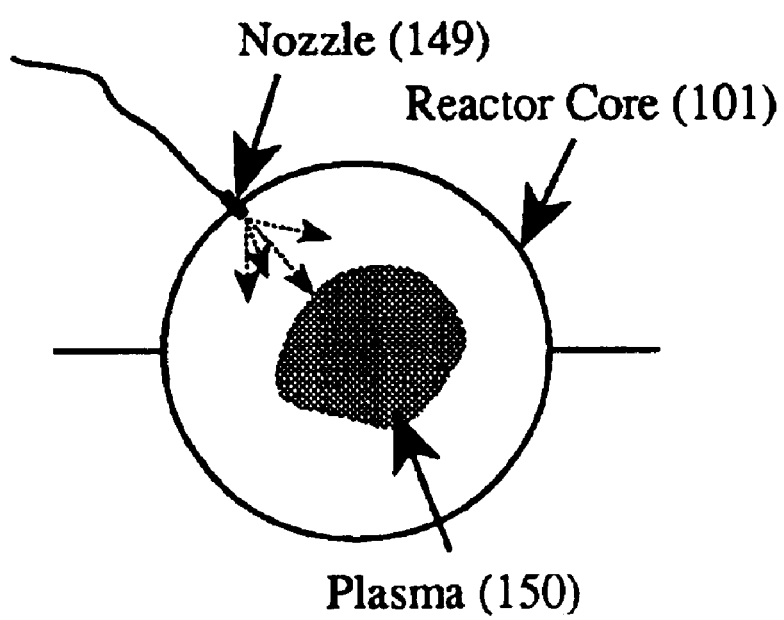
FIG. 28 is a cut-away view of the reactor core with a nozzle.

1) In one approach, shown in FIG. 28, a nozzle 149 could be placed in the side of the reactor core 101 to inject a plasma 150 into the reactor core 101 just prior to it being ignited. However, a permanently placed nozzle 149 in the side of the reactor core 101 could interfere with the harmonics of the spherical electromagnetic confinement fields 140 and dramatically reduce their effectiveness to contain the fusion reaction.

Figures 29A, 29B:
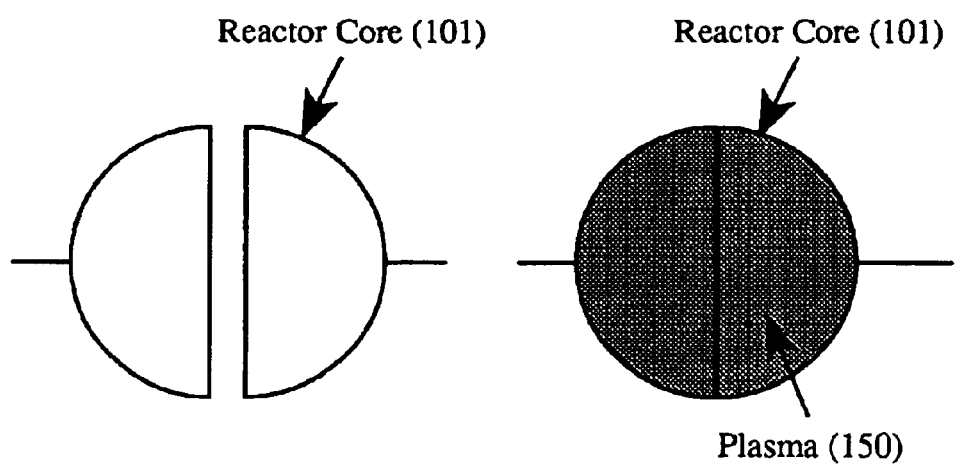
FIG. 29($a$) is an exploded view of the reactor core.

2) A second approach, as shown in FIG. 29(a) and FIG. 29(b), would be to place plasma 150 into the reactor core 101 when it is manufactured and have the plasma 150 completely sealed in the reactor core 101. Thus, the reactor would need to be designed so that the reactor cores 101 could be easily replaced between each fusion burn. With this technique, the reactor core 101 would need to be preheated before the main confinement/triggering pulse in order to re-ionize the plasma 150.

Figure 30:
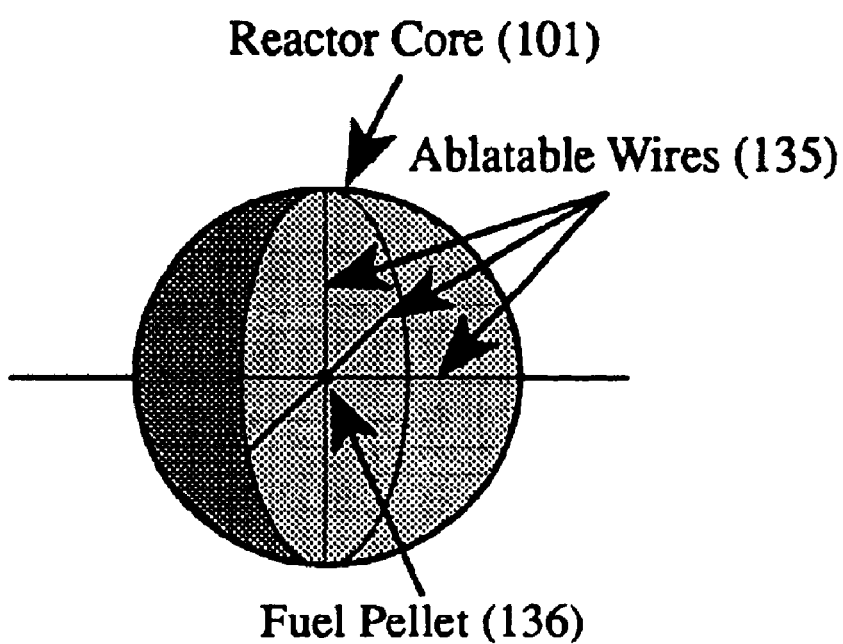
FIG. 30 is a cut-away view of the reactor core with a fuel pellet.

3) A third approach, as shown in FIG. 30, would be to place a fuel pellet 136 at the center of the reactor core 101, pre-positioned and held in place by adjustable, ablatable wires 135 made of a materials which may include but not be limited to: spider web, Kevlar, carbon or glass. There may be 1, 2, 3, or more wires used to hold the pellet in place. In this example, there are 3 wires forming a 3-dimensional x, y, z-type grid.

Figure 31:
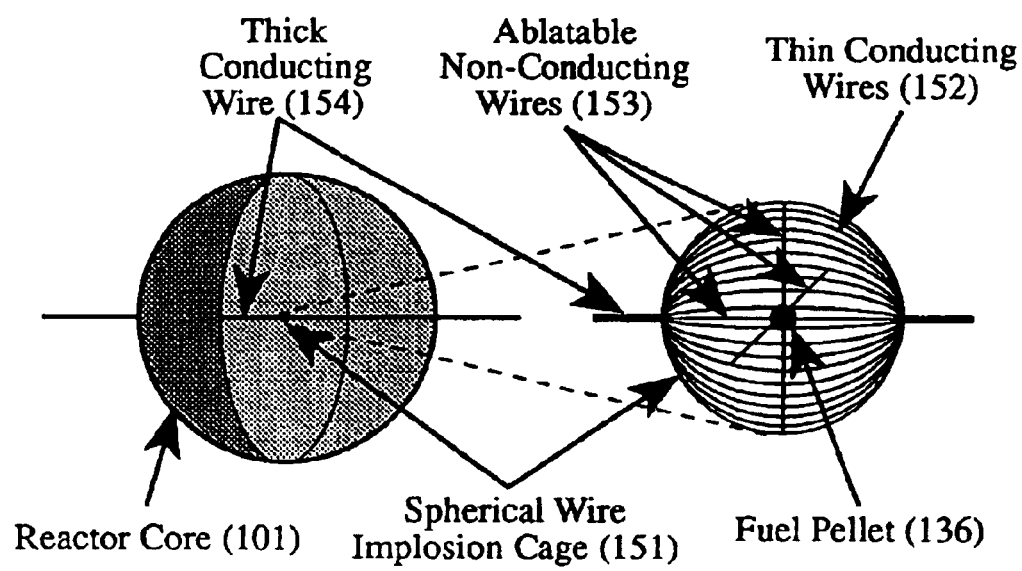
FIG. 31 is an exploded isolation view of the reactor core with a fuel pellet inside a spherical wire implosion cage.
Figure 32:
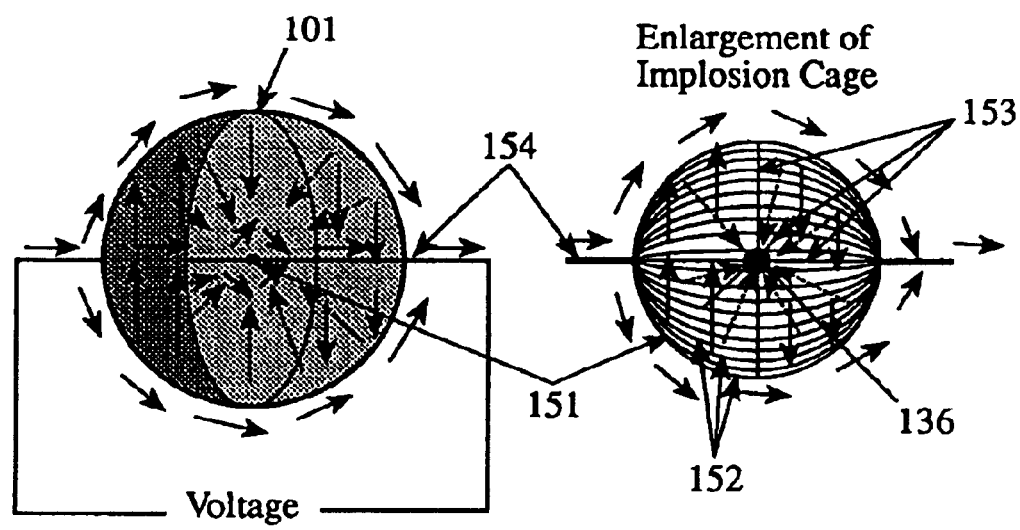
FIG. 32 is an exploded isolation view of the reactor core with a fuel pellet inside a spherical wire implosion cage following the application of a massive voltage.
Figure 33:
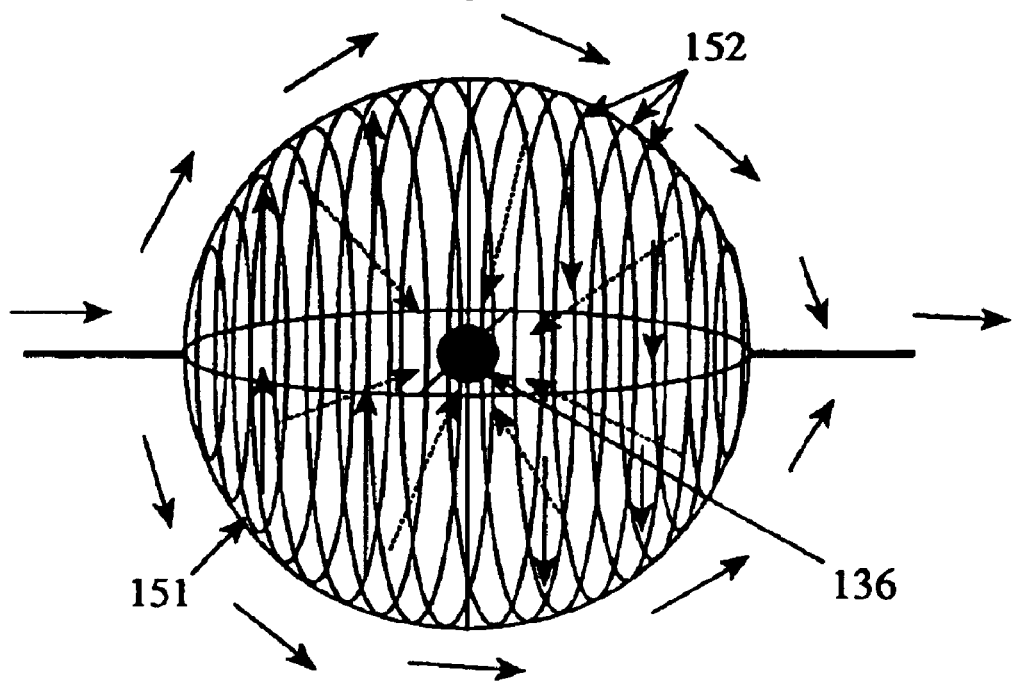
FIG. 33 is a cut-away view of a fuel pellet inside a spherical wire implosion cage following the application of a massive voltage.

4) A fourth approach, shown in FIG. 31, would be to place a fuel pellet 136 inside a small spherical wire implosion cage 151 made of thin conducting wires 152. How this cage is designed depends on if the containment circuit is acting in an electric mode or magnetic mode. In the electric mode, the thin conducting wires 152 would be aligned from pole to pole as shown in FIG. 32. In the magnetic mode, the thin conducting wires 152 would be made of concentric wires as shown in FIG. 33. The number of strands that make up the cage could be low, e.g., 20–30 wires. However, current tests by Sandia National Laboratories with cylindrical wire cages in their Z-Pinch device would suggest 100–300 wires would be better. Examples of materials for the spherical wire implosion cage's 151 thin conducting wires 152 would include, but not be limited to: tungsten, copper, aluminum, and gold.

The purpose of the Spherical wire implosion cage 151 is to implode and ignite the fuel pellet 136 located at the center of the spherical wire implosion cage 151. The fuel pellet 136 would be held in position inside the spherical wire implosion cage 151 by ablatable non-conducting wires 153. Examples of materials for the ablatable non-conducting wires 153 would include, but not be limited to: spider web, carbon, silicon and Kevlar. The spherical wire implosion cage 151 of thin conducting wires 152 would be held in position within the larger, outer reactor core 101 by a thick conducting wire 154.

A massive voltage would be setup across the reactor core 101, as shown in FIG. 32, or any number of design variations operating in the electric mode. Part of the current would induce a spherical electromagnetic confinement field 140 around the reactor core 101. Some of the current would pass along the inner thick conducting wire 154 which would vaporize the thick conducting wire 154 and vaporize and implode the spherical wire implosion cage 151. This implosion would ignite the fuel pellet 136 inside the spherical wire implosion cage 151. The remaining current passing over the outer reactor core 101 would provide the containment forces for the fusion explosion. The difficulty of inducing a harmonic magnetic mode containment field on the reactor core 101 and in the spherical wire implosion cage 151 at the same time probably will inhibit using this technique. The difficulty caused by the mass transport of electrons around the containment circuit when using the spherical wire implosion cage 151 technique in the electric mode will inhibit using this technique.

Figures 34A, 34B, 34C:
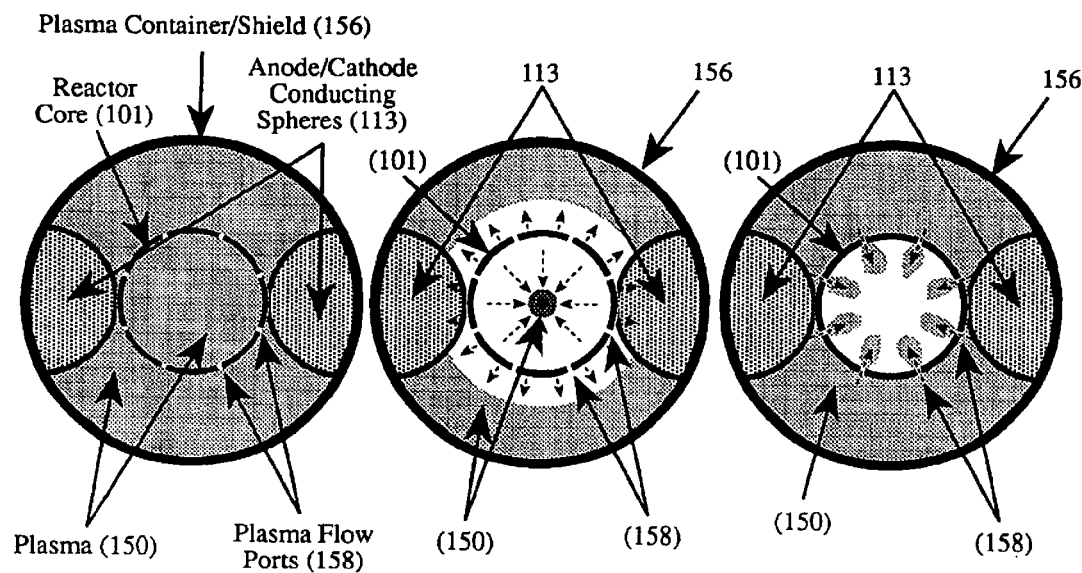
FIG. 34($a$) is a cut-away view of a reactor core inside a plasma container shield.

5) A fifth approach would have the reactor core 101 placed inside a larger plasma container/shield 156 that is filled with plasma 150, see FIG. 34(a). In the sides of the reactor core 101 would be small plasma flow ports 158 that would allow the plasma 150 to move inside the reactor core 101. With this technique, the spherical electromagnetic confinement fields 140 over the reactor core 101 would compress and ignite the plasma 150 inside the reactor core 101 when a massive electric voltage, or magnetic differential is set up across the poles of the reactor core 101, see FIG. 34(b). But this would not ignite the plasma 150 outside of the reactor core 101. At most it would compress it outward. As the reactor cools, there will be less pressure in the reactor core 101 than outside of the reactor core 101. The small plasma flow ports 158 in the sides of the reactor core 101 would allow the plasma 150 outside the reactor core 101 back into the reactor core 101 between each electromagnetic pulse, see FIG. 34(c).

If the small plasma flow ports 158 through the sides of the reactor core 101 are small enough, then there should be no disruption to the harmonics of the electromagnetic fields within the conducting layer 118 of the reactor core 101—the massive electromagnetic pulses that travel through the conducting layer 118 of the reactor core 101 would simply arc across the plasma flow ports 158. This technique may not be feasible if the plasma flow ports 158 disrupt the harmonics of the spherical electromagnetic confinement fields 140 too much. Also, the reactor cores 101 would need to be easily replaced with this design since the arcing of the spherical electromagnetic confinement fields 140 across the plasma flow ports 158 would eventually weld them shut.

6) The previous 5 techniques are meant only as examples. There are other, obvious techniques for placing the fusion fuel into the reactor core 101, such as dropping a fusion fuel pellet 136 through a hole in the top of the reactor core 101.

Figure 35:
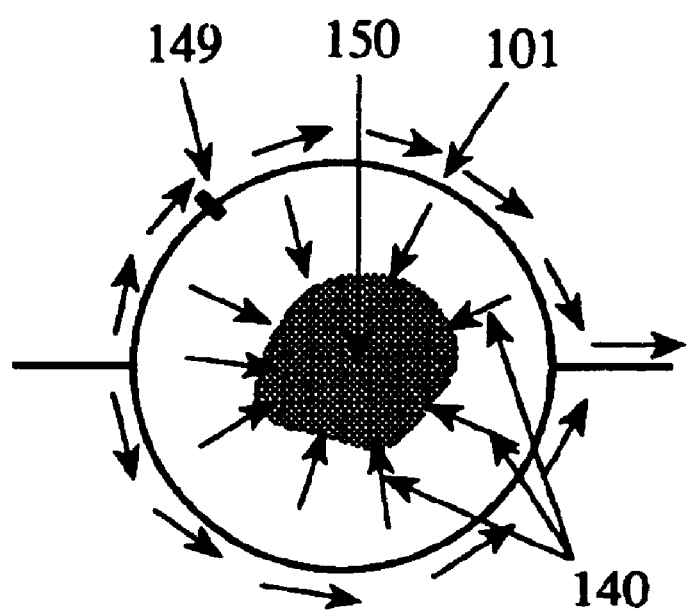
FIG. 35 is a cut-away view of a reactor core with fuel nozzle and electromagnetic fields induced across the sphere.

With a fusion fuel, such as D-T in plasma or pellet form, in place within the reactor core 101, a high voltage or magnetic differential is applied across the reactor core 101 just moments before the fuel is ignited. This step is critical, and occurs for all variations of this patent. The details of ignition depend on which method of fuel placement is used:

1) FIG. 35 corresponds to the ignition of approach 1 in FIG. 28. Approach 1 uses electromagnetic fields induced across the sphere to focus a tremendous surge of power to the center of the reactor core 101—expressed in terms of the Poynting Vector. This focused energy would compress, heat and confine the plasma. With strong enough spherical electromagnetic confinement fields 140—the actual magnitude would be dependent upon many design features—the centrally focused energy would ignite the fuel and a nuclear fusion burn would take place. This technique requires stronger spherical electromagnetic confinement fields 140 across the reactor core 101 relative to the other techniques of the present invention since the spherical electromagnetic confinement fields 140 are used not only for confinement but also for ignition.

Figure 36:
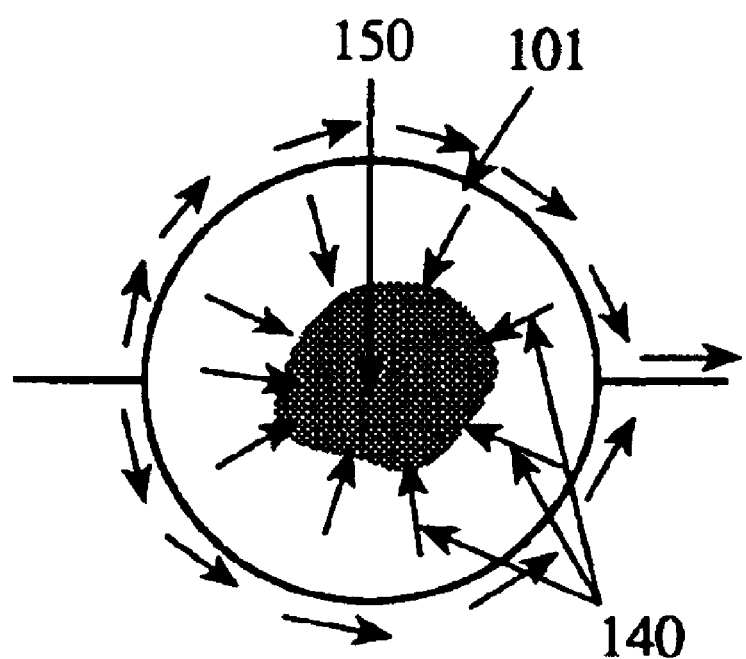
FIG. 36 is a cut-away view of a pre-fueled reactor core with electromagnetic fields induced across the sphere.

2) FIG. 36 corresponds to the ignition of approach 2 in FIG. 29(b). With approach 2, the electromagnetic fields induced across the sphere would focus a tremendous surge of power to the center of the reactor core 101—expressed in terms of the Poynting Vector. This focused energy would compress, heat and confine the plasma. With strong enough spherical electromagnetic confinement fields 140—the actual magnitude would be dependent upon many design features—the centrally focused energy would ignite the fuel and a nuclear fusion burn would take place. This technique requires stronger spherical electromagnetic confinement fields 140 across the reactor core 101 relative to the other techniques of the present invention since the spherical electromagnetic confinement fields 140 are used not only for confinement but also for ignition.

Figures 37A, 37B:
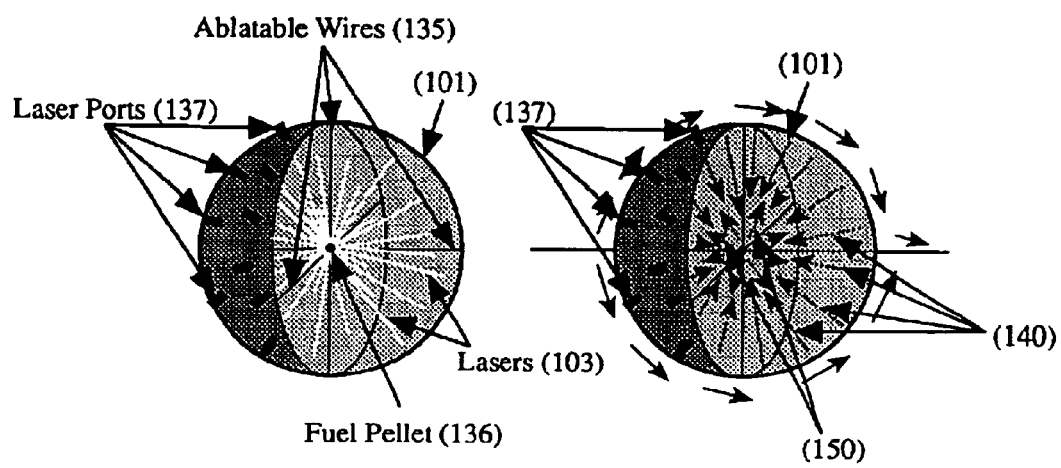
FIG. 37($a$) is a cut-away view of a reactor core with fuel imploded via traditional inertial confinement methods and electromagnetic fields induced across the sphere.

3) FIGS. 37(a) and 37(b) correspond to the ignition of approach 3 in FIG. 30. With the third technique, just as the spherical electromagnetic confinement fields 140 are growing in magnitude across the conducting layer 118 of the reactor core 101, the fuel pellet 136 is imploded with traditional inertial confinement methods. For example, external lasers 103, or ion beams would pass through laser ports 137 and focus on the fuel pellet 136. The key here is the timing—an electric voltage or magnetic differential must be set up across the reactor core 101 at the correct moment so that the spherical electromagnetic confinement fields 140 are induced so that they should reaching a maximum just prior to when the fusion implosion changes direction to become an explosion. Since the inertial confinement energy is applied directly to the fuel pellet 136 with relatively easy-to-use and understood inertial techniques, the required magnitude of the spherical electromagnetic confinement fields 140 are less with this technique. The spherical electromagnetic confinement fields 140 are not required to start ignition of the fusion process. The spherical electromagnetic confinement fields 140 are used to confine and lengthen the fusion burn, and extract energy via the MHD process.

Figures 38A, 38B, 38C, 38D:
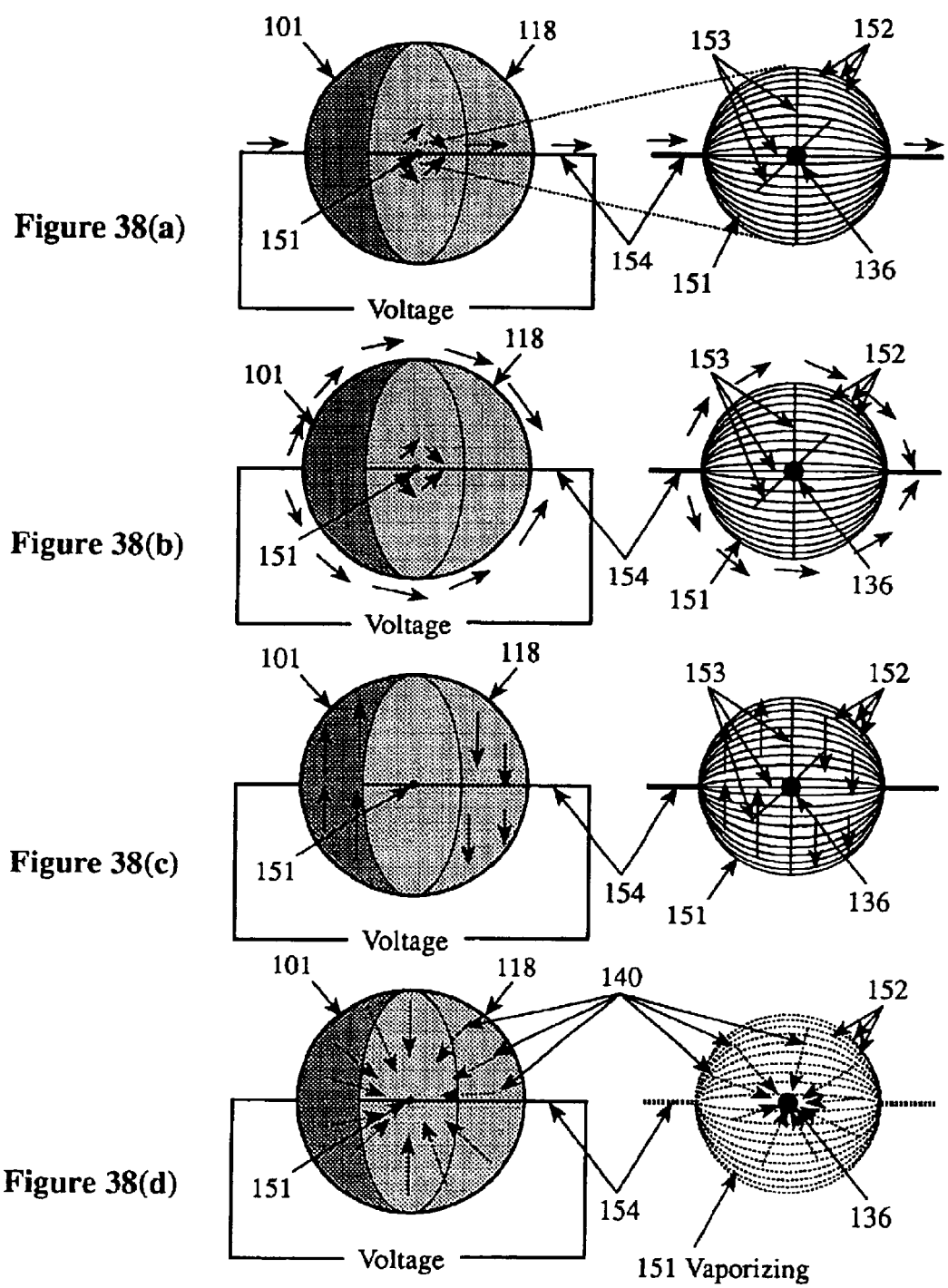
FIG. 38($a$) is an isolated cut-away view of a reactor core with voltage applied across the sphere.

4) FIGS. 38(a), 38(b), 38(c), and 38(d) correspond to the ignition of approach 4 in FIGS. 31 and 32. With the fourth technique, just as the spherical electromagnetic confinement fields 140 are building, the fuel pellet 136 is imploded with an "x, y, z" or, "spherical" pinch. This spherical pinch technique is enabled by passing a current through a thick conducting wire 154 that is strung within the reactor core 101—FIG. 38(a). As the massive spherical electromagnetic confinement fields 140 set up across the reactor core 101 area, some of the current will flow over the conducting layer 118 of the reactor core 101—FIG. 38(b) left—through the thick conducting wire 154, and through the thin conducting wires 152 of the spherical wire implosion cage 151—FIG. 38(b) right. This current will be far too massive for the thick conducting wire 154 and will vaporize it. (This is according to the ideas expressed in the section below on the exploding wire phenomena.) However, before the thick conducting wire 154 vaporizes, the current will also sweep across the thin conducting wires 152 of the spherical wire implosion cage 151. This current will be far too massive for the thin conducting wires 152 of the spherical wire implosion cage 151 and will also vaporize them. Magnetic fields will setup across the conducting layer 118 of the reactor core 101 and the spherical wire implosion cage 151 as is shown in FIG. 38(c). Due to the same geometry of electric and magnetic fields in both the conducting layer 118 of the reactor core 101 and the spherical wire implosion cage 151, the spherical wire implosion cage 151 will implode into the fuel pellet 136, FIG. 38(d) right, igniting the fusion reaction. The fusion reaction is further compressed and contained by the spherical electromagnetic confinement fields 140—FIG. 38(*d*) left—in the much larger, more massive, cooled, shielded and reinforced conducting layer 118 of the reactor core 101. In other words, if all goes as planned, the wire spherical wire implosion cage 151 implodes but the reactor core 101 does not.

Figures 39A, 39B, 39C, 39D:
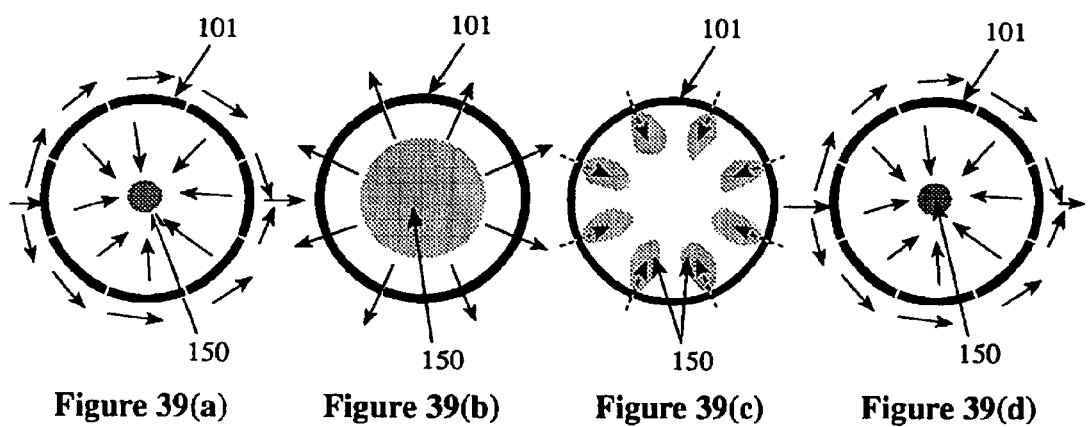
FIG. 39($a$) is a cut-away view of a reactor core with ignition caused by Poynting Vectors.

5) FIGS. 39(*a*), 39(*b*), 39(*c*), 39 correspond to the ignition of approach 5 in FIGS. 34(*a*), 34(*b*), and 34(*c*). With this technique, a plasma 150 is set up in the plasma container/shield 156, some of which will flood the inner volume of the reactor core 101. A massive electric voltage or magnetic differential is applied across the reactor core 101, inducing massive spherical electromagnetic confinement fields 140 across the core. The cross-product of this electromagnetic pulse, the Poynting Vector: compresses, heats, and ignites the plasma within the reactor core 101—FIG. 39(*a*). While the plasma external to the reactor core 101 would also be heated and compressed to some extent, by designing the plasma container/shield 156 to be large enough, it would not be heated and compressed sufficiently to ignite. Inside the plasma container/shield 156, the energy from spherical electromagnetic confinement fields 140 within the reactor core 101 concentrates the plasma. Outside the plasma container/shield 156, the spherical electromagnetic confinement fields 140 on the reactor core 101 will repel the plasma, heating and compressing it outwards. The plasma inside the reactor core 101 would be burned until the fuel dissipates and the fusion reaction stops. As the spherical electromagnetic confinement fields 140 over the reactor core 101 die off, the remaining plasma within the reactor core 101 is free to expand—FIG. 39(*b*). At some point, the pressure of the plasma outside of the reactor core 101 will be greater than the pressure of the plasma within the reactor core 101, creating a pressure difference. Then, the some of the remaining plasma external to the reactor core 101 would be sucked into the reactor core 101 due to the pressure difference—FIG. 39(*c*). At this point, the next massive electric voltage or magnetic differential would be applied across the reactor core 101, inducing another massive pulse of spherical electromagnetic confinement fields 140 across the reactor core 101 and the next fusion burn would occur—FIG. 39(*d*). This process has many similarities with an internal combustion engine, especially, with diesel engines.

MHD (MagnetoHydroDynamics)

When a nuclear fusion burn occurs in the center of the reactor core 101 in these reactor designs, the plasma 150 will suddenly expand. In each reactor design, the expanding plasma 150 is surrounded by a very strong spherical electromagnetic confinement field 140. MHD is the study of the properties of plasma 150 flows exposed to intense electromagnetic fields. The three critical factors needed for MHD energy production, a highly ionized and conductive plasma 150; a magnetic field; and a high plasma flow speed directed directly at the magnetic field (at a right angle to a magnetic field), are all included in these designs. What happens next in the fusion reactor designs described here can be described using the MHD effect:

1) The plasma 150 will suddenly expand. As it expands it will travel at high velocity directly towards the inner wall and the spherical electromagnetic confinement field 140 of the reactor core 101.

2) As the plasma 150 travels with high velocity towards the spherical electromagnetic confinement field 140, the ions in the plasma 150 will induce new electromagnetic fields, described here as "MHD fields 162" to contrast from the initial spherical electromagnetic confinement field 140, in the conducting layer 118 of the spherical reactor core 101. (There will be a superposition of spherical electromagnetic confinement field 140 and the induced MHD fields 162.)

3) These new MHD electromagnetic fields 162 will become apparent as a higher voltage, either electric or magnetic, across the conducting sphere 102 and can be tapped directly with high efficiency for use as electricity.

Figure 40:
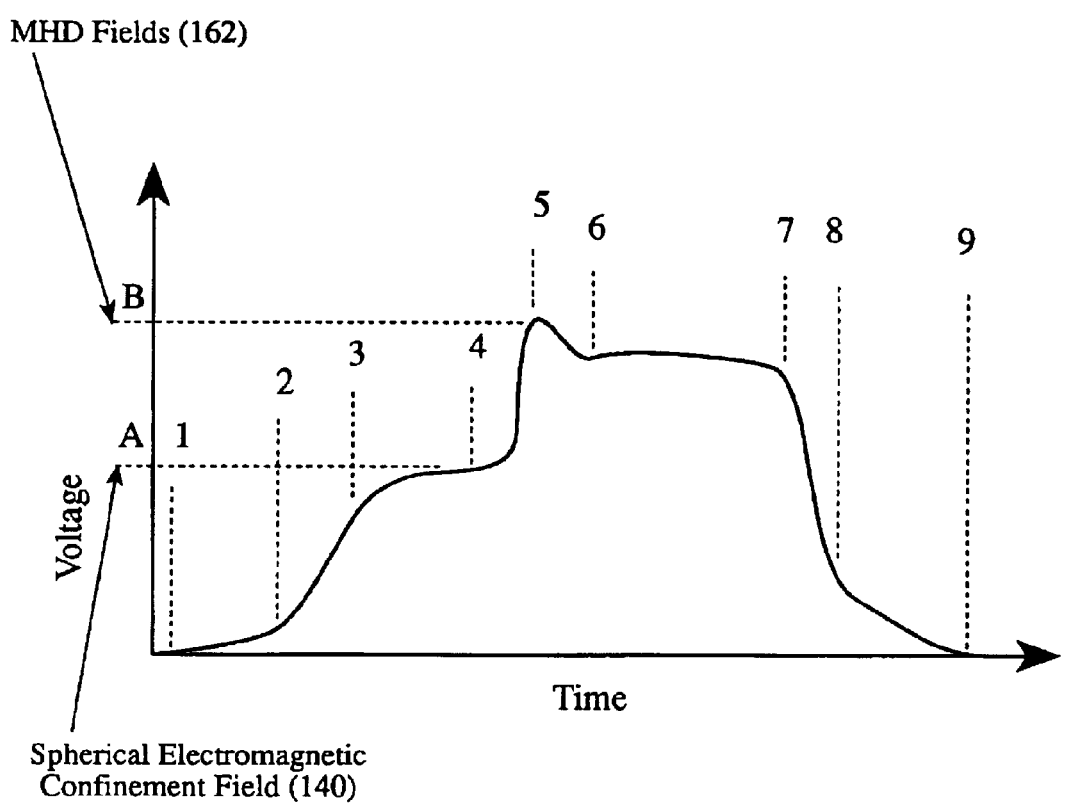
FIG. 40 is a graph of voltage versus time for one cycle of the fusion reaction.

This process can be analyzed by looking at a graph in FIG. 40, which is assumed to approximate the voltage across the core versus time. (This graph depicts the reactor core 101 operating in the Electric Mode.)

1) At time 1, there is no voltage across the reactor core 101, but it is just starting to rise.

2) At time 2, the main electromagnetic wave hits the reactor core 101 as the voltage starts to quickly rise. This spherical electromagnetic confinement field 140 is created by energy applied to the reactor core 101 from external sources. The energy lost in this process is the largest portion of lost energy that must be made up by the fusion process in order for break-even energy productions to occur.

3) Time 3 is found by performing experimental tests on each specific reactor design. This is the time when the voltage stops rising sharply and starts to level out. This is a critical moment. It is the time when the ignition of the fusion fuel must occur.

4) At time 4, the confining voltage has just reached its peak and the fusion burn is starting to explode. At this moment, the spherical electromagnetic confinement field 140 is just starting to react to the charged ions that are rapidly approaching it from within. The height of the voltage at this point has the value "A" and is an important design parameter.

5) Between time 4 and 5, the voltage suddenly spikes. This increase in voltage from "A" to "B" is the induced MHD 162 voltage. The combined fields resist, and potentially stops the plasma 150 instabilities 139. The reactor core 101 and conducting circuit must be designed to withstand this maximum spike. This height difference—B minus A—must be less than the voltage A by 5–10% for safety sake. Otherwise, the MHD voltage will be greater than the confining voltage, and the voltage polarity could suddenly reverse, with dangerous consequences. This spike in voltage should be relatively brief and will end as the initial major instabilities 139 are suppressed and dampened.

6) At time 6, the plasma 150 has had its initial major instabilities 139 suppressed and dampened. However, smaller, numerous instabilities 139 continue to keep the average voltage relatively high. This excess voltage is where most of the useful energy will be extracted. The electrical circuit must be designed to tap off the voltage difference between voltage level B and A. If the confining voltage were to drop below A, then the fusion explosion could breach the spherical electromagnetic confinement field 140. (To maximize the length of the burn at this stage, more fusion fuel is needed. However, if the fusion burn starts with more fuel, the peak voltage back at time 5 would be higher. This would require bigger, stronger, more complex reactors. Instead of starting with more initial fuel, it would be better to add fuel after time 6 in small increments.)

7) At time 7, the fusion burn has expended the bulk of its fuel, and the instabilities 139 stop having enough energy to push against the spherical electromagnetic confinement field 140.

8) At time 8, without the addition of new fuel to the burn, the fusion process has stopped. The electrical circuit must be designed to monitor voltage and cut off the any remaining confining voltage when this drop occurs.
9) At time 9, the voltage has dropped to zero. In initial designs, there would now be a period for cooling, safety checks, and maintenance. Then, the cycle would be repeated.

The main source of energy losses in these types of fusion reactors will come from resistive heating of the reactor core 101 and conducting spheres 102, which can be cooled, the heat being used as a secondary energy source by driving steam powered turbine generators. Depending upon the design of the reactors it will be possible to create AC or DC electricity. Additional circuitry will be required to transform and condition the electrical energy produced for the needs of the power grid.

Magnetohydrodynamics and Plasma Instabilities

The main difficulty in all prior attempts at nuclear fusion has been various instabilities 139 in the plasma 150 that suddenly stop the fusion reaction and frequently damage the reactor. Fundamental to the present invention is the contention that these instabilities 139 themselves are very strong and stable. Furthermore, the sudden strength of these instabilities 139 is a result of the cross-product of the electric and magnetic fields in the plasma 150 caused by the sudden acceleration of ions by the ignition of the fusion burn. In essence, all instabilities 139 have been induced by time varying, or area varying electromagnetic fields. They could be collectively called, "induced Poynting Vector Fields."

For example, in Tokamak reactors, as the electric fields and magnetic fields that confine and heat the plasma 150 build, the plasma 150 rotates faster and faster in the torus. Eventually, when the fusion burn starts, the plasma 150 is accelerated in new directions, at magnitudes much greater than the those at which the plasma 150 rotates in the reactor, inducing a powerful cross product of electric and magnetic fields, in directions that cannot be anticipated and counteracted in time. Without an appropriate containment field existing prior to the development of the instability 139, the induced Poynting Vector is too powerful and it pushes the instability 139 too powerfully to be contained. Inevitably, the containment fields collapse and the plasma 150 quickly cools, stopping the fusion burn.

Benefits of Spherical Electromagnetic Confinement Field

Many prior designs, such as Tokamaks, have not utilized spherical containment geometries. While inertial confinement reactors have used spherical geometries for inertial confinement, they have not utilized active electromagnetic confinement after the fusion burn starts. One of the benefits of spherical electromagnetic confinement field 140 as described in the present invention is that the perfect symmetry of the sphere minimizes initial instabilities 139 within the reactor core 101. By minimizing these instabilities 139, the time of the fusion burn is maximized. Some instabilities 139 are still expected to form inside these types of reactors. These instabilities 139 will be identical to other previous attempts that used spherical inertial confinement techniques, such as laser implosion of spherical D-T pellets.

However, in the new fusion reactor designs of the present invention, it is exactly these instabilities 139 that will drive the MHD process and be used to extract the fusion energy as useful electrical energy. In earlier spherical inertial techniques, the plasma 150 was allowed to expand and cool without attempting to confine the plasma 150 after the initial burn. Another benefit is that the expanding plasma 150 will automatically interact with spherical electromagnetic confinement field 140 at a 90° angle, the best angle for meeting a requirement for the MHD process. Thus, the main benefits of having a spherical electromagnetic confinement field 140 existing prior to the fusion burn are: the fusion burn will be contained, the fusion burn will last longer, the fusion burn will push out on the spherical electromagnetic confinement field 140 at a 90° angle, and by pushing against the spherical electromagnetic confinement field 140 a 90° angle, the plasma 150 will create energy in a MHD fashion.

Charged Particles/Neutral Particles Ratio

A fusion plasma 150 is made of both charged particles, e.g., electrons, protons, etc., and neutral particles, neutrinos, and neutrons the primary examples. Charged particles will interact strongly with the confining fields. Since neutral particles still have a magnetic moment, it is expected they will interact at least weakly with the confining fields. However, it is better to have a higher percentage of charged particles in the plasma 150 and a lower percentage of neutral particles. It is assumed that the fusion fuel mixture will have some affect on the percentages of charged and neutral particles in the plasma 150. For example, a D—D mixture may be better than a D-T mixture, or perhaps, the other way around. In these early designs, attempts at fine tuning the percentage of charged to neutral particles by varying the percentages of fuel ingredients will be ignored.

MHD Interaction in Spherical Electromagnetic Confinement Fields 140

In the types of reactors of the present invention, as an instability, appearing as a jet of plasma 150, travels with a velocity V away from the center of mass of the fused material at the center of the reactor core 101 and towards the spherical electromagnetic confinement field 140, essentially, always at a right angle to the electric and magnetic fields, as a result of the geometry of the sphere, the electrical charge of the moving plasma 150 will interact with the confining electric and magnetic fields via the MHD effect. Creating this geometrical interaction is one of the key factors distinguishing these designs and prior art. This interaction will induce the magnitude of the spherical electromagnetic confinement field 140 to higher levels. In an electric mode, the voltage across the reactor core 101 will increase. In a magnetic mode, the magnetic differential across the reactor core 101 will increase. The increase in the magnitude of the spherical electromagnetic confinement field 140, the MHD fields 162, will be proportional to the magnitude of the energy of the charged particles in the instability. Since there exists a preexisting confinement field at the time of the fusion burn, and since the instability 139 induces new confining fields in direct proportion to the size of the instability 139, the instability 139 should dissipate and be confined. If instabilities 139 are not dissipate and confined, a viable commercial reactor is still possible. However, it would make sense to increase the spherical electromagnetic confinement field 140 until instabilities 139 are confined.

Preexisting Confining Field Versus Induced Confining Field

Thus, the magnitude of the electric and magnetic fields over the reactor core 101 can be thought of as having two components: the preexisting spherical electromagnetic confinement field 140, and the induced spherical electromagnetic confinement field 162. If the combination of the strength and induced MHD field 162 strength is designed to be greater in strength than the largest instability, then the fusion burn will remain essentially spherical but pulsating until the fuel runs out.

Plasma particles, especially in the form of neutral particles, may penetrate the spherical electromagnetic confinement field 140 if it is not designed to have a large enough initial strength. If too much energy is lost through neutral particles, then the fusion process will halt, and damage to the reactor could occur.

Figure 41:
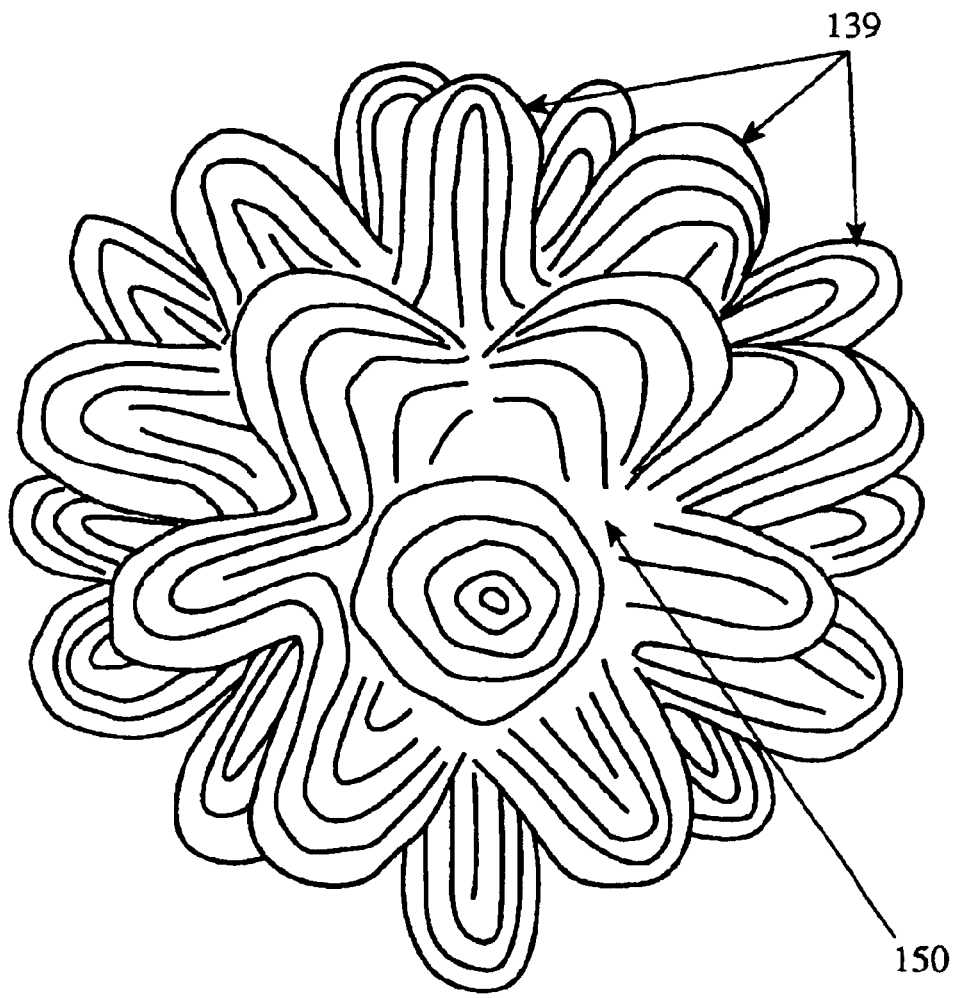
FIG. 41 is a three-dimensional view of plasma.
Figure 42:
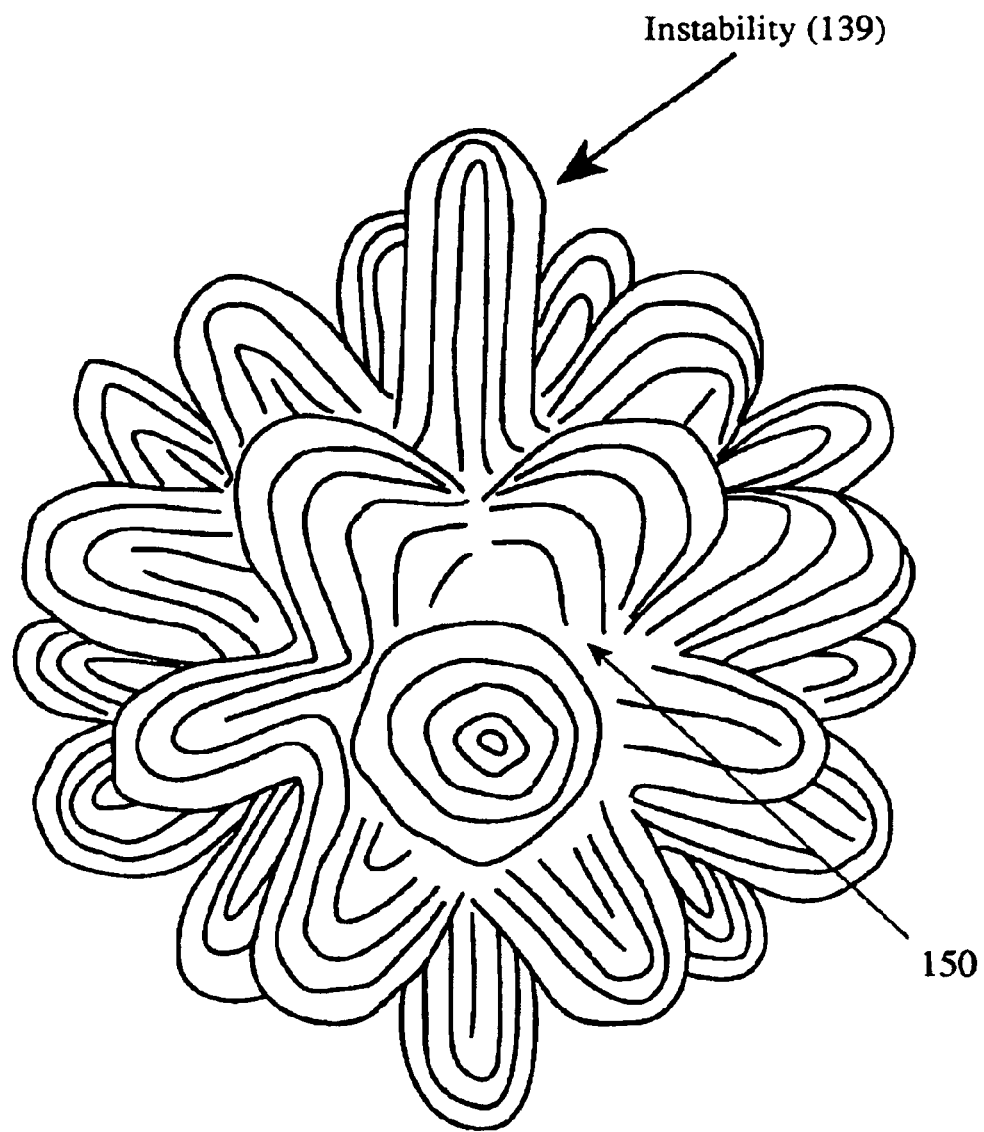
FIG. 42 is a three-dimensional view of plasma with an instability.

Description of an Example Non-Harmonic Instability Interacting with the Spherical Electromagnetic Confinement Field FIG. 41 shows what the plasma 150 instabilities 139 would look like for a spherical target shortly after the implosion reverses direction to become an explosion. At the point the plasma wall changes direction, the plasma 150 will have a geometry approximating a sphere. Shortly after starting to explode, instabilities 139 on the surface of the sphere would start to appear. At this early stage, they would look something like knobs or bumps. While this is an approximation of the plasma shape, actual instabilities 139 similar to these have been observed in plasmas 150. As the instabilities 139 worsen, they will grow in length. Also, the diameter of the central core of the plasma 150 will expand. For this example, it is useful to examine just one expanding instability 139 and ignore the others as if they were not expanding. The example of non-harmonic instability 139 is indicated in FIG. 42.

If these reactors become totally efficient at eliminating jets of instabilities, it is assured from theory that the entire plasma 150 will act like a pulsating ball and will still interact with the spherical electromagnetic confinement field in an MHD fashion.

Figure 43:
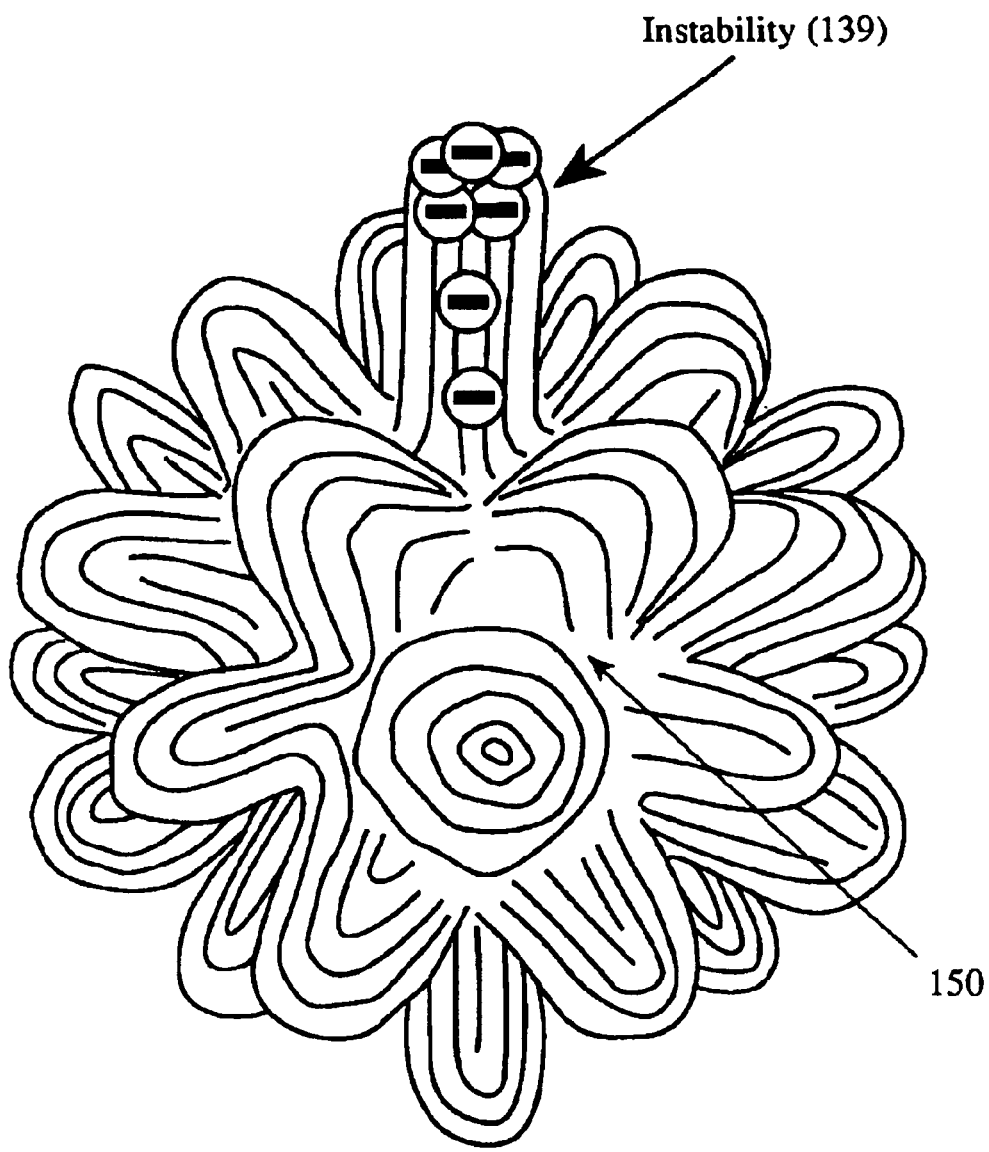
FIG. 43 is a three-dimensional view of a negatively charged plasma instability.
Figure 44:
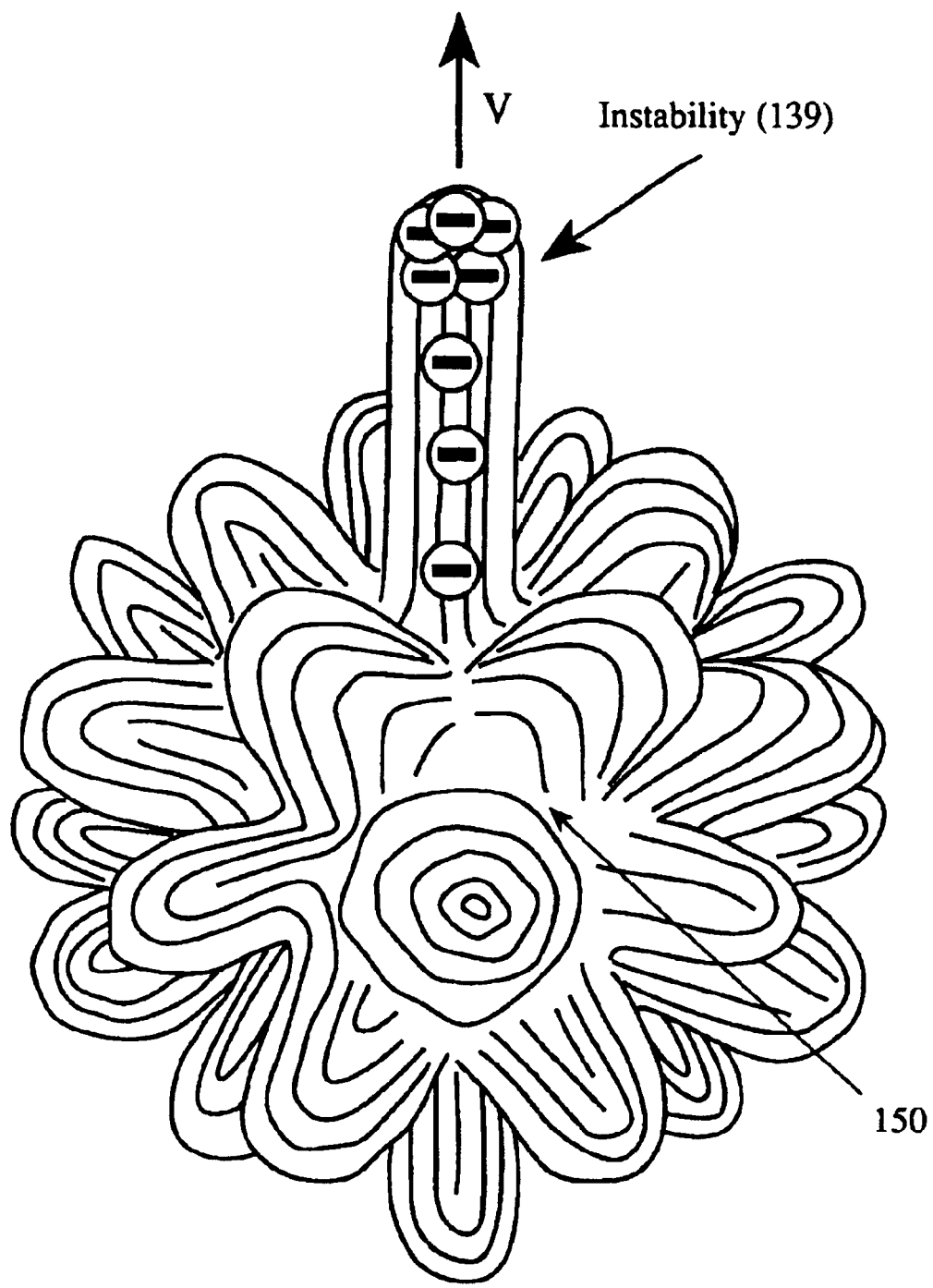
FIG. 44 is a three-dimensional view of an expanding negatively charged plasma instability.

This non-harmonic instability 139 is made up of plasma 150. The plasma 150 is primarily made up of charged particles. The charged particles on the outside of the plasma 150 are more likely to be the lighter particles, and therefore negative electrons, as shown in FIG. 43. It does not matter for this example what the charge of individual ions in the plasma 150 is, however. If the charge of the ions were positive, the net results would be the same. The example non-harmonic instability 139 is shown in FIGS. 43 and 44 moving away from the center of the plasma 150 towards the confining wall of the fusion reactor with a velocity V. In essence, it is acting as a powerful current.

Figure 45:
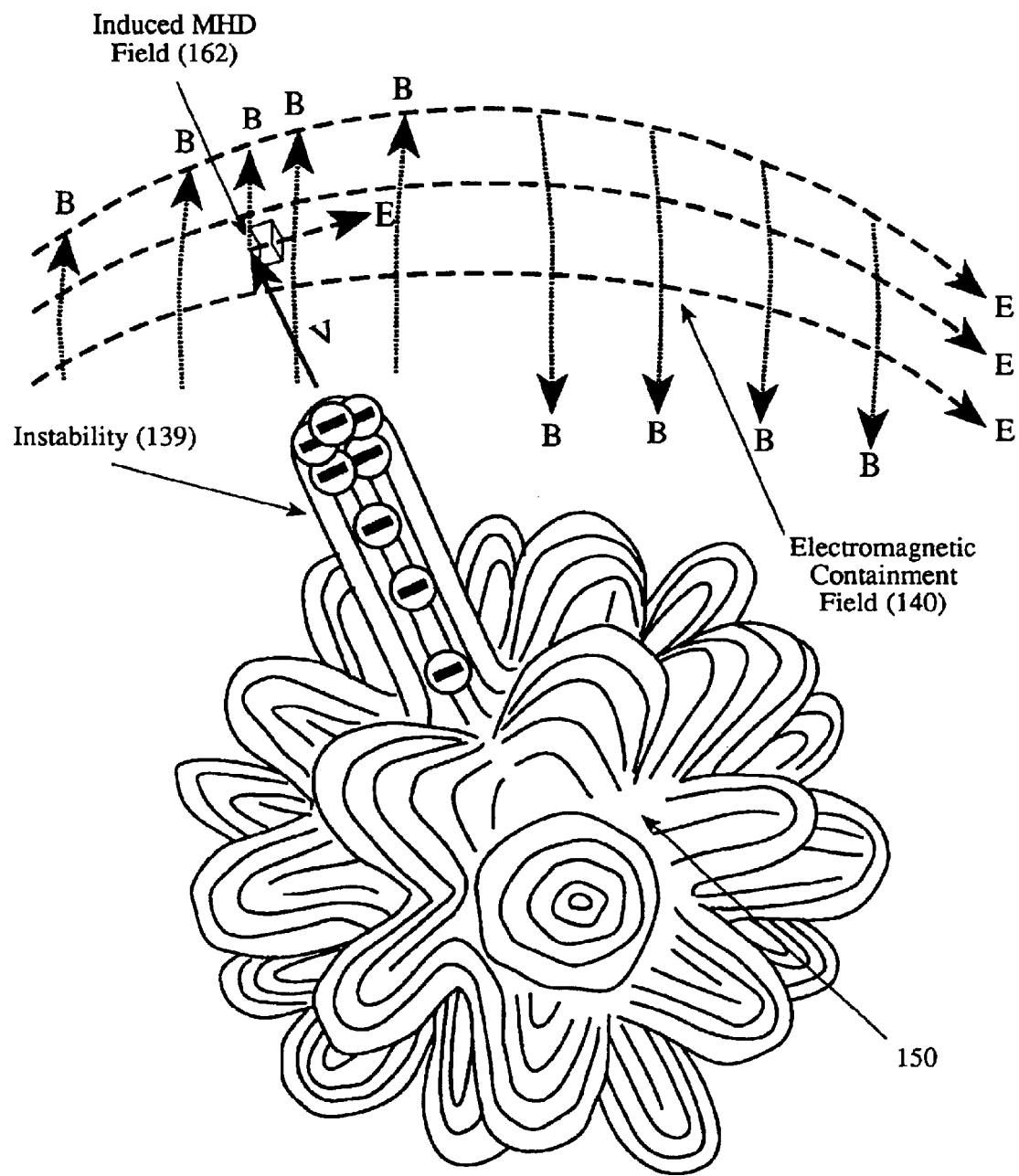
FIG. 45 is a three-dimensional view of a negatively charged plasma instability interacting with an electromagnetic containment field.

In the fusion reactor designs described for the present invention, the currents from the exploding instabilities 139 interacts with the spherical electromagnetic confinement field 140, shown in FIG. 45. Analyzing the example non-harmonic instability's 139 current for an arbitrary angle of interaction with the spherical electromagnetic confinement field 140, in this example, acting in an electric mode, is shown in FIG. 45.

There are only two possible ways the non-harmonic instability 139 may interact with the spherical electromagnetic confinement field 140. First, the non-harmonic instability 139 may induce new electromagnetic fields, MHD fields 162, that will combine with the preexisting spherical electromagnetic confinement field 140 creating a more powerful spherical electromagnetic confinement field 140. Second, the non-harmonic instability 139 may be blocked by the spherical electromagnetic confinement field 140. In essence, the non-harmonic instability's 139 growth will halt. If instabilities 139 are halted, then the fused material plasma 150 fuel at the center of the reactor core 101 will stay essentially spherical and harmonic, perhaps pulsating. With these types of reactors, both the possibility that the spherical electromagnetic confinement field 140 will be increased, or that the fused material plasma 150 fuel will stay spherical and harmonic are good. Because a non-harmonic instability 139 induces the spherical electromagnetic confinement field 140 to higher values, its energy is dissipated and it is blocked. If the non-harmonic instability 139 is blocked, the fusion burn will last longer. If the non-harmonic instability 139 induces new electromagnetic fields, MHD fields 162, that combine with the spherical electromagnetic confinement field 140, then the voltage, if in the electric mode, or the magnetic differential, if in the magnetic mode, across the reactor core 101 will increase and will be available for creating useful electric energy by induction through the coils located around the containment circuit. It is expected that both interactions will occur.

Looking closely at the details, the instability's 139 current intersects with the existing electric and magnetic fields of the confining fields. The intersection occurs at right angles. To summarize:

The non-harmonic instability's 139 plasma 150 current intersects the spherical electromagnetic confinement field 140 at a right angle.

The confining electric and magnetic fields were already at right angles, by design.

The current must induce higher electric and magnetic fields—MHD fields 162—in the spherical electromagnetic confinement field 140. Thus, all the requirements for inducing energy via MHD process are present.

There are many implications of the interaction between the instabilities 139 and the spherical electromagnetic confinement field 140:

1) The instabilities 139 will induce higher voltages or magnetic differentials across the reactor core 101.
2) The instabilities 139 will be blocked.
3) The instabilities 139 will be prevented from growing in the first place, in essence the plasma 150 will remain harmonic.
4) The spherical electromagnetic confinement fields 140 will sap the energy of growing instabilities 139.
5) The fusion burn will last longer.
6) The plasma 150 will be compressed to greater densities.
7) The plasma 150 will reach higher temperatures.
8) The more powerful any particular individual non-harmonic instability 139 is, the more powerful the induced MHD field 162 will be. The resulting combination of the spherical electromagnetic confinement field 140 and the MHD field 162 will be powerful enough to block the non-harmonic instability 139.
9) Large instabilities 139 are not likely to occur, since the spherical electromagnetic confinement fields 140 will inhibit and block their formation, and sap their energy before they can grow to be large
10) The initial harmonics of the spherical electromagnetic confinement field 140 will have an effect on how harmonic the fusion burn proceeds. Thus, it is beneficial to take all precautions in order to help the initial spherical electromagnetic confinement field 140 to be highly harmonic.
11) Non-harmonic spherical electromagnetic confinement fields 140 may allow a strong instability 139 to burst through the spherical electromagnetic confinement fields 140, possibly even helping or causing the non-harmonic instability 139 to grow. As such a non-harmonic instability 139 bursts through the spherical electromagnetic confinement field 140, a dangerous jet of plasma 150 will exist that could burn through very thick protective shields. Thus, catastrophic failure must be planned for. For example, if a powerful plasma 150 jet punctures the double walls of the reactor shield, which is filled with coolant 130, then, the coolant 130 could suddenly explode. This requires that the reactor has an outer shield.
12) The initial confining fields must be stronger than the average large non-harmonic instability 139, otherwise possible combinations of the added MHD fields 162 and spherical electromagnetic confinement fields 140 could occur that would flip the polarity of the voltage across the reactor core 101, or flip the magnetic field across the reactor core 101.

13) The plasma 150 will spherically pulsate, like a ringing bell, with a characteristic frequency that depends on many variables of the reactor design. This pulsing plasma 150 will create pulses of energy in the output circuit that will need a dampening mechanism before the current can go out into the power grid, most likely large capacitor banks. However, the entire confinement circuit will act as such a dampening mechanism. The peaks in the pulses will occur at the point the plasma 150 is expanding outward with maximum acceleration. In designs with two or more reactor cores 101, an outward pulsation in one core 101 can be used to compress another reactor core 101.

14) Smooth harmonics within the initial spherical electromagnetic confinement field 140 will be reflected within the plasma as longer, smoother burns.

15) Poor quality harmonics within the initial spherical electromagnetic confinement field 140 will be reflected within the plasma with shorter, non-smooth burns, possibly catastrophic rupturing of conducting spheres 102, reactor core(s) 101, coils, the electrical bus 107, and other components.

Reactor Efficiency

The overall efficiency of this type of nuclear fusion reactor can be roughly estimated by multiplying the percent of energy carried away from the fusion burn by charged particles by the percent of energy converted directly to electricity by the MHD process in the conducting wall of the reactor core 101. For example, if 90% of the energy of the fusion burn is carried away in the form of charged particles, and if 10% of the energy created by the MHD process is lost to thermal interaction within the conducting wall of the reactor core(s) 101, conducting spheres 102, electrical bus 107 and other components, then the theoretical efficiency of such a reactor would be 81%. The actual final efficiency would be somewhat less due to thermal losses in the conducting spheres 102. However, some of the lost heat in the reactor core(s) 101 and conducting spheres 102 can be recovered using steam drive turbine generators.

Eventually, it might be possible to design the reactor core(s) 101 and conducting spheres 102 of such reactors with super conducting materials. The efficiency of such a design could approach 100%. The only loss in efficiency would be due to neutral particles that can penetrate the confining field or add thermal losses to the reactor wall.

An unknown at this point is if the so-called "neutral" particles will also be deflected or slowed by the spherical electromagnetic confinement fields 140. Most neutral particles have magnetic moments that may allow the neutral particles to be deflected to some extent by the massive spherical electromagnetic confinement fields 140. Also, it is possible, that while a neutral particle is "overall" neutral, it may have small, localized spots of electric and magnetic charge that may interact strongly with the confining fields rather than weakly. Thus, even the energy of neutral particles may be absorbed by the confining fields of these reactor designs, pushing these reactor design's efficiency to higher levels.

Active Versus Passive Monitoring of Instabilities

There have been attempts to actively monitor confining fields in other types of reactors, such as in Tokamaks and Spheromaks, in order to actively increase the confining field strength when an instability 139 occurs. With the designs of the nuclear fusion reactors in the present invention, the spherical electromagnetic confinement fields 140 are passively, i.e., without computer interaction, self-healing. The confining forces are automatically electromagnetically induced to greater values, the MHD fields 162, by the non-harmonic instability's 139 MHD interaction with the spherical electromagnetic confinement fields 140. This process automatically closes the "wound" in the spherical electromagnetic confinement field 140, thus preventing the plasma 150 from bleeding through. With these designs, there is no need to create sensors or a computer controlled feedback system to try to monitor and respond to the instabilities 139.

Burn Duration

If the reactor core 101 can be engineered to have enough strength, heat dissipation capability, and current carrying capability, greater than the rate at which energy is released by the fusion burn, then it would be possible to contain the plasma until the fusion fuel is almost totally consumed. Fusion burns of minutes or even hours in duration are possible. With the "No-Core" design, fusion burns of indefinite length are possible. In some designs, plasma injectors 146 could continuously inject small amounts of new fuel into the reactor core 101 to keep the fusion burn going.

The Danger of Polarity Reversals

As the fusion burn is proceeding, it is possible to describe the spherical electromagnetic confinement fields 140 on the reactor core 101 in two parts: the initial spherical electromagnetic confinement fields 140 created by the voltage or magnetic field across the poles of the reactor core; and the later, plasma induced MHD fields 162. One potential problem in the nuclear fusion designs of the present invention is the electric and magnetic fields induced by the MHD process, the MHD fields 162, could be greater than the initial confining fields 140. If the induced MHD fields are less than the original confining fields, then current or magnetic flow will remain in the same direction, the MHD fields 162 will add to the confining fields 140. This will manifest itself by the voltage or magnetic field across the conducting spheres and the core suddenly increasing. On the other hand, the danger exists that if the induced MHD fields are larger in magnitude than the original confining fields, then current flow or magnetic field in the confining circuit could suddenly reverse direction. This could manifest itself by the voltage across the conducting sphere suddenly flipping values from + to −, to the values − to +, or the magnetic polarity flipping the values from N to S, to the values S to N.

It does not matter which direction an increased voltage or magnetic field appears across the reactor core 101, the higher voltage or magnetic field could be utilized in either direction. However, it would be better to know, and control, which direction the current or magnetic fields will flow for safety reasons. A sudden change in current flow or magnetic fields could explode or vaporize equipment involved. Thus, a major design feature would be to design the yield of the fusion fuel to be less than the peak energy-absorption capability of the reactor. This capability is a function of many design features which include: the total mass and material types of the reactor core 101; the thermal heat dissipation capability of the reactor core 101; the active cooling capability of the reactor (whether normally conductive or super conductive); the conductivity of the reactor core 101 as a function of time and temperature over the course of the burn; the capacitance and inductance of the confining circuit; and the ability of the electrical circuit to carry away the net MHD electricity, which is also a function of the circuits maximum current load, capacitance, inductance, and conductivity.

Figure 46:
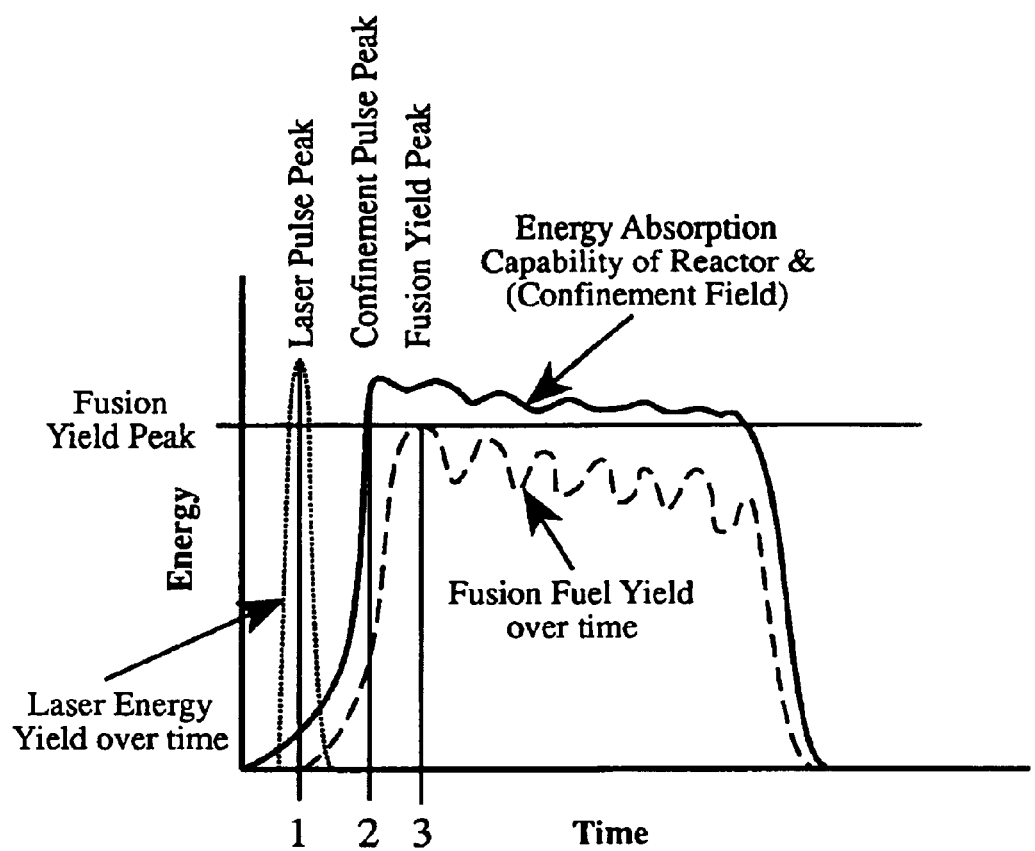
FIG. 46 is a graph of energy versus time for the fusion reaction.

Thus, the yield of the fusion fuel must be tailored to be less than the peak energy absorption capability of the reactor. This can be visualized in the FIG. 46. Key details in FIG. 46 are:

1) The peak of the fusion fuel yield is lower than the peak energy the reactor can absorb.
2) The reactor can absorb the energy faster than the energy will be released from the fusion burn. This is shown by the reactor's peak at 2 coming before the fuel's peak at 3.
3) The long-term ability of the reactor to absorb energy should be greater than the peak energy release from the fusion fuel for safety considerations. For example, if a reactor core 101 with manufacturing imperfections was accidentally used, an abnormally large non-harmonic instability 139 could occur and damage other areas of the reactor.
4) This graph also depicts the expected time-varying release of energy from the fusion fuel due to its interaction with the fusion reactor's confining fields. The yield pulsates up and down. This pulsing in the yield would induce pulsing in the spherical electromagnetic confinement fields 140.
5) The length of the fusion burn, as depicted in this graph, is partly dependent on the initial strength of the spherical electromagnetic confinement fields 140. If they can not be maintained, then the fusion burn will cease before the fusion fuel is consumed.

This situation could be considered with an analogy using a hydroelectric dam. A hypothetical dam is designed, with an empty reservoir, that would be big enough and strong enough to stop a massive tidal wave and then, in a controlled fashion, let the water pour out through the penstocks to electrical generators. The reactor cores 101 of these reactor designs would be like the dam. Just as the dam must be strong enough to stop the initial tidal wave, the reactor core's 101 physical and electromagnetic strength must be strong enough to stop the fusion explosion. The penstock and generator is like the electrical circuit in these reactor designs. Just like the penstock must have enough capacity for water to flow out and relieve the sudden pressure of the tidal wave before the dam would burst, these reactor's electrical circuits must have enough capacity for the electricity to flow out before the reactor core 101 or circuit would electrically burst.

Initial Critical Design Considerations

Initial critical design considerations for these reactors include:

1) A mechanism to place the fusion fuel inside the reactor core 101.
2) A mechanism to start an ignition burn inside the spherical reactor core 101.
3) Design the reactor core 101 so that massive spherical electromagnetic confinement fields 140 can be supported. Estimated sustained minimum induced magnetic field to be in the range of 0.5–5 Tesla. Estimated peak magnetic field to be withstood briefly without bursting to be in the range of 2–100 Tesla.
4) Design the reactor core 101 to withstand massive forces from its electrons, which will cause Coulombic heating, Hall-effect forces, and others.
5) Design the reactor core 101 so that it will not implode from the initial transport of confining energy, or explode from the latter fusion explosion.
6) Design the reactor core 101 so that it can be cooled, without the cooling process affecting the spherical harmonics of the reactor core's 101 spherical electromagnetic confinement fields 140. Active cooling during the fusion burn may not be as important as exceptional pre-burn and post-burn cooling ability.
7) Design an electrical circuit that can transfer to, and carry away from the reactor core 101 extremely high electrical currents and maintain extremely high voltages.
8) Design a secondary cooling system that utilizes thermal heat from the reactor core 101, containment circuit and electrical circuit to power steam generators and increase efficiency.

High Voltage Containment Circuit

As shown in FIG. 12 and FIG. 13, the type of circuit needed for containment of the plasma can be quite simple. In the electric mode, it consists of a high voltage across a conducting sphere 102. In the magnetic mode, it consists of high magnetic voltage across a conducting sphere 102. The points of contact between the conducting wire and the reactor core 101 define the poles of the sphere. However, while the circuits are simple, there are quite a few engineering hurdles that need to be solved in order safely maintain such a circuit and tap off the excess fusion energy.

The Exploding Wire Phenomena

Figure 47:
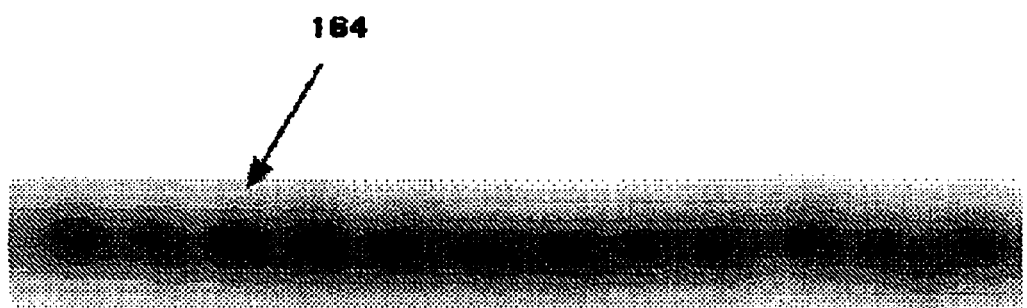
FIG. 47 is a cross-section view of regularly spaced transverse striations from an exploded wire.
Figure 48:
FIG. 48 is a cross-section view of transverse striation from a wire exploded by increased energy.
Figure 50:
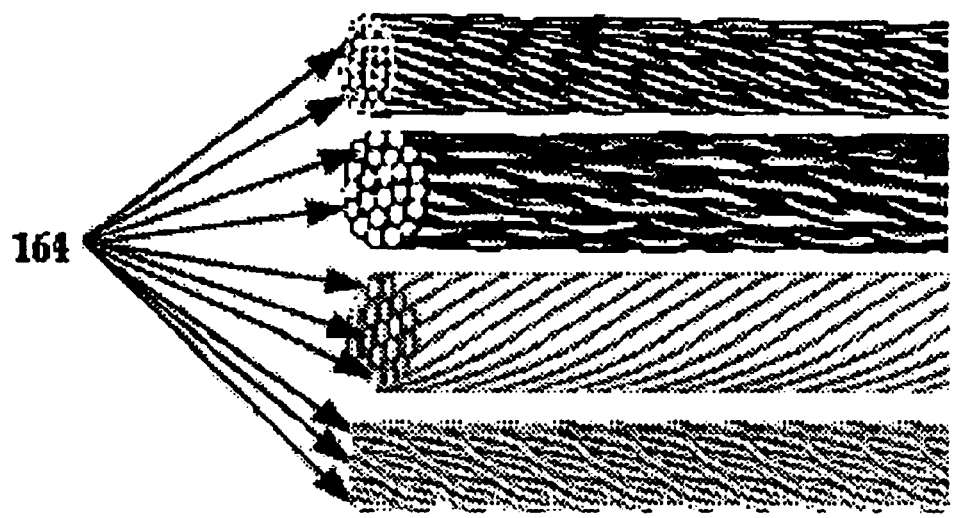
FIG. 50 is a cross-section view of stranded wire designs.

When a large enough voltage is placed across a conducting wire 164, it will vaporize and explode. If a conducting wire 164 is exploded over a white background surface, the background surface will show regularly spaced transverse striations as is shown in FIG. 47. Exactly how the conducting wire 164 explodes depends on many variables: wire composition, voltage, wire resistance, wire length, wire diameter, initial wire geometry, etc. For example, FIG. 50 shows thin strands of wire woven in complex patterns. These patterns are used to create cables resistant to this effect for use between lightning rods and grounding poles. As wire is exploded with increasingly more energy, the striations become sharper. An example is shown in FIG. 48.

In general, these striations are a result of spherical electromagnetic waves sweeping through the wire. Where the spherical waves come to a point, or node, in the waves, the electromagnetic fields become stronger, and move the electrons in the conductor faster. In essence, the heat becomes more intense at the nodes than at the antinodes. This disparity in temperature vaporizes the conducting wire 164 locally at the nodes first. This creates the dashed pattern observed from exploding conducting wires 164 as shown in FIGS. 47 and 48. Induced magnetic fields, which result from the fast moving ionized plasma 150, further confines the exploding plasma 150 helping to direct the flow of the instabilities 139. An example of how the electromagnetic waves vaporize the wire locally at the nodes can be seen in FIG. 49.

Figure 49:
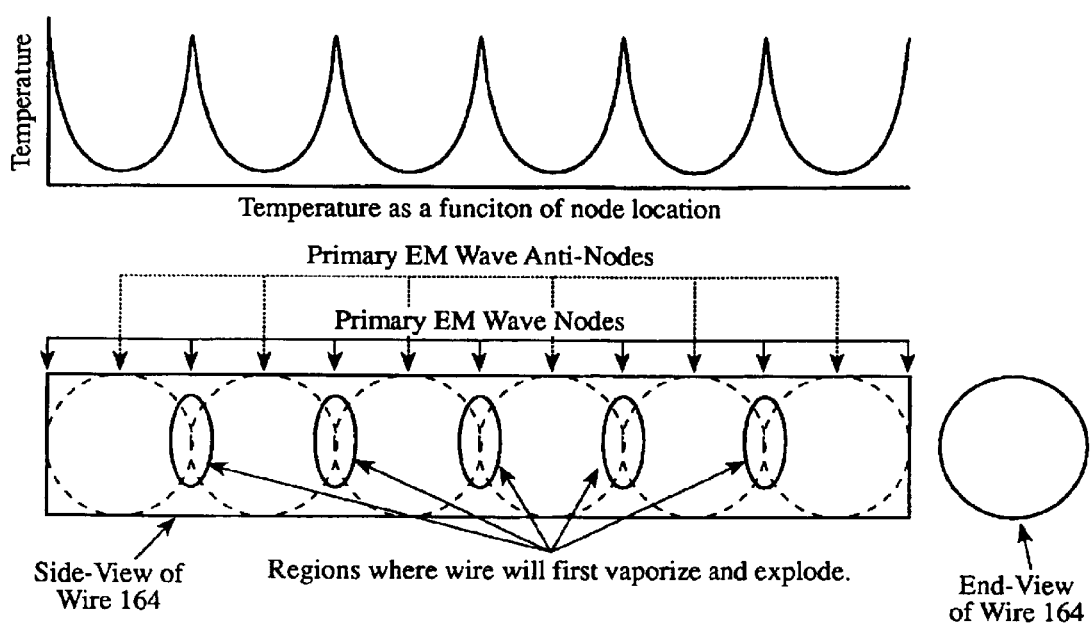
FIG. 49 is a graph of temperature v. temperature as a function of node location.

In the lower part of FIG. 49 is the side and end profile a round conducting wire 164. When a high-voltage current is set up across the conducting wire 164, the most likely wave-form for the electromagnetic wave, that sweeps over the conducting wire 164, to take is a spherical wave where the wavelength is equal to the diameter of the conducting wire 164. Other wavelengths and wave-forms are possible, and can be greatly affected by how the voltage is connected to the conducting wire 164.

At the nodes of the waves, the local temperature is dramatically higher than at the anti-nodes. At the nodes, the electric field is focused to a very small spot. This intense electric field will induce local electrons to extremely high temperatures and velocities. This effect creates localized regions along the conducting wire 164 that vaporize and explode first, that is, before vaporizing other areas such as at the anti-nodes. These localized regions of exploding plasma 150, while primarily caused by focused electrical fields, will be further constrained by a radial pattern of intense magnetic fields curving around the conducting wire 164 according to alternating left-hand and right-hand rules. The sharp "spikes" that are evident in the more violent examples of exploding conducting wires 164, as shown in FIG. 48, are caused by induced magnetic fields that axially confine the thin jets of plasmas 150 as they move away from the core of the conducting wire 164. Thus, magnetic fields take at least two distinct forms. They curve around the conducting wire 164, and they curve around the jets of plasma 150 shooting away from the conducting wire 164 at approximately right angles. The danger of exploding the conducting wires 164 in the circuits required for these nuclear fusion reactors is not just great. If not planned for, such explosions are certain.

High Voltage Cabling

Two techniques used to prevent electrical conducting wire 164 or cable from exploding when high voltages are applied are: to use many small strands of conducting wire 164 instead of one large strand; and to weave or twist the individual strands to make a larger conducting wire 164 or cable, as is shown in FIG. 50.

These types of cabling are used in lightning protection systems. The purpose of using thin strands is it reduces the radius of any individual conducting surface area. This reduces the wavelength of any resulting electromagnetic waves the follow along the wave guide formed by the strand. Shorter electromagnetic waves reduce the amount of electrons that can be piled up or focused at the nodes of a wave. The weaving, braiding and twisting of individual strands reduces the effects from induced magnetic fields. The magnetic fields tend to have smaller, more complex fields and interactions. This prevents the intensity of any particular wave from growing and creating localized hot spots that would melt or explode the cabling. The drawback to such cabling is, if overall harmonic wave patterns are desired, then this type of cabling creates non-harmonic patterns, or patterns that are too complex to easily understand and control. Superconducting materials could be used to avoid this problem.

Alternative Design Variations

Coils Variations

Hemispherical coils 106 are used in the preferred embodiment. However, in the sizes envisioned for these reactor designs, they are untested. There are many other possible coil designs that could be used instead. They fall into two major categories: coils that create electric mode operation; and coils that create magnetic mode operation. Magnetic mode operation is preferred because, in general, electric mode operation can cause electrons to pile up and burn out components as discussed in the previous section on the exploding wire phenomena.

In general, the main electrical circuit or magnetic circuit, i.e., the containment circuit made up of conducting spheres 102 and reactor core(s) 101, described for these nuclear fusion reactor designs, with the exception of straight-line designs (FIG. 59), are closed circuits. That is, they form a loop, with no "end" of the circuit directly connected to the commercial power grid. Thus, the only way of adding or extracting energy to the closed loop, and controlling the flow of the energy around the closed loop, is by using inductive coils.

There are three main types of coils that could be used for these purposes: normal wound coils; Rowland Ring coils 147; and hemispheric coils 106.

Normal Coils

Figures 51A, 51B, 51C, 51D:
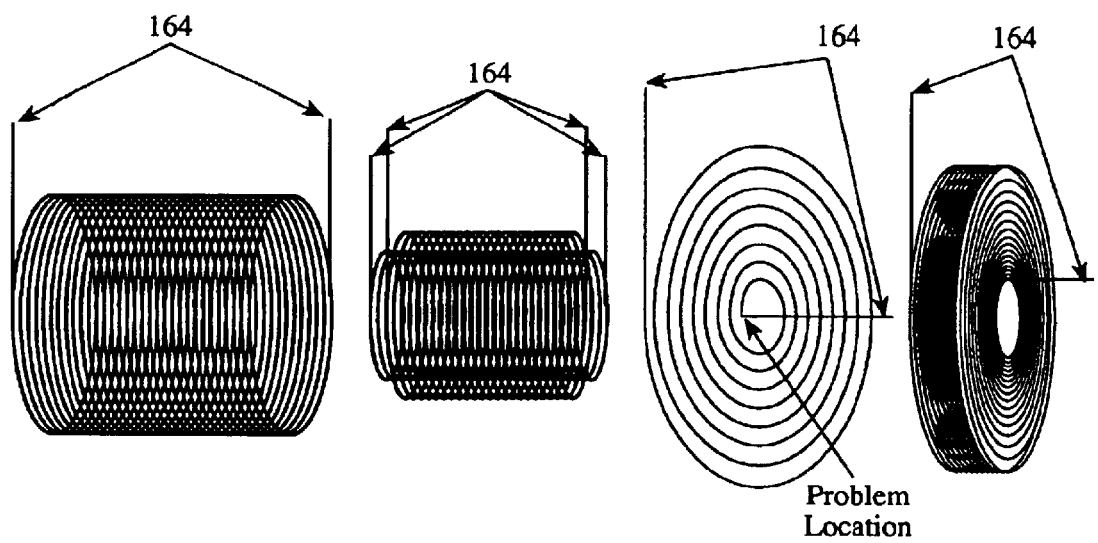
FIG. 51(a) is a cross-section view of cylindrical coils.
FIG. 51(b) is a cross-section view of concentric cylindrical coils.
FIG. 51(c) is a cross-section view of helically wound coils.
FIG. 51(d) is a cross-section view of a combination cylindrical/helical coil.

Normally wound coils are shown in FIGS. 51(a)–(d). The cylindrical coil in FIG. 51(a) is one of the most common types of coils, it produces a simple, very well understood magnetic field. The strength of the magnetic fields created by these coils is somewhat limited.

The concentric cylindrical coils in FIG. 51(b) combine their magnetic fields, thus creating stronger magnetic fields. Some of the world's strongest magnetic fields are created by magnets that are wound in this way. The more powerful designs using this type of coil must be structurally reinforced both on the inside and out and must be provided with powerful cooling mechanisms. The helically wound coils in FIG. 51(c) can provide relatively strong magnetic fields but have some harmonics problems. It is difficult for powerful currents to change direction quickly. At the center of a helical coil, the lead changes direction abruptly, see the center of the coil in FIG. 51(c), and can lead to problems. The coil in FIG. 51(d) is a combination of cylindrical and helical designs. It can produce large magnetic fields but because of the back and forth, or random, winding patterns typically used in this design, the magnetic fields might not be harmonic enough for these nuclear reactor designs.

Each of these coil types could be used to induce magnetic fields, and indirectly, electric fields over the conducting spheres 102, in the containment circuits of these nuclear fusion reactor designs. These designs do lend themselves to effectively inducing harmonic electromagnetic fields over a sphere. However, there are other reactor designs more appropriate for coils such as these. They use a straight-wire type of solid conductor 160 with a circular cross-section, as shown in FIGS. 72, 73, 74, 75, and 76 rather than a circuit of spherical conductors 160.

Rowland Ring Coils

Figure 52:
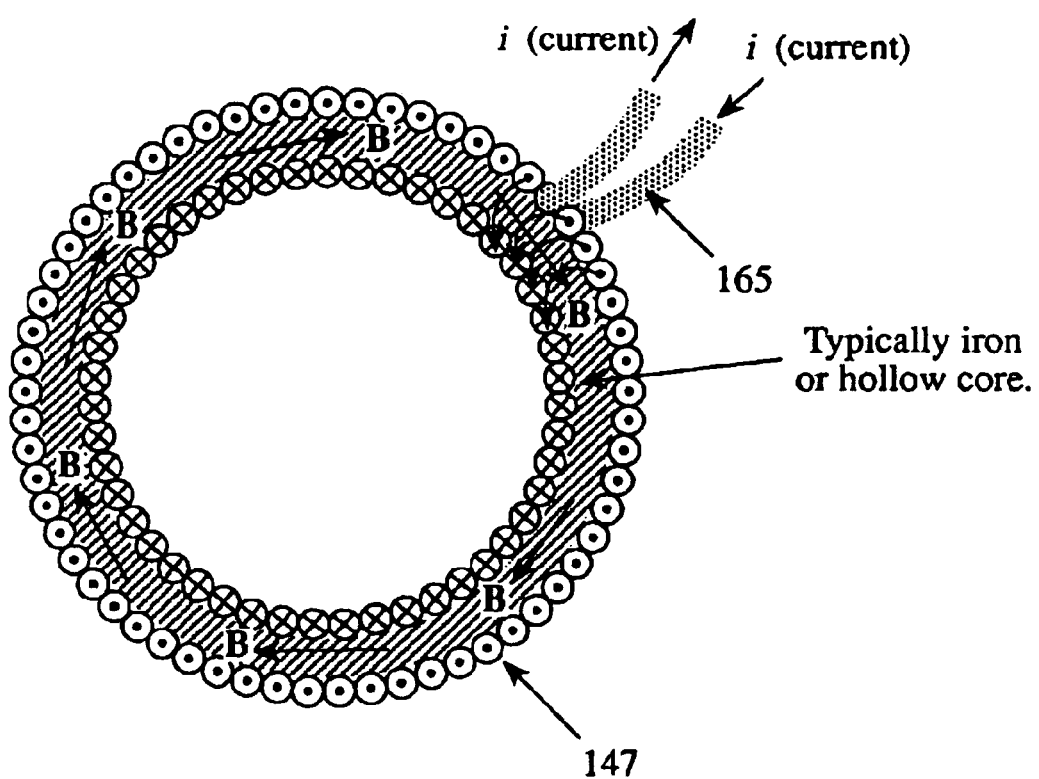
FIG. 52 is a cut-away end view of a Rowland Ring coil.

As shown in FIG. 52, a Rowland Ring coil 147 is a donut shaped coil. Current typically flows through the Rowland Ring coil 147 as shown in FIG. 52. Rowland Ring coils 147 sometimes have a solid, soft-iron core. Such cores allow higher magnetic fields, but only up to a point. Without a core, the coil is less efficient, but it is possible to obtain much higher magnetic fields by using brute strength, by using more turns and higher currents. All Rowland Ring coils 147 used in the designs of the present invention will be designed for very strong currents and magnetic fields. It is assumed that all of the Rowland Ring coils 147 in these designs are completely covered by a high-strength mechanical shield and cooling system.

The Electric and Magnetic Interaction of Coils with Conducting Spheres

When an electric current flows through a coil, according to Ampére's Law, the coil induces a magnetic field. The magnetic field times the area of the coil gives the magnetic flux of the coil. If the current through the a coil is changing, then the induced magnetic flux through the coil is changing. According to Faraday's Law of induction, as the magnetic flux is changing, the coil will induce an EMF across the coil.

A coil can be placed next to a conducting sphere 102. If a current is set up through the coil, so that it grows rapidly from zero to some large value, then the current in the coil will induce electromagnetic fields in the conducting sphere 102. According to Lenz's Law, which applies to closed conducting circuits, the induced fields in the conducting spheres 102 will appear in such directions as to oppose the changes that produced them.

Figures 53A, 53B:
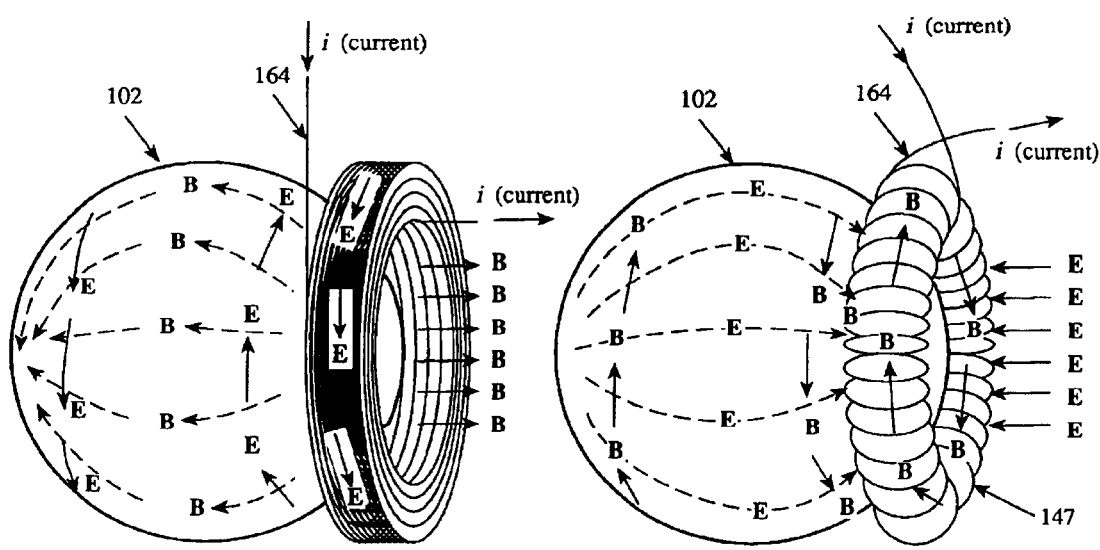
FIG. 53(a) is a cut-away cross-sectional view of the interaction of a cylindrical coil and the electromagnetic field of a conducting sphere.
FIG. 53(b) is a cut-away cross-sectional view of the interaction of a Rowland Ring coil and the electromagnetic field of a conducting sphere.

Various configurations of coils can create different combinations of electric and magnetic fields on the surface of the sphere. For example, a Rowland Ring coil 147 will induce electromagnetic fields over a conducting sphere 102 in the opposite manner as a regular cylindrical coil, as is shown in FIGS. 53(a) and 53(b).

There are significant advantages and disadvantages to each type of coil. A Rowland Ring coil 147 that induces smooth electromagnetic fields in conducting spheres 102 would be easy to design, compared with other coil types. This is important for harmonics. All that is required is that the wavelength of the Rowland Ring coil 147 match the wavelength of the conducting sphere 102. Also, if the Rowland Ring coil 147 has a soft iron core, then the Rowland Ring coil 147 will efficiently produce large magnetic fields. An added advantage to a Rowland Ring coil 147 having a soft iron core is that this inhibits the flipping of the polarity, a key safety consideration, due to the phenomena of hysteresis in the soft iron core. However, a soft iron core limits Rowland Ring coil 147 designs to "medium" magnetic fields, that is, inhibiting induction of "massive" magnetic fields. Without the soft iron core, and using the shear brute force of large, brief currents, a Rowland Ring coil 147 can produce "large" magnetic fields.

In FIG. 53(*b*), note how the rotation of the magnetic field in the Rowland Ring coil 147 is opposite to the rotation of the magnetic field in the conducting sphere 102, according to Lenz's Law. Also, note how the electric fields sweep over the conducting sphere 102 from pole to pole. This is the disadvantage to using a Rowland Ring coil 147 to induce electric and magnetic fields in the conducting sphere 102. The electric field sweeping from pole to pole over the conducting sphere 102 will create a current flow across the conducting sphere 102. This will concentrate electrons on one pole. The electrons will build up only to a point before they will arc across to the next conducting sphere 102. This arcing will damage the conducting spheres 102 and weld them together. Tests will be required to prove how damaging this will be.

It is possible that the magnetic fields induced around the conducting sphere 102 by a Rowland Ring coil 147 will limit the actual flow of the electrons. In essence, the conducting sphere 102 may act as if:

there is a large voltage across the conducting sphere 102, from pole to pole there will be a massive resistance across the conducting sphere 102 from the magnetic fields and there will be only a small current flow.

In FIG. 53(*a*), note how the magnetic field in the coil is induced by the normal coil's current, and how the coil's magnetic field opposes the induced magnetic field sweeping over the conducting sphere 102 from pole to pole, according to Lenz's Law. Also, note how the electric fields sweep over the sphere in counter-rotating hemispheres. This is an advantage of using regular coils to induce the electric and magnetic fields over the conducting spheres 102. Because the fields in this configuration push the electrons in counter-rotating directions around each hemisphere, there is no net electron migration around the main conducting circuit. In essence, the main conducting circuit would not conduct electrons, it would conduct a magnetic field. It would be a magnetic circuit rather than an electric circuit. As far as the ability of the confining fields at the reactor core 101 are concerned, there is no difference between using an electric or magnetic circuit.

The main drawback in using normal coils is they would be more difficult to design than Rowland Ring Coils 147 or Hemispherical coils 106. Because of the pattern in how the coil wire 165 wraps in the normal coil, the induced magnetic field would not be as smooth as with the fields induced by the Rowland Ring coil 147. Two possible solutions for creating smoother fields would be to use parallel helical coils or hemispherical coils 106. Parallel helical coils are shown in FIG. 54(*b*).

In this configuration, parallel helical coils are separated by structural reinforcement panels that have interior channels for reinforcement and cooling panels 161. The reinforcement and cooling panels 161 could be made of non-conductive, rigid material such as: ceramics or RCC. The reinforcement and cooling panels 161 will keep the coils in position and prevent them from deflecting under the mechanical forces of the intense electromagnetic fields. The reinforcement and cooling panels 161 will have channels that can handle a high volume of coolant 130.

In order to maintain equivalent voltages between layers and to maintain the timing of the electromagnetic pulses, the in-flowing wire leads would all have a common connection, as well as the out-flowing wire leads. The weak point in this coil design will be where the coils connect with the center lead. At this point, there will be an abrupt change in direction which will have the potential for burning out the coils, and disrupting harmonics. See FIG. 51(*c*).

Reactor Core and Conducting Sphere Variations
Conducting Layer

Figures 55A, 55B:
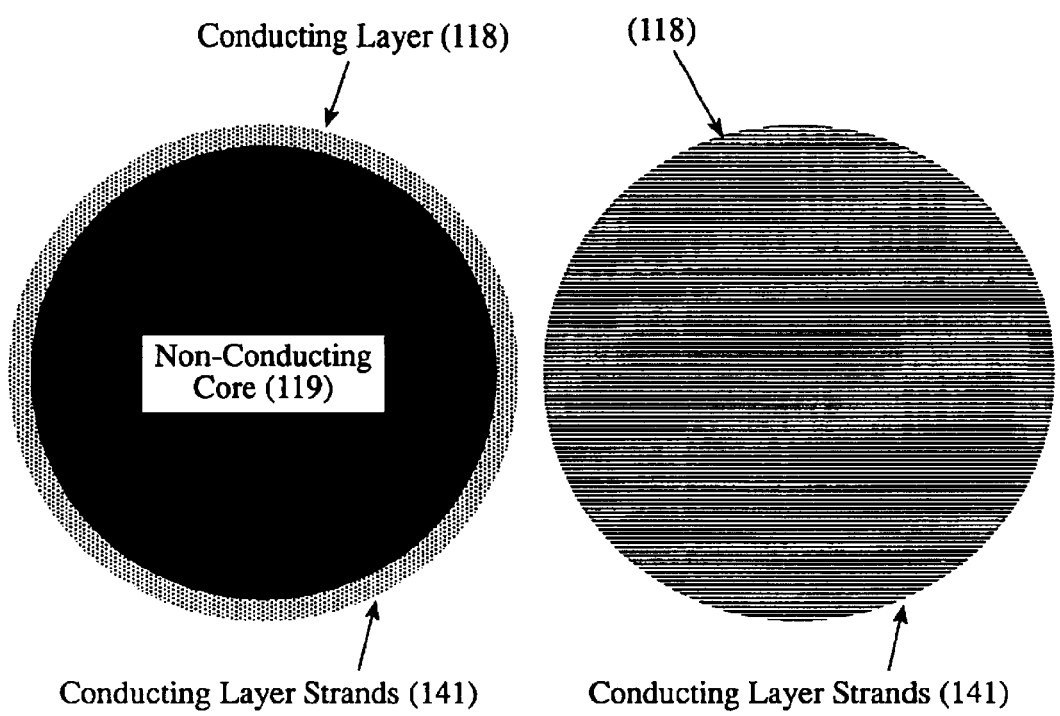
FIG. 55(a) is a cut-away view of a conducting sphere having wound conducting layer strands.
FIG. 55(b) is a cross-section view of a conducting sphere having wound conducting layer strands.

The conducting layer 118 of the reactor core 101, and the conducting layer 118 of the conducting spheres 102 of the preferred embodiment is represented as solid Copper-Niobium alloy spheres. It has already been mentioned that the material of these conducting layers 118 could be other conducting materials, gases, or plasmas. What was not mentioned is that the "solid" layer of manufacture could be substituted for strands of conducting wire 164 that are woven, braided, or twisted around a substrate to form a spherical shape. FIGS. 55(*a*) and 55(*b*) show how this might look for a conducting sphere 102.

The conducting layer strands 141 are simply wound around the non-conducting core 119. In essence, they create thousands of closed loops of conductors. This method would work in the magnetic mode, but probably not in the electric mode. FIGS. 55(*a*) and 55(*b*) do not represent any weaving, braiding or twisting of the conducting layer strands 141 as shown in FIG. 50. However, with a much higher cost of manufacture, this is possible. Reducing the chance that individual conducting layer strands 141 will burn out does not seem worth the extra cost of utilizing the manufacturing methods shown in FIG. 50.

Super Conductors

It would be preferable, if the conducting layer 118 of the reactor core 101, and the conducting layer 118 of the conducting spheres 102 and the conducting wire 164 in any induction coils used in these designs were made of a super-conducting material. At this point; in the history of super-conducting materials, the costs associated with manufacturing a nuclear fusion power plant following these designs and using super-conducting materials would appear to be too high. The modular form of these reactor designs allows swapping out old materials with new as they become cost effective. An example of a possible super-conducting material would include, but not be limited to, multi-filamentary Nb3Sn and NbTi superconductors.

Other Conducting Layer Materials

The conducting layer 118 within a reactor core 101 could be made of:

Copper and copper alloys

Aluminum and aluminum alloys

Iron, steel and other ferrous alloys

Silver, and silver alloys

Gold, and gold alloys

Titanium, and titanium alloys

Vanadium, and vanadium alloys

Magnesium, and magnesium alloys

Other conductive metals and metal alloys, including but not limited to: Chromium, Lead, Molybdenum, Platinum, Tin, Tungsten, Mercury and Zinc.

Conductive forms of glasses, ceramics, plastics and polymers, composites, and multi-compound materials.

Plasma Core

One possible form for the conducting layer 118 of the conducting spheres 102 or the reactor cores 101 is the plasma 150 form. The plasma 150 form offers some key benefits. First, cooling of the conducting layer 118 is not required, it must be hot to be in plasma 150 form. Second, refurbishment of the conducting layer 118 is not required. Third, costs of materials for the conducting layer 118 would be reduced. Fourth, Hall and Coulombic forces tearing the conducting layer 118 apart would not be an issue. The key issue is, how can the plasma 150 form the spherical shape needed? At first, this issue may seem difficult. However, it may not be difficult at all. A simple solution for using plasmas 150, at least within the reactor core 101 will be presented.

Figure 56:
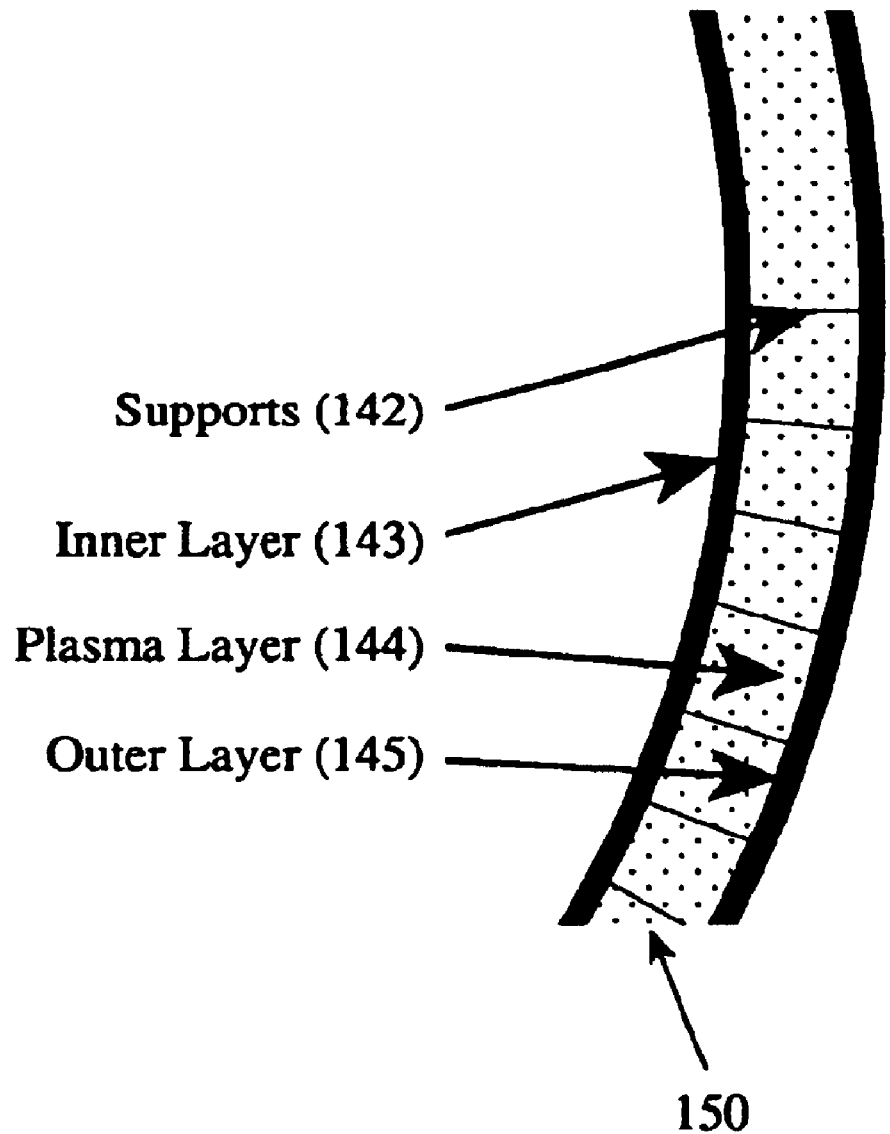
FIG. 56 is a cut-away cross-section view of an embodiment of the plasma layer.

First, in FIG. 56 is one "solution" that may be very difficult and problematic. The conducting sphere 102, or reactor core 101 is made of a strong inner and outer layer of material, which may include but not be limited to Steel, Titanium or RCC. The plasma layer 144 is filled with a highly conductive plasma 150, but offers no support between the inner layer 143 and the outer layer 145. Therefore, supports 142 are needed between the inner layer 143 and outer layer 145. However, the massive electromagnetic fields that will be generated in the plasma layer 144 will force the ions in the plasma 150 to rotate very fast. Any supports 142, of any known material or construction, will be quickly eroded by the moving plasma 150. When the supports 142 fail, the reactor core 101 may collapse, catastrophically. The initial idea an engineer might have would be to make the supports 142 stronger, but this leads to another problem. The stronger the supports 142 are, the more disruptive they will be to the harmonics within the plasma 150. If the harmonics within the plasma 150 are distorted to greatly, the instabilities 139 within the plasma burn will become great enough to destroy just about any container.

There may be some optimum trade-off point where supports 142, for example made of Tungsten, may survive long enough within the plasma layer 144 for a typical fusion burn to take place, and where the supports 142 do not create disruptions in the harmonics that are large enough to allow plasma instabilities 139 to explode through the reactor core 101. If so, then this design variation may be viable.

"No-Core" Reactor Core Design

In the long-term development of these reactor designs, perhaps the best "core" design will be to have no reactor core 101 at all. The No-Core design has no hard materials. It is made up solely of electromagnetic fields, or electromagnetic fields within a plasma 150.

The key to the No-Core design is a conducting circuit, made of conducting spheres 102, that is designed so that the magnetic fields over the reactor core 101 area are very strong. It is estimated that a magnetic field about 4 Tesla at a radial distance of about 2.5 meters from the center of the reactor core 101 area may be strong enough. With a magnetic field of 4 Tesla, a 5-meter diameter reactor core 101 would focus about 1.2 exawatts of energy at the focal point of the reactor core 101. (At 5 Tesla, 1.875 exawatts, at 6 Tesla 2.7 exawatts, at 7 Tesla 3.675 exawatts, at 8 Tesla 4.8 exawatts, at 9 Tesla 6.075 exawatts, and at 10 Tesla 7.5 exawatts would be focused at the center of the reactor core 101 area.

Reaching such high magnetic fields with large diameters would require extremely optimized reactor designs that may involve massive amounts of superconducting materials and previously unheard of cooling requirements. The capacitor and triggering requirements to start the process would be equaling daunting. However, the engineering is straightforward. There are no magical physics barriers to break through. The design simply requires better superconducting materials, more superconducting material, more cooling and more capacitors.

At these energies, many problems with earlier designs would be moot. There would be no need to design complex reactor cores 101, the No-Core design would have to be used. There would be no need to have lasers 103 or some other method trigger the burn, the spherical electromagnetic confinement field 140 would be powerful enough to trigger the fusion burn. There would be no complexity of having to trigger the lasers 103 and spherical electromagnetic confinement field 140 in the proper sequence since there would be no lasers 103.

Figure 57:
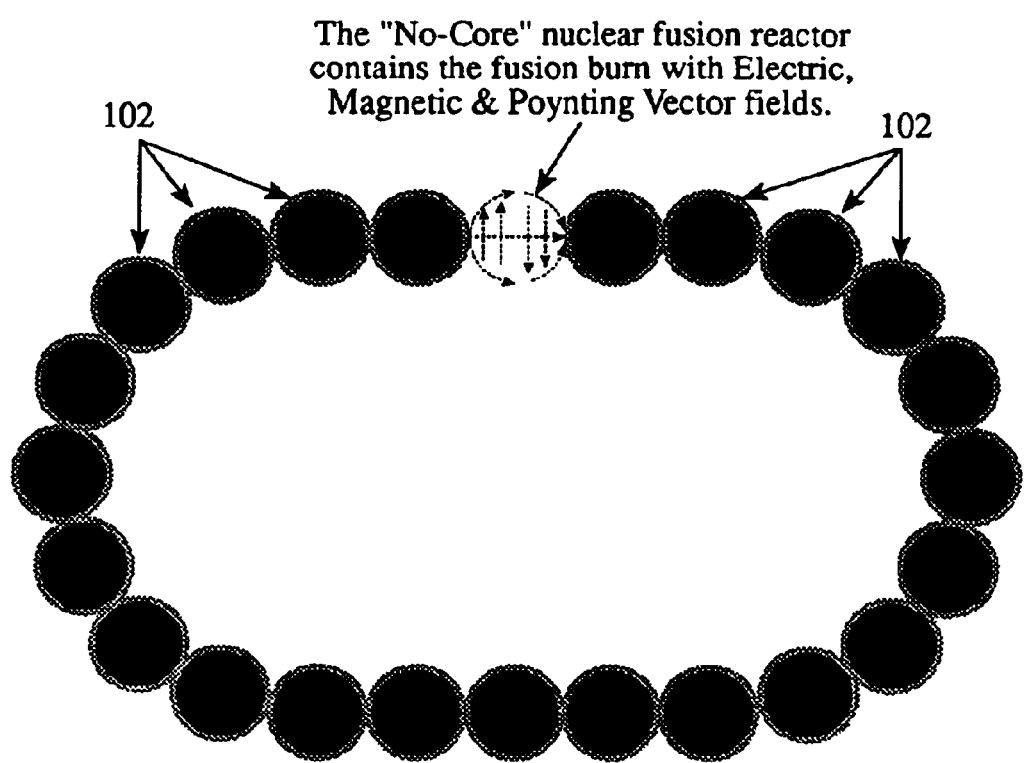
FIG. 57 is a top view of a no-core fusion containment circuit.
Figure 58:
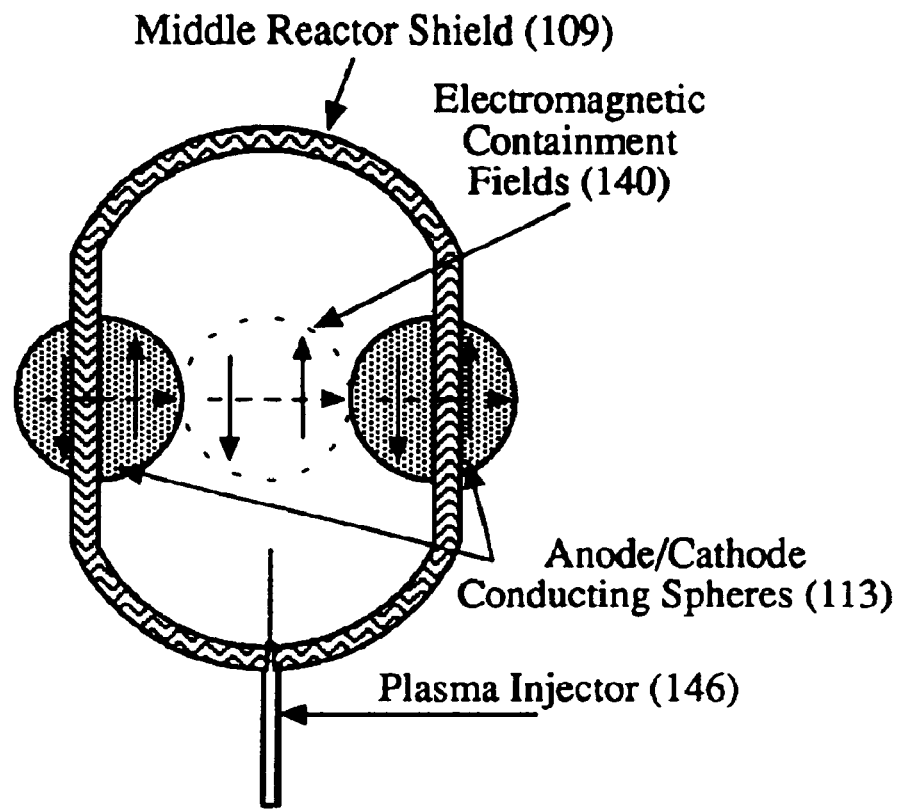
FIG. 58 is a cross-section view of the core area in a no-core containment circuit.
Figure 68:
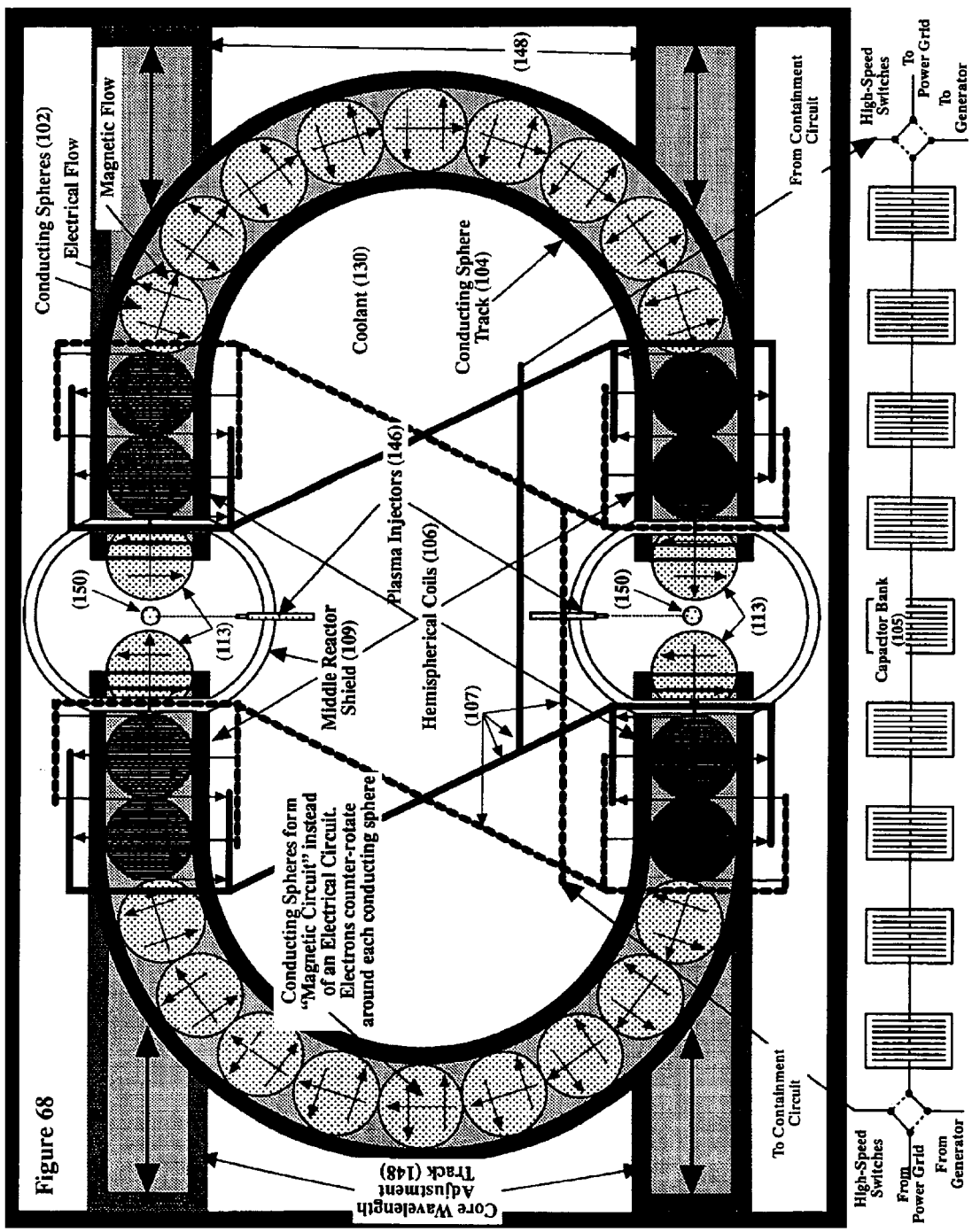
FIG. 68 is a top view of dual reactor no-core design.
Figure 69:
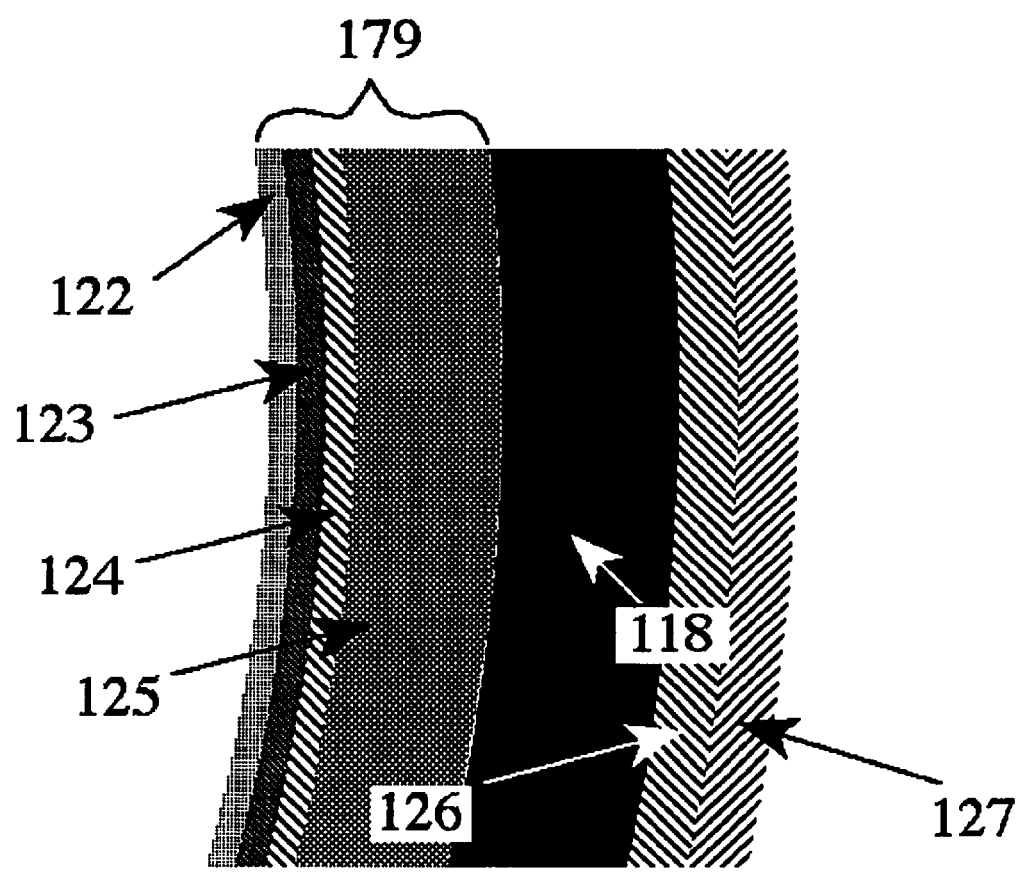
FIG. 69 is a cut-away cross-section view of a reactor core wall.
Figure 80:
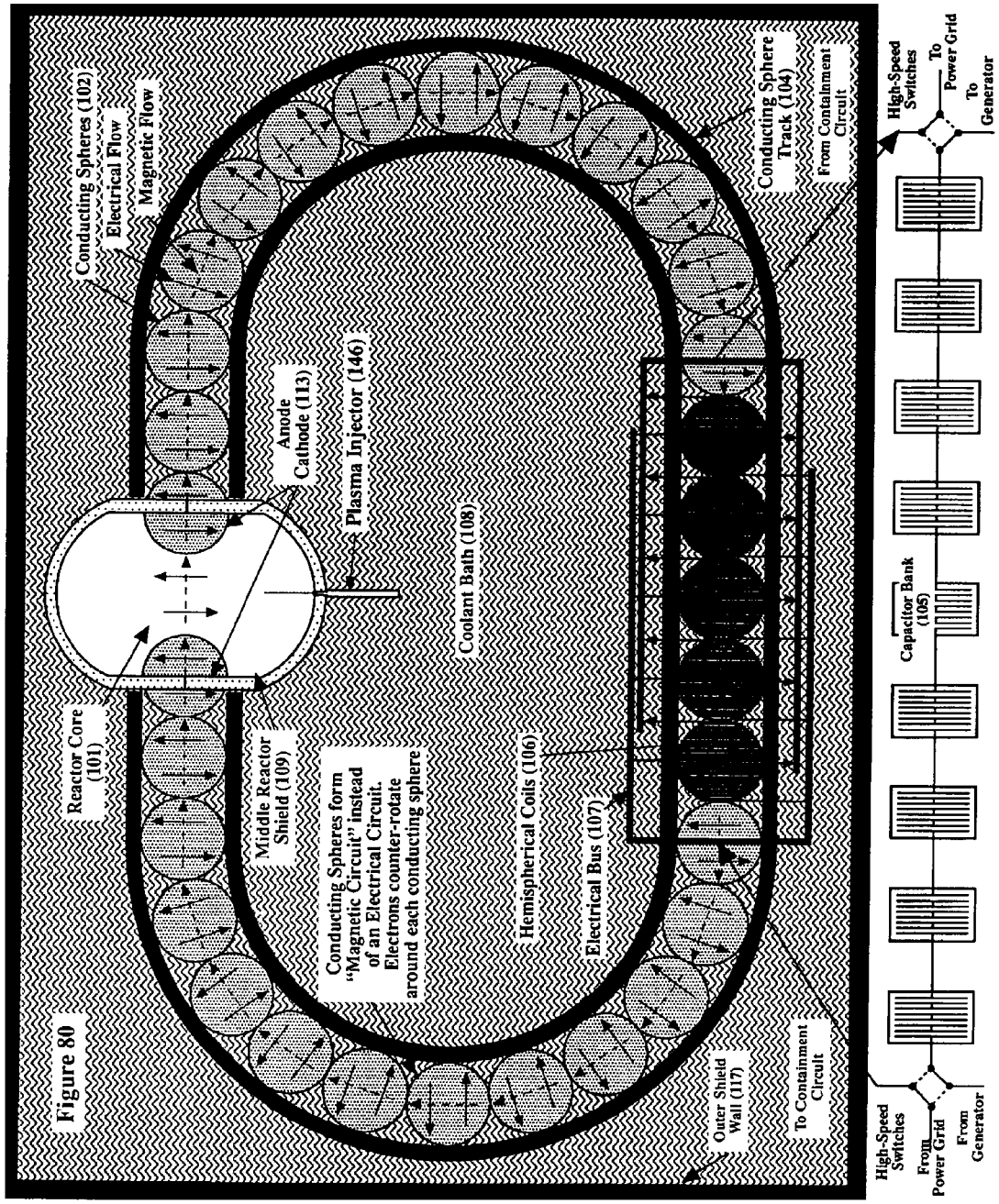
FIG. 80 is a top-view of a No-Core design.

A possible No-Core containment circuit might look like FIG. 57. The No-Core core area would look like FIG. 58. Examples of the complete No-Core reactor designs are shown in FIGS. 68 and 80. The middle reactor shield 109 would have a wider diameter to help make insure that no disruption to the harmonics results from the middle reactor shield 109. The spherical electromagnetic confinement fields 140 would provide containment of the fusion burn, and provide ignition of the fuel to begin with. The electromagnetic field orientation would be in the magnetic mode. The anode/cathode conducting spheres 113 would be the weak link. When they melt, the harmonics would be lost.

Figure 9:
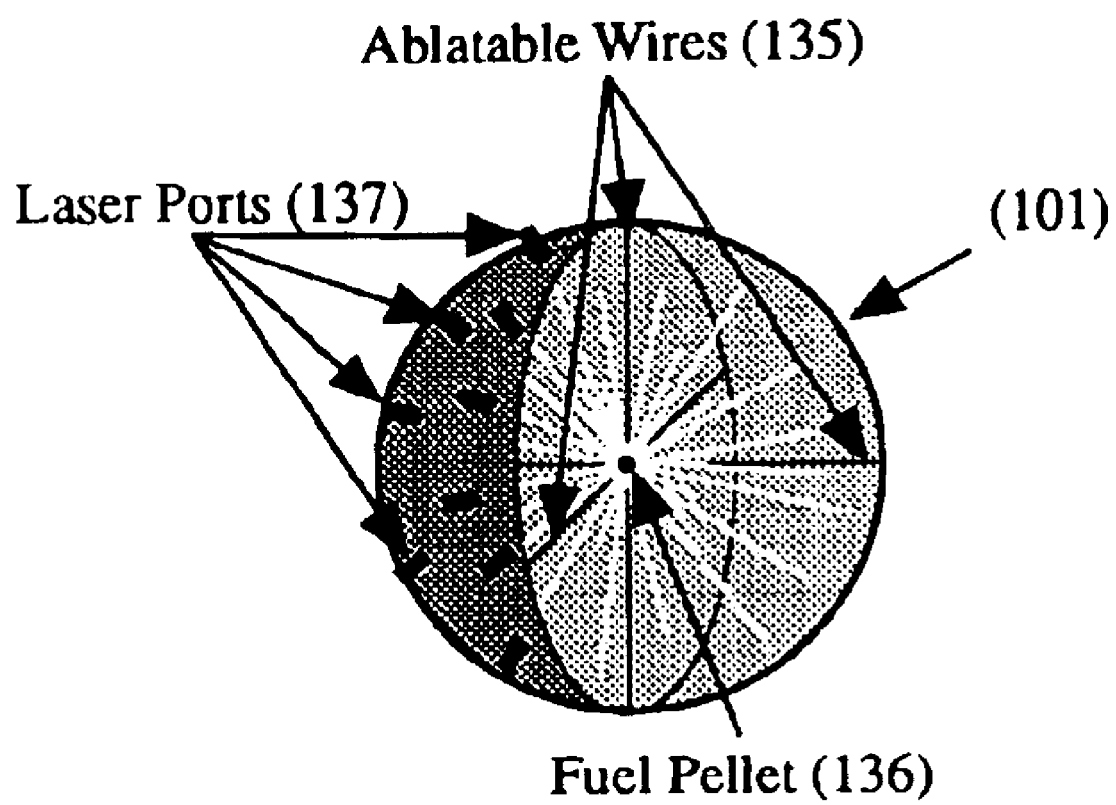
FIG. 9 is a cross-section view of the fuel pellet.

A fuel pellet 136 could be prepositioned in the middle reactor shield 109 via ablatable wires 135 similar to those shown in FIGS. 9 and 30, and/or, plasma 150 could be injected into the spherical electromagnetic confinement fields 140 via a plasma injector 146. The advantage of an plasma injector 146 system is that it would allow the fusion burn to be continually fed with additional plasma 150.

A variation would be to coat the anode/cathode conducting spheres 113 with some material, such as thin layer of Boron impregnated high-temperature ceramic to help them survive longer. Or, it might be possible to actively cool the anode/cathode conducting spheres 113. The problem in cooling the anode/cathode conducting spheres 113 is that half of each anode/cathode conducting sphere 113 is inside the inner shield where no cooling equipment could be placed without disrupting the harmonics of the spherical electromagnetic confinement fields 140. If only part of each conducting sphere 102 is cooled, then it would create differences that would likely disrupt the electromagnetic harmonics of the spherical electromagnetic confinement field 140.

Another possible solution might be to allow the anode/cathode conducting spheres 113 to spin within a cooling and clamping device. While only about one half of the anode/cathode conducting spheres 113 would be cooled at any one time, the anode/cathode conducting spheres 113 would be constantly rotating the hot side into the cooling portion of the clamp.

Most likely, the cooling plan would be to pre-cool the entire circuit and operate until heating disrupts the harmonics. It is possible that burns of several minutes could occur with such a technique. This would be a very respectful burn duration. Thermonuclear fusion burns of several minutes would give off tremendous amounts of energy. There seems little doubt that the limits of this design would be in cooling the anode/cathode conducting spheres 113 rather than in fueling the burn area.

The No-Core design emphasizes a key detail of these patents. The design of the reactor core 101 area depends not upon materials selection, but on the formation of powerful, spherical, electromagnetic confinement fields 140, that focus energy at the center of the reactor core 101 area. The other key detail is that the same circuit not only focuses energy on the center of the reaction but that it also allows energy coming out of the center of the reaction to be absorbed by the circuit via the MHD process. If this process was not equal and opposite, then the design would not work.

RCC/Boron (23) & RCC Layers (24), (26), (27) in Reactor Core

The element carbon takes a wide range of forms from amorphous carbon, to graphite, to graphite fibers and diamond. Some of these forms, such as graphite and graphite fibers, can be highly conductive. Other forms of carbon, such as amorphous carbon (lampblack), are relatively non-conductive. Tests must be conducted to test the best form of carbon for the second non-conducting layer 123, third non-conducting layer 124, sixth non-conducting layer 126 and seventh non-conducting layer 127 as shown in FIG. 6. In general, conductive or non-conductive forms could be used. It is assumed at this point, that the non-conductive forms will perform better, due to smaller eddy currents, smaller inductive losses, smaller thermal losses, and the possibility of being affected by massive Hall and Coulombic forces.

Since materials can change forms under high temperatures, pressures, and electromagnetic forces, it is assumed that the material characteristics will vary over time and possibly reduce the effectiveness of some or all of the reactor core 101 materials. Tests will be needed to determine the longevity of these components.

Secondary Diamond Manufacture

In the center of the conducting spheres 102 of the preferred embodiment will be amorphous carbon. This material is essentially non-conducting when compared with conducting layer 118. However, after repeated use and exposure to high temperatures, pressures and electromagnetic forces, it is expected that the amorphous carbon will be transformed into other forms of carbon, including graphite and diamond. It is not the intended purpose of these fusion power plant designs to manufacture diamonds. However, they may be extremely efficient at doing exactly that.

If the non-conducting core 119 in a conducting sphere 102, or if carbon in second non-conducting layer 123, third non-conducting layer 124, fourth non-conducting layer 125, sixth non-conducting layer 126 and seventh non-conducting layer 127 within the reactor core 101 transform into more conductive forms of carbon, then failure may occur due to sudden increases in currents within these components of the reactor.

In order to offset costs, remove radioactive materials, and prevent failure of key components, the conducting spheres 102 and the reactor cores 101 will require refurbishment at regular intervals. The refurbishment process will involve removing any diamonds formed at the center of conducting spheres 102.

Containment Circuit Variations

Circuit Design

With the exception of the straight-line containment circuit, these designs need a closed electric or magnetic circuit for the confinement circuit. These designs utilize conducting spheres 102 in a straight, circular or oval geometrical fashion.

Straight-Line Containment Circuit Designs

Figure 59:
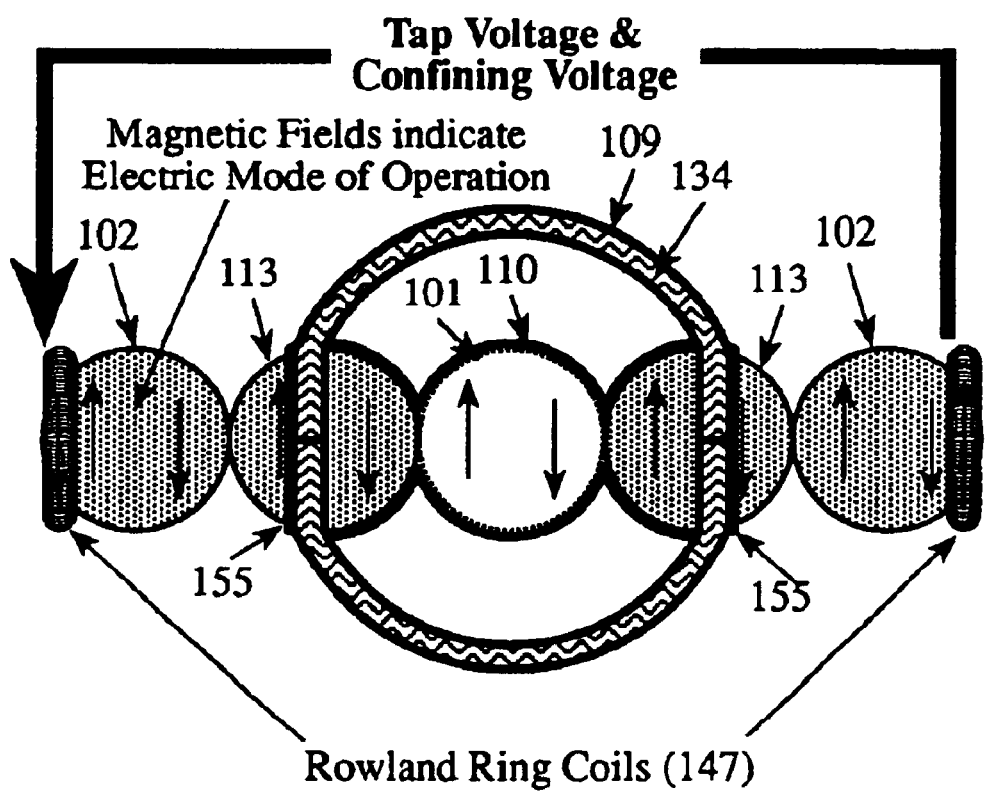
FIG. 59 is a cross-section view of a straight line containment circuit.

FIG. 59 represents one type of a straight-line configuration. It utilizes Rowland ring coils 147, and operates in the electric mode. In other words, the magnetic fields lines are as in FIG. 12. The key to this design is the very powerful and harmonic coils. There is no oval or circular circuit in this design. The load is connected almost directly to the circuit. (There would be circuitry that includes capacitors and DC to AC inverters between the reactor and the load.)

The number of conducting spheres 102 in this design can be increased to improve harmonics over the reactor core 101 area, or decreased to reduce the overall reactor design costs. The design in FIG. 59 has four conducting spheres 102. The number of conducting spheres 102 could be reduced to two or zero. If zero conducting spheres 102 are used, then an almost perfect set of hemispherical coils 106 would be needed to enclose the reactor core 101 area. While this might be the limit to reducing these designs to a minimum set of components, it is not believed that current manufacturers have the capability to manufacture such hemispherical coils 106 at this time.

Circular Containment Circuit Designs

Figure 60:
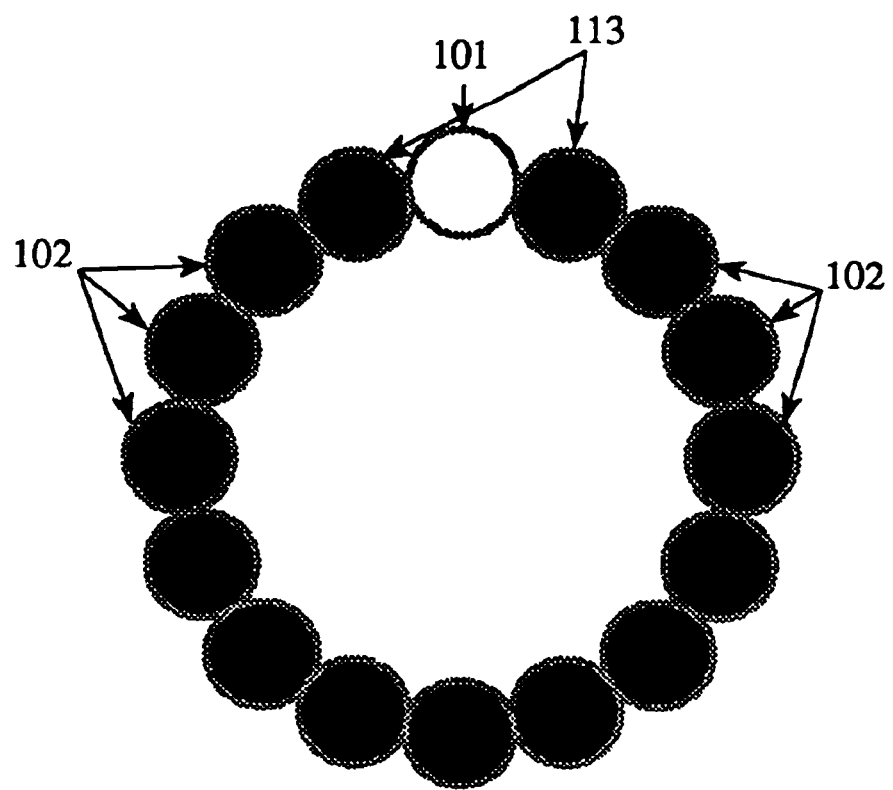
FIG. 60 is a top view of a circular containment circuit with one core.

Circular designs, as contained in FIG. 60, do not seem to offer an advantage over other designs except perhaps in reduced cost. The number of reactor cores 101 can be increased to provide more power, or can be decreased to minimize costs. The number of conducting spheres 102 can be increased to improve harmonics, or reduced to minimize costs.

Oval Containment Circuit Designs

Figure 61:
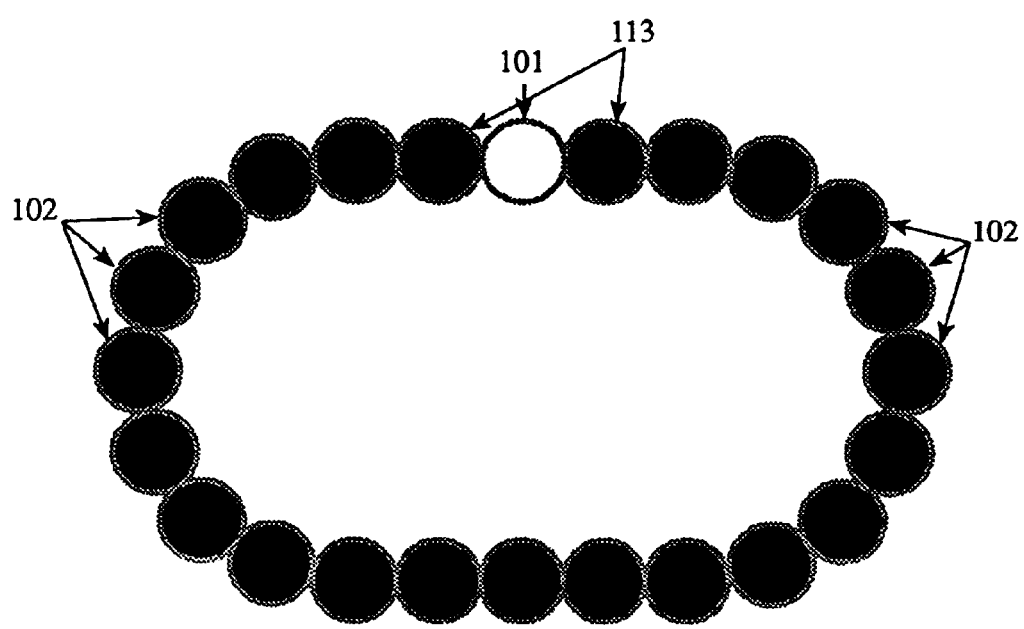
FIG. 61 is a top view of an oval containment circuit with one core.

The advantage of an oval conducting sphere track 104, as shown in FIG. 61, is that there are a number of conducting spheres 102 adjacent to each side of the reactor core 101 that are aligned in a straight line. This would allow the eddy currents to diminish in each successive conducting sphere 102 in the straight-line portion of the oval leading in and out of the reactor core 101. This would tend to "clean up" the main electromagnetic wave and allow for a more harmonic wave to pass over the reactor core 101. Once again, there are trade-offs that create questions that only experiments with different configurations of reactor designs and different materials can answer. However, these are questions of optimization and cost reduction, not fundamental questions of whether these reactor designs will work.

Figure 63:
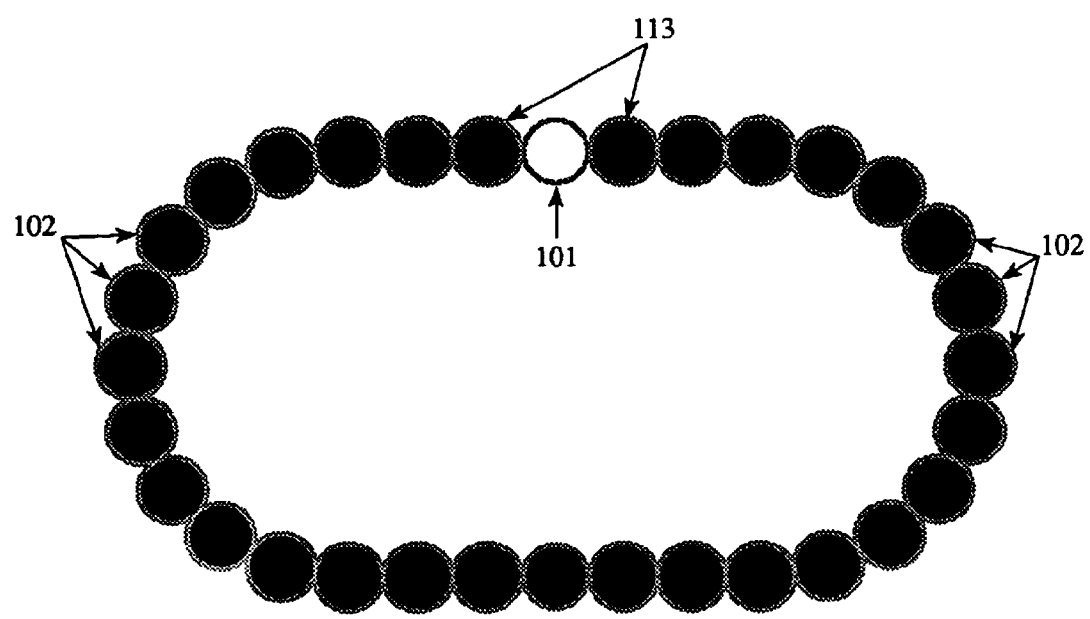
FIG. 63 is a top view of the preferred embodiment for an oval containment circuit with one core.

FIG. 63 contains a layout of the preferred embodiment. The design calls for 29 conducting spheres 102, 2 anode/cathode conducting spheres 113 and 1 reactor core 101, each conducting sphere 102 and anode/cathode conducting sphere 113 has a 5 meter outside diameter. Thus, the mean center path-length of this example circuit would be 160 meters long.

Figure 62:
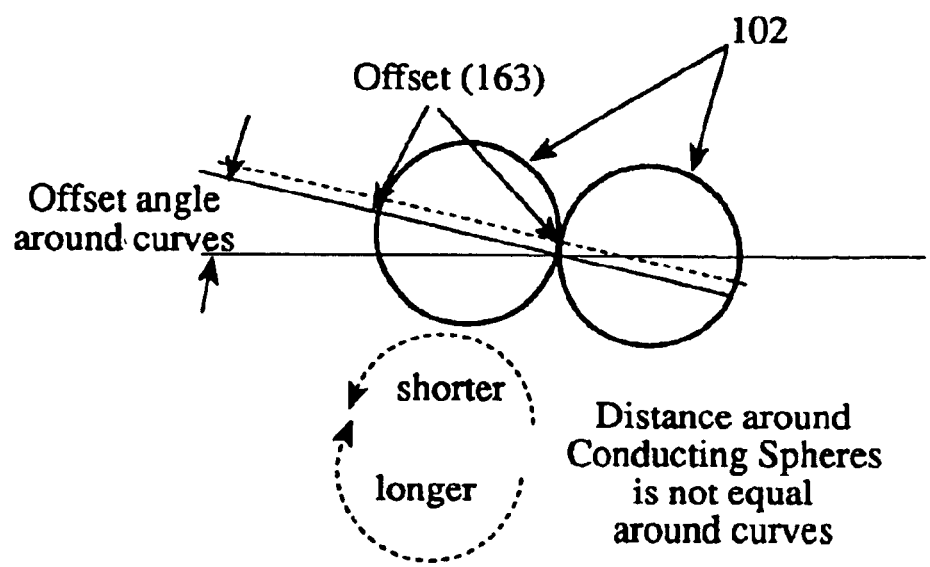
FIG. 62 is a cross-section view of offset poles in the curved sections of circular or oval containment circuits.

There is a symmetry problem with the circular and oval layouts. If a conducting sphere 102 is analyzed, it is found that either the electric or the magnetic field sweeps over the conducting sphere 102 from pole to pole, in the electric mode or magnetic mode. However, the poles of the conducting spheres 102 are not perfectly aligned, pole to pole, in the curved sections of the circular or oval layouts. There is an offset 163 as shown in FIG. 62. Because the poles are not aligned, the electromagnetic wave takes longer to sweep around the outside edge of the conducting sphere 102 than the inside edge. This path difference is where the bulk of eddy currents and heat loss in these designs will occur. It is the main problem that might prevent these reactor designs from working well. If the conducting sphere track 104 were enlarged by adding more conducting spheres 102 then this effect would be lessened. If the conducting sphere track 104 had less conducting spheres 102, then the offset 163 between the poles would be greater. The smaller the quantity of conducting spheres 102 in the track design, the greater the offset 163. An increased offset 163 will result in greater eddy currents, greater Coulombic heating and reduced efficiency. The larger the conducing sphere track 104 and the higher the quantity of conducting spheres 102, the less the offset 163 between the poles will be. However, this increases the cost of the reactor.

A possible solution to this problem is having variable cooling for the conducting spheres 102 in the curved portions of the conducting sphere track 104. If the coolant 130 was pumped into the track from the outside edge of the conducting sphere track 104, and removed from the inside edge of the conducting sphere track 104, then the outside of the conducting spheres 102 would be slightly more conductive and the inside of the conducting spheres 102 would be slightly less conductive. This might reduce the non-harmonics caused by the offset 163 of the poles to the point of being a non-factor.

Multi-Core Reactors

Figure 64:
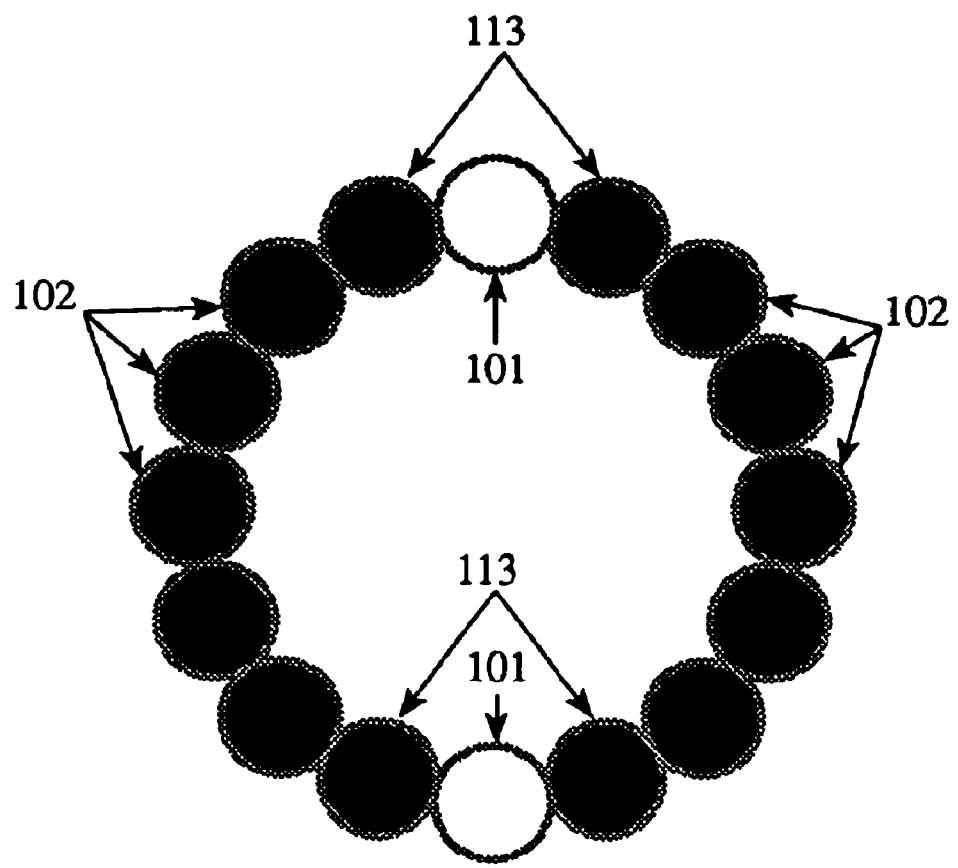
FIG. 64 is a top view of a two core circular containment circuit.

Initially, the fusion reactors built on these designs would probably have one reactor core 101 per electrical circuit. Later, as the design variations are perfected for different price points, it will be possible to create reactors with different numbers of reactor cores 101. Each reactor core 101 would be analogous to a piston in a gasoline engine. The energy produced from one igniting reactor core 101 could be used to compress the next reactor core 101 in the electrical circuit while excess electricity is siphoned off using induction coils. In FIG. 64, two major design variations are demonstrated: the conducting sphere track 104 is circular, and there are two reactor cores 101. An advantage of a two reactor core 101 design is that one reactor core 101 can be igniting and compressing the fuel in the other reactor core 101. The circular conducting sphere track 104 design reduces costs as compared to an oval conducting sphere track 104.

Figure 65:
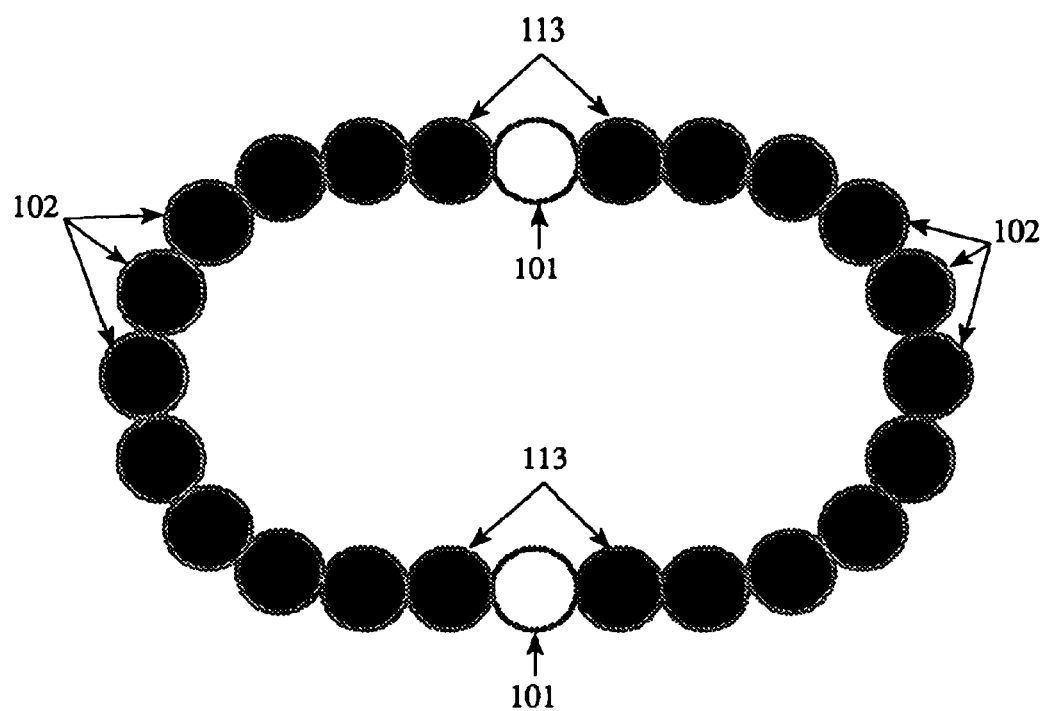
FIG. 65 is a top view of a two core oval containment circuit.

In FIG. 65, two major variations are demonstrated: the conducting sphere track 104 is oval, and there are two reactor cores 101. An advantage of a two reactor core 101 design is that one reactor core 101 can be igniting and compressing the fuel in the other reactor core 101. The oval conducting sphere 104 design improves harmonics as compared to a circular conducting sphere track 104.

Figure 66:
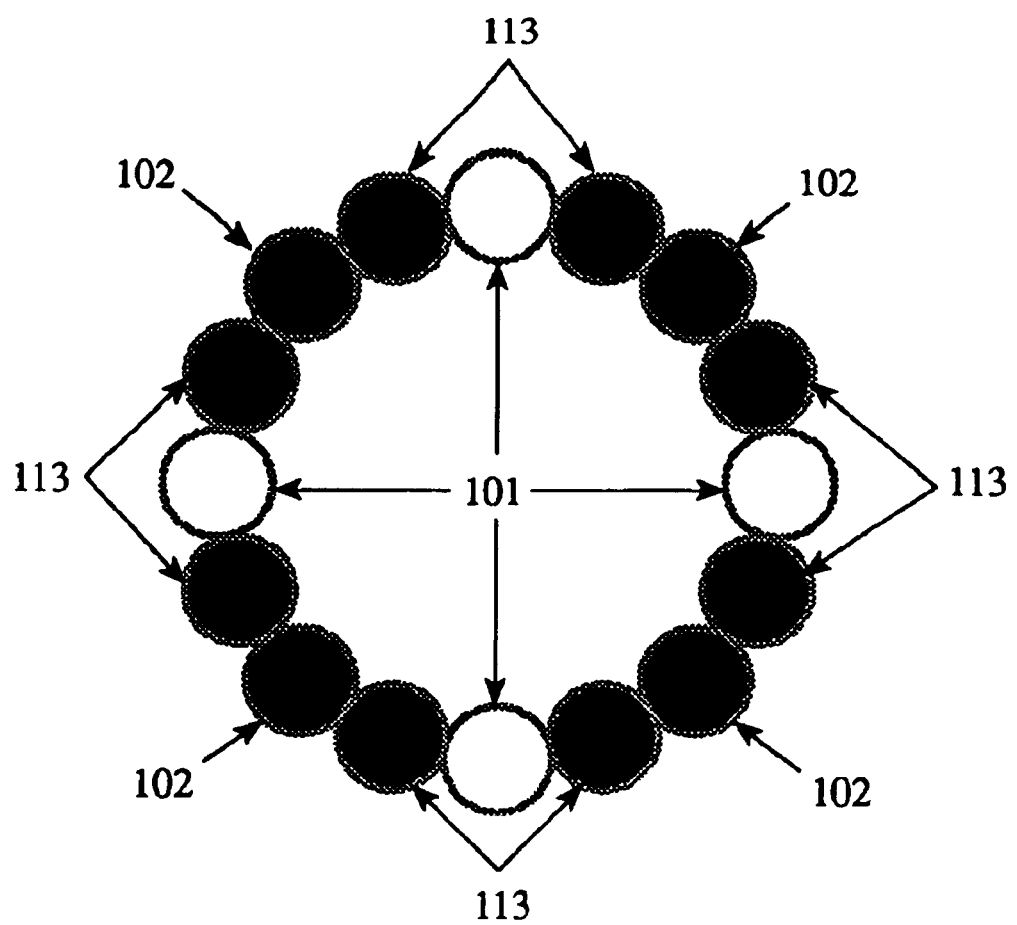
FIG. 66 is a top view of a four core circular containment circuit.

In FIG. 66, two major design variations are demonstrated: the conducting sphere track 104 is circular, and there are four reactor cores 101. Increasing the number of reactor cores 101 is possible, but does not seem to offer any key benefits over a two reactor core 101 design. In theory, the number of reactor cores 101 could be increased to the point where only reactor cores 101 are present and there are no conducting spheres 102 in the circuits. An extreme variation would be to replace all conducting spheres 102 with reactor cores 101. However, the complexity of timing more than 2 reactor cores 101 appears to be a major drawback.

Conducting Sphere Wavelength to Reactor Core Wavelength

Figure 67:
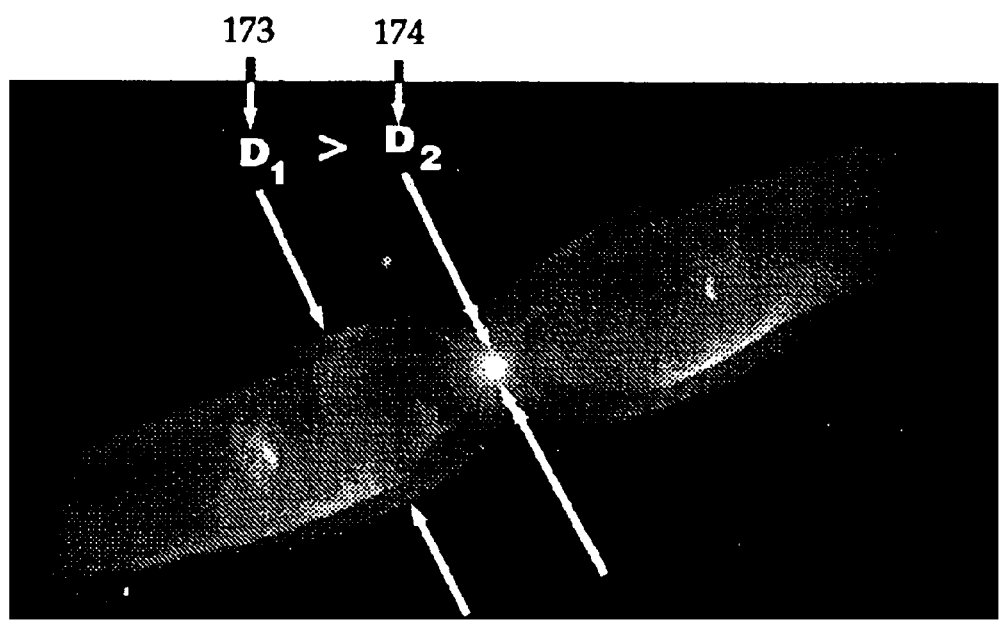
FIG. 67 is a view of a planetary nebula.

In all design variations shown so far, the diameter, or wavelength, of the conducting spheres 102 and reactor cores 101 were the same. Observations of planetary nebulae using the Hubble Space Telescope indicate that there would be an advantage to having conducting spheres 102 that have wavelengths that are larger than the wavelengths of the reactor cores 101. An example of such a planetary nebula is shown in FIG. 67. In FIG. 67, the outer diameter 173 is greater than the inner diameter 174. The ratio of the wavelength of the conducting spheres 102 to the reactor cores 101 could be 2:1, 3:1, 4:1, and so on. A design like this amplifies the energy transmitted from the conducting spheres 102 to the reactor core 101 area and reduces the stress on the conducting spheres 102. An example of such a design is shown in FIG. 68. The diameter of the outer lobes in the planetary nebula in FIG. 67, equivalent to the anode/cathode conducting spheres 102, is a multiple of the diameter of the central star, equivalent to the reactor core 101. FIG. 67 visually shows how the electromagnetic confinement techniques in these reactor designs work. There are two obvious shells of plasma 150 in both lobes of this planetary nebula, which is not uncommon for planetary nebulae. There is an inner plasma shell 175 and an outer plasma shell 176 in each lobe. The outer plasma shells 176 are being ejected from the core of the central star. The inner plasma shells 175 are being created by nuclear explosions within each lobe. They are trying to explode outward but are being confined. The explosions within the lobes are pushing out in a MHD type fashion, strengthening the confining forces provided by the outer layers of each lobe. This is an astronomical example of the self-healing design feature of these reactor designs.

Because the electromagnetic confinement provided by the outer layers is not completely spherical, the plasma 150 from the explosions within the lobes can vent out the two ends of the nebula. The reactor designs of the present invention are explicitly designed to close the ends of the reactor core 101 area to prevent plasma 150 from escaping like this. FIG. 68 is a very advanced design. It has many advantages over the preferred embodiment. The main disadvantage is the increased sophistication and cost of components.

Details of the FIG. 68 design include:

It is a No-Core design.

It is a dual reactor core 101 design.

It operates in the AC mode.

The left and right halves of the conducting sphere track 104 are mounted on massive core wavelength adjustment tracks 148 that allow the two halves to be adjusted in a left-to-right direction allowing fine tuning of the reactor core 101 wavelength during the burn. This will be important for long-duration burns as thermal expansion and contraction causes changes in the primary wavelength of the electromagnetic fields.

It uses hemispherical coils 106.

It does not use lasers 103 since implosion, ignition and confinement are performed solely by the conducting circuit.

It uses plasma 150 fuel that is continuously replenished via plasma injectors 146.

There are many advantages to this design. First, because of the core wavelength adjustment tracks 148, the reactor can be continually adjusted to optimize the harmonics, even if thermal expansion of conducting spheres 102 occurs. Second, as one fusion reaction explodes, it will implode the other fusion reaction. The two reactor cores 101 can continually cycle back and forth like a two piston engine, creating an alternating current. But in this case, at the center of the reactor cores 101 will be two pulsating stars. The burn length of this design is potentially days or weeks, or longer, depending on active cooling capabilities.

Alternate Core Designs

The reactor core 101 must be designed to be highly conductive or superconductive. One likely material choice would be to use copper, or a copper alloy. A Copper alloy, Cu—Nb, will be used as an example for the conducting layer 118 though this is not meant as a limit or restriction from using other suitable conducting or superconducting metals, ceramics, fluids, plasmas and materials. The key design aspect is placing a spherical conducting or superconducting material around a nuclear fusion reaction for the purposes of confining the reaction and extracting energy from the reaction, or, a spherical electromagnetic confinement field 140 in the "No-Core" designs. Some possible copper alloys include, but are not limited to: Cu, Cu—Al2O3, Cu—Ag, Cu—Nb, Cu-St.St., Cu—Be. Some possible superconducting materials include: niobium-titanium; and ceramics. Some possible fluids include: liquid lead, liquid lithium. Some possible gases include: vaporized water, and Xenon. A vacuum is also a possibility as is explained in the "No-Core" reactor design.

As the large spherical electromagnetic confinement fields 140 are generated over the conducting layer 118 of the reactor core 101, mechanical forces are exerted on the material of the conducting reactor core 101 itself. Electrical energy within the reactor core 101 is converted to heat as the electrons in the material are excited and collide with atoms. In order to withstand these mechanical forces and stresses, and to minimize heating of the conducting layer 118 of the reactor core 101, a conducting material that combines both mechanical strength and electrical conductivity is needed. However, it appears that these two requirements oppose each other. Mechanically strong materials tend to be poor conductors, and good conductors tend to be mechanically weak.

If copper, or some other similar conductor that could easily melt were used in the conducting layer 118, then a non-conducting inner wall 179, as shown in FIGS. 6, 69, 70, and 71, must protect the conducting layer 118 from the heat of the fusion reaction. Thus, since the conducting layer 118 will be prone to melting, it must be shielded internally by the non-conducting inner wall 179. The purpose of the non-conducting inner wall 179 is not to completely prevent the melting of the reactor cores 101. For a commercially viable reactor, all that is needed, is that the non-conducting inner wall 179 significantly delay the heating of the conducting layer 118.

A shield material similar to that used to protect the exterior of space craft and rockets, such as space shuttle's exterior, from high temperatures during reentry would be an ideal component for the fourth non-conducting layer 125 of the non-conducting inner wall 179 for the reactor core 101. One of the shield materials used on NASA's Space Shuttles is made of a low-density, high-purity silica consisting of 99.8% amorphous fiber insulation (fibers derived from common sand, 1 to 2 mils thick) that is made rigid by ceramic bonding. This tile is 90 percent void and 10 percent material. This material is used in 1 to 5 inch blocks on Space Shuttles and can withstand tremendous thermal shock. Experiments have been done where the material is transferred from an oven at 2300° F. to cold water without suffering damage.

For these reactor designs, a slurry of this silica material containing fibers mixed with water and a colloidal silica binder solution would be formed over metal hemispheres, partially heated to remove the bulk of the moisture, removed from the metal forms, and then sintered in high temperature ovens to form rigid hemispheres of the fourth non-conducting layer 125. The fourth non-conducting layer 125 constructed of this material could be made by attaching two hemispheres with an overlapping lap-joint. This layer would protect the conducting sphere 102 from a massive thermal shock. A thermal expansion problem may exist for this inner silica-based thermal shield material. The solid hemispheres might not expand well, cracking when heated. If this is the case, a more complex, but still relatively simple, design of smaller tiles attached to a more flexible non-conducting inner layer 124 may be required.

This silica type of shield material will work well if the temperature does not exceed about 2300° F. If the temperature of the non-conducting inner wall 179 will exceed 2300° F., then a third non-conducting layer 124 inside of the fourth non-conducing layer 125 would be needed. The third non-conducting layer 124 could be made of Reinforced Carbon Carbon (RCC) which could withstand temperatures inside the reactor core 101 up to about 3000° F.

When the massive pulse of electromagnetic energy sweeps over the conducting layer 118 of the reactor core 101, forces within this conducting layer 118 will effectively try to implode the reactor core 101. To prevent the implosion of the reactor core 101, the non-conducting inner layer 179 within the conducting layer 118 must be able to withstand very strong crushing forces. RCC is a material that can stand up well to these crushing forces. This is another good reason that the third non-conducting layer of RCC 123 should be planned for.

RCC fabrication begins with a rayon cloth, graphitized and impregnated with a phenolic resin. This impregnated cloth is laid up as a laminate and cured over a metal hemisphere in an autoclave. After being cured it is removed from the metal form, then the laminate is pyrolized to convert the resin to carbon. This material is then impregnated with furfural alcohol in a vacuum chamber, then cured and pyrolized again to convert the furfural alcohol to carbon. This process is repeated three or more times until the desired carbon-carbon properties are achieved. RCC can withstand temperatures up to 3000° F.

In a reactor design by the Lawrence Livermore National Laboratory, for a reactor with slightly larger inner dimensions, 6.5 meter inner diameter versus this example that uses a 5 meter conducting wall diameter, called "Sombrero," 400 MJ yield fusion fuel Holoraum targets were calculated to create a surface temperature at the non-conducing inner wall 179 of about 2100° C. or 3812° F. If this non-conducting inner wall 179 temperature is correct, then another layer of material would be needed that can withstand higher temperatures, or larger diameter reactor cores 101 of approximately 10 meters in diameter would be needed, or targets with lower yields would be needed. Only tests will verify the temperature. It is possible that the spherical electromagnetic confinement fields 140 will slow the fusion burn and reduce the non-conducting inner wall 179 temperature.

If the temperature of the non-conducting inner wall 179 will exceed 3000° F., then another non-conducting layer 122, inside of the second RCC wall 123 should be planned for. An inner layer of non-conducting material 122 could also be made of Ultra High Temperature Ceramics. One such material is hafnium diboride silicon carbide which has been tested to temperatures of at least 5,000° F. There are other similar ceramics that could be used. The primary material characteristics should be: the ability to withstand temperatures between 3000–5000° F.; strength; the ability to withstand thermal shock without cracking; little or no conductivity; and ease of forming into rigid, spherical shapes. Therefore, since such materials already exist, temperatures at the inner wall of the core up to 5000° F. could be designed for at this time.

The conducting layer 118 of the reactor core 101 will confine elementary particles in the fusion plasma that have a charge. Neutral particles such as neutrinos and neutrons, in all likelihood, will not be sufficiently contained by the electromagnetic shield. Thus, the non-conducting inner wall 179 must have some compound to stop neutrons. The element Boron has been found to be excellent at stopping neutrons and can be combined with the materials for the non-conducting inner wall 179 of a fusion reactor. It has been considered in many other fusion reactor designs just for this purpose.

In these reactor designs, different inner walls could be used to stop neutrons. For example, the fourth non-conducting layer 125 could be coated or impregnated with a layer of Boron, the second non-conducting layer 123 could be coated or impregnated with Boron or the inner layer of non-conducting material 122 could be coated or impregnated with Boron. Some ultra-high temperature ceramics contain Boron, thus eliminating the necessity of coating or impregnating the ceramics. If Boron is to be impregnated into one of the inner layers constructed of RCC, it might be best to create one inner layer of Boron RCC 123, and a second, thicker wall 124, just of RCC to reduce costs.

The fusion burn will also subject the non-conducting inner wall 179 to x-ray radiation. With the reactor designs described here that burn fuel pellets 136, hybrid inertial confinement designs, the inside of the reactor core 101 could be filled with approximately 0.5 torr of xenon gas. The purpose of this gas would be to absorb the X-ray radiation and re-radiate it over a longer time at longer wavelengths to help reduce the surface temperature and damage to the inner wall. If the density of the gas were greater, it would likely cause the inertial confinement lasers 103 to be blocked.

The primary goal of the conducting layer 118 is to create smooth, harmonic, massive spherical electromagnetic confinement fields 140. It is not intended to with withstand the forces of the internal fusion explosion. The conducting layer 118 would need reinforcement from the outside to withstand explosive mechanical forces from within. Another layer of material, external to the conducting layer 118, for purposes of reinforcement would be needed. In general it should be made of a non-conducting material or be essentially non-conducting. Another layer of RCC would be ideal for this. RCC is thermally conductive, allowing heat to flow out of the conducting layer 118 improving passive or active cooling.

The materials of these reactor core 101 designs must be able to withstand mechanical stresses to within 90–95% of their yield strength for continuous operation. For pulsed operation, the strength of the materials may be exceeded for brief periods. The calculations of forces for all layers of the reactor core 101 material should be taken into account. For example, if a copper alloy is used for the conductive layer 118, even though the extreme heat involved may melt this layer at some point later in the process, the initial ductility of the metal should be considered in the calculations that determine if the reactor core 101 can withstand the internal fusion explosion.

To summarize, an initial reactor core 101 could be designed as such:

1) An inner layer of non-conducting material 122 made up of an Ultra High Temperature Ceramic such as: hafnium diboride silicon carbide; or, Zirconium diboride composite; or, other related ceramic compounds. The exact thickness of this inner layer of non-conducting material 122 is unknown at this time due to the classified nature of these ceramics (they are now used to make nose-cones for missiles). The estimated required thickness is 1 inch. Preferably, the material will have a composition that includes some Boron to stop neutrons. (Most likely manufactured as two interlocking hemispheres.)
2) A second non-conducting layer 123 that is composed of material that can withstand high temperatures, thermal shock, compressive forces from without, explosive forces from within and can stop neutrons. A second non-conducting layer 123 could be a 1 inch wall composed of RCC impregnated with Boron. (Most likely manufactured as two interlocking hemispheres. Possibly manufactured as a single piece around the inner layer of non-conducting material 122.)
3) A third non-conducting layer 124 that is composed of material that can withstand high temperatures, thermal shock, compressive forces from without and explosive forces from within. A third non-conducting layer 124 could be composed of 1 inch of RCC. (Most likely manufactured as one piece around the inner layer of non-conducting material 122 and second non-conducting layer 123.)
4) A fourth non-conducting layer 125 that is composed of a material that can withstand massive thermal shocks and lessen the thermal shock to the conducting layer 118. The fourth non-conducting layer 125 could be composed of 5 inches of silica (99.8% amorphous fiber) made rigid by ceramic bonding. (Most likely manufactured as two interlocking hemispheres. Possibly manufactured as multiple interlocking tiles attached to the outside of the inner layer of non-conducing material 122, second non-conducting layer 123 and third non-conducting layer 124)
5) A conducting layer 118 that is composed of a material with very low resistance, is economical, that can be formed into spherical shells of the size needed, and can withstand the internal Coulombic and Hall forces created by massive electromagnetic fields. The conducting layer 118 could be composed of Cu—Nb, 6 inches thick. (Most likely manufactured as two interlocking hemispheres that are heat-shrunk to each other with the lap-joint situated at the eventual equator of the electromagnetic field.) A high current should be put through this conducting layer 118 in order to weld the joints together. The joint should be tested for gaps which could cause nonharmonic electromagnetic fields and failure.
6) A sixth non-conducting layer 126 that is composed of material that can withstand high temperatures, thermal shock and explosive forces from within. The sixth non-conducting layer 126 could be composed of 2 inches of RCC. (Most likely manufactured as two interlocking hemispheres.)
7) A seventh non-conducting layer 127 that is composed of material that can withstand high temperatures, thermal shock and explosive forces from within. The seventh non-conducting layer 127 could be composed of 2 inches of RCC. (Most likely manufactured as two interlocking hemispheres with the joint oriented 90° from the hemispheres in the sixth non-conducting layer 126.)

Total reactor wall thickness of approximately 18 inches, of which ⅓ is conductive.

Figure 70:
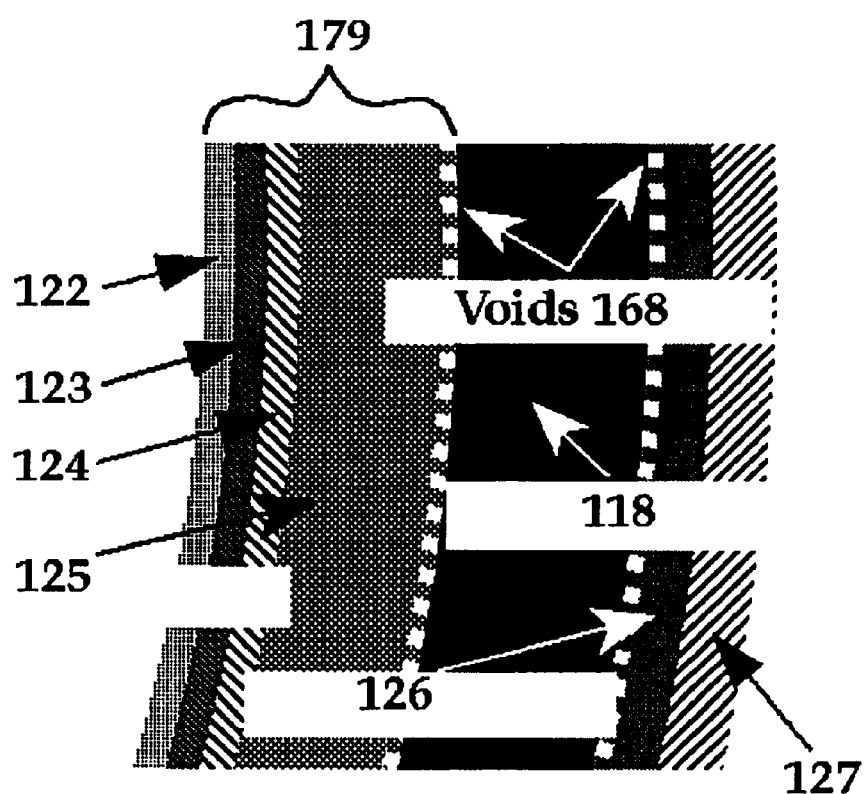
FIG. 70 is a cut-away cross-section view of a reactor core wall including void spaces.
Figure 71:
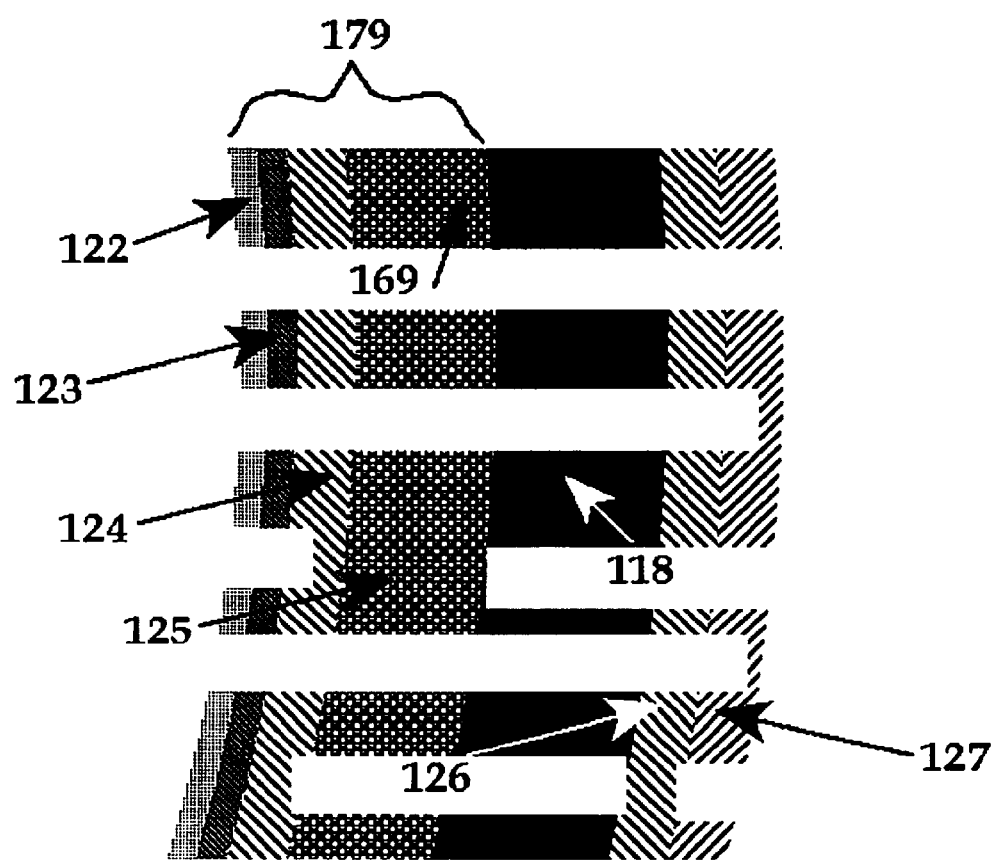
FIG. 71 is a cut-away cross-section view of a reactor core wall including a layer of shock dampening ceramic spheres.

To compensate for differences in thermal expansion, the inner and outer sides of individual layers may be designed with a grid of grooves, e.g., the outer side of the fourth non-conducting layer 125 and the inner side of the sixth non-conducting layer 126. Using a copper alloy, as in this example, the inner surface of the conducting layer 118 will thermally expand more than the external surface of the conducting layer 118. This is due to the greater temperatures experienced on the inside of the conducting layer 118 due to the fusion bum. The inside of the conducting layer 118 may even melt. To compensate for this volume change, the outside of the fourth non-conducting layer 125, Silica in this example, and the inner side of the sixth non-conducting layer 126, RCC in this example, could be composed of voids 168 created by a cross-hatched grid of grooves. In this example, as the conductive layer 118 expands, it would expand into the voids 168 created by these grids of grooves. These voids 168 are illustrated in FIG. 70.

The voids 168 would need to have a vacuum at the time of the fusion reaction. If they were filled with a gas, the gas would expand during heating of the reactor core 101 and potentially rupture the reactor core 101. Small channels through the inner layer of non-conducting material 122, second non-conducting layer 123 and third non-conducting layer 124 to the central reactor core 101 could be used to relieve such pressure. In most of these nuclear fusion reactors, the reactor core 101 will either be under a vacuum, or will be filled with a low pressure gas such as Xenon.

Periodic tests of the reactor cores 101 for melting will be required. If the conducting layer 118 melts into the voids 168 after a number of fusion burns, then the geometry required for harmonic containment fields will be lost. The melted reactor core 101 can be replaced with a new reactor core 101 and the used reactor core 101 can be refurbished.

Expansion of the fourth non-conducting layer 125 would be easy to plan for since it is primarily a thermal barrier and not key in preventing implosion or explosion of the reactor core 101. The fourth non-conducting layer 125 could be designed, if needed, with overlapping panels created with a tongue-and-groove type joint. The panels could simply slide together for a tighter fit to deal with thermal expansion.

It is not critical that the fourth non-conducting layer 125 be made of a solid material. It has been discovered that hollow ceramic spheres 169 that have a hole drilled in them are not only excellent thermal barriers, but also excellent sound barriers. It should be expected that the internal fusion explosion should create, not only a massive thermal shock, but also a significant sound shock. Such shocks repeatedly reverberating through the reactor core 101 could cause reactor core failure. Therefore, the fourth non-conducting layer 125 might simply start out as a hollow void that is filled with sound-deadening, thermally resistant, small, hollow ceramic spheres 169. Currently, these hollow ceramic spheres 169 are rated to a temperature of about 2,000° F. But with more expensive, Ultra High Temperature Ceramics, the hollow ceramic spheres 169 should be capable of withstanding temperatures of up to 5,000° F. while retaining their shock dampening characteristics. An example of this type of wall, with a thicker third non-conducting layer 124 might look like:

1) An inner layer of non-conducting material 122 made up of an Ultra High Temperature Ceramic such as: hafnium diboride silicon carbide; or, Zirconium diboride composite; or, other Ultra High Temperature Ceramic compounds. The exact thickness of the inner layer of non-conducting material 122 is unknown at this time due to the classified nature of these ceramics. The estimated thickness is 1 inch. Preferably, the material will have a composition that includes some Boron to help stop neutrons. The inner layer of non-conducting material 122 would most likely be manufactured as two interlocking hemispheres.

2) A second non-conducting layer 123 that is composed of material capable of withstanding high temperatures, thermal shock, compressive forces from without, explosive forces from within, and stopping neutrons. The second non-conducting layer 123 could be a 1-inch wall composed of RCC impregnated with Boron. The second non-conducting layer 123 would most likely be manufactured as two interlocking hemispheres. The second non-conducting layer 123 may be manufactured as a single piece around the inner layer of non-conducting material 122.

3) A third non-conducting layer 124 that is composed of material that can withstand high temperatures, thermal shock, compressive forces from without and explosive forces from within. The third non-conducting layer 124 could be comprised of 2 inches of RCC. The third non-conducting layer would most likely be manufactured as one piece around the inner layers of non-conducting material 122 and second non-conducting layer 123.

4) A fourth non-conducting layer 125 that is composed of a material that can withstand massive thermal and sound shocks while lessening the thermal shock to the conducting layer 118. The fourth non-conducting layer 125 could be comprised of 5 inches of hollow ceramic spheres 169 made up of high temperature or ultra high temperature ceramics. These would most likely be manufactured as small, $1/16$–$1/2$ inch, spheres with a small hole drilled or formed in them. The hollow ceramic spheres 169 would be poured into the space between the third non-conducting layer 123 and the conducting layer 118 through temporary openings in the conducting layer 118. The gaps between the hollow ceramic spheres 169 would be pumped to a vacuum or be allowed to fill with a slight pressure of Xenon gas as an added measure to absorb X-ray radiation.

5) A conducting layer 118 that is composed of a material with very low resistance, is economical, that can be formed into spherical shells of the size needed, and can withstand the internal Coulombic and Hall forces created by massive electromagnetic fields. The conducting layer 118 may be comprised of 6 inches of Cu—Nb. The conducting layer 118 would most likely be manufactured as two interlocking hemispheres that are heat-shrunk to each other with the lap joint situated at the eventual equator of the electromagnetic field. A high current should be put through this conducting layer 118 in order to weld the joints together. The joint should be tested for voids 168 which could cause nonharmonic electromagnetic fields and failure.

6) A sixth non-conducting layer 126 that is composed of material that can withstand high temperatures, thermal shock and explosive forces from within. The sixth non-conducting layer 126 may be comprised of 2 inches of RCC. The sixth non-conducting layer 126 would most likely be manufactured as two interlocking hemispheres.

7) A seventh non-conducting layer 127 that is composed of material that can withstand high temperatures, thermal shock and explosive forces from within. The seventh non-conducting layer 127 may be comprised of 2 inches of RCC. The seventh non-conducting layer 127 would most likely be manufactured as two interlocking hemispheres with the joint oriented 90° from the hemispheres in the sixth non-conducting layer 126.

Having the fourth non-conducting layer 125 filled with hollow ceramic spheres 169 may have advantages. But under the unusual circumstances being described here, there are no guidelines to be certain. Only experiment will discover if this method is superior to using a more traditional thermal barrier such as silica.

It is key that the conducting layer 118, a copper alloy in this case, be magnitudes more conductive than the non-conductive, or essentially non-conductive layers. It is believed this would exclude metals, plasmas 150 and conductive gases for materials in the inner conducting layer 122, second non-conducting layer 123, third non-conducting layer 124, fourth non-conducting layer 125, sixth non-conducting layer 126 and seventh non-conducting layer 127. However, the spherical electromagnetic confinement fields

140 may inhibit the burn so efficiently that only a thin non-conducting inner wall 179 may be required to protect the conducting layer 118.

If conductive materials were used for the non-conducting inner wall 179, then the main conducting layer 118 would induce dissipative, eddy-like currents in the other conductive layers, increasing Coulombic and Hall forces, increasing thermal loss, and decreasing efficiency. In addition, if the layers of the non-conducting inner wall 179 were made of conducting material, then it is possible that these layers might shield the fusion reaction from the Poynting Vector energy transport and the spherical electromagnetic confinement field 140. A solid internal conducting layer 118 for any of the layers of the non-conducting inner 179 might be the worst possible choice because it could reduce or eliminate the MHD effect altogether.

While materials for the layers of the non-conducting inner wall 179 should be chosen for their essential characteristics, non-conductivity, resistance to high temperatures and thermal shock, resistance to high energy particles and photons, ability to absorb neutrons, and high strength, they should also be tested ahead of time to the transport energy induced in the conducting layer 118. It is quite possible that the massive, central-pointing energy-transport, expressed in terms of the Poynting Vector, could shatter and implode the layers of the non-conducting inner wall 179. While the layers of the non-conducting inner wall 179 may be non-conductive, or essentially non-conductive, as in Boron impregnated silicas, carbides, ceramics or RCC structures, when compared to the conducting layer 118, the center pointing transport energy may interact at the elementary particle level, creating massive forces against charged elementary particles, such as electrons, and atomic nuclei within the inner layers. However, even if the induced central pointing energy creates forces at the elementary particle level, these non-conducting inner wall 179 materials may still be able to withstand the shocks without absorbing too much energy for these reasons:

1) The layers of the non-conducting inner wall 179 are directly next to the conducting layer 118.
2) The diameter of the reactor core 101 is large compared to the wall thickness.
3) The imploding energy per square inch at the inner wall will be small compared to at the focal point of the reactor core 101.
4) The materials are strong by their nature.
5) Also it is believed, the characteristic wavelength of the imploding energy will be large, roughly equal to the diameter of the conducting layer 118 of the reactor core 101. This long wavelength will take time to excite charged elementary particles within the non-conducting inner wall 179. By the time this happens, the exploding forces may be counteracting the imploding forces.

All reactor core 101 designs, except the "No-Core" core design, will face tremendous thermal, compressive, and explosive forces. It should be expected that early reactor core 101 designs may crack, melt, crush, shatter, be pierced by instabilities, and possibly catastrophically explode. The inner shield clamp 110, middle reactor shield 109 and outer shield wall 117 should be designed for these possibilities. Again, the overall reactor design should allow for the reactor cores 101 to be quickly and efficiently replaced.

Misc. Induction Coils Notes

There are two key issues to consider with respect to induction coils. First, how can massive electromagnetic pulses be induced in the circuit of conducting spheres 102? Second, how can excess electromagnetic energy be extracted from the circuit for use in the power grid?

The circuit could be directly connected to the power grid. See FIG. 59. However, this would not be practical since the massive pulses would easily burn out many components in power grids.

Instead, induction coils and capacitors should be used to act as an intermediary between the conducting circuit and the electrical power grid.

Figure 72:
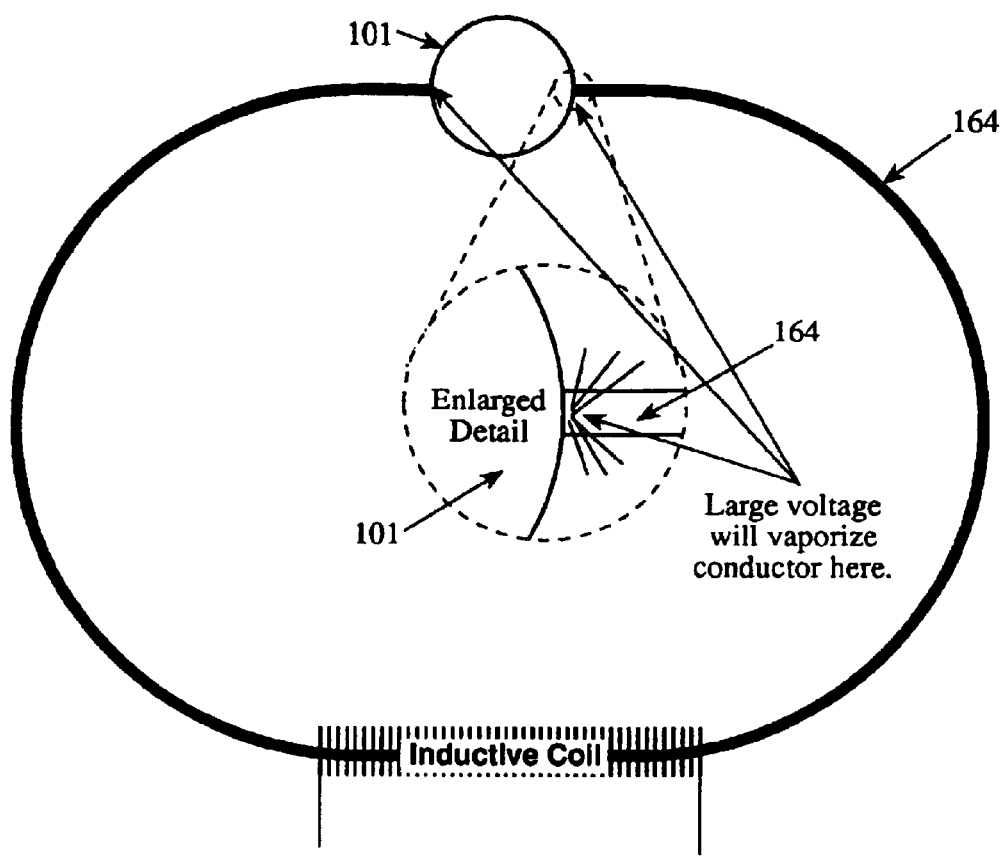
FIG. 72 is a top cut-away view of a solid wire-type conducting circuit.

There are hundreds if not thousands of possible combinations of arrangements for the coils in such reactors. Possible coil arrangements include:

1) If a solid "wire-type" conducting circuit as depicted in FIG. 72 is used, then one large coil could be wrapped around the circuit. For this type of circuit to work, the coil must induce an electromagnetic pulse through the conducting wire 164 with a wavelength much longer than the diameter of the conducting wire 164, otherwise nodes in the waves will vaporize the conducting wire 164 and explode it as explained in the section on the exploding wire phenomena.

However, even if it were possible to induce very long wavelength pulses using the inductive coil, the wavelength of the MHD effect in the reactor core 101 will be equal to diameter of the reactor core 101, and if powerful enough, will explode the conducting wire 164 at the anodes and cathodes as is shown in the enlarged detail of FIG. 72. It appears inevitable that too much energy will be focused on these small points to prevent the conducting wire 164 from exploding.

Figure 73:
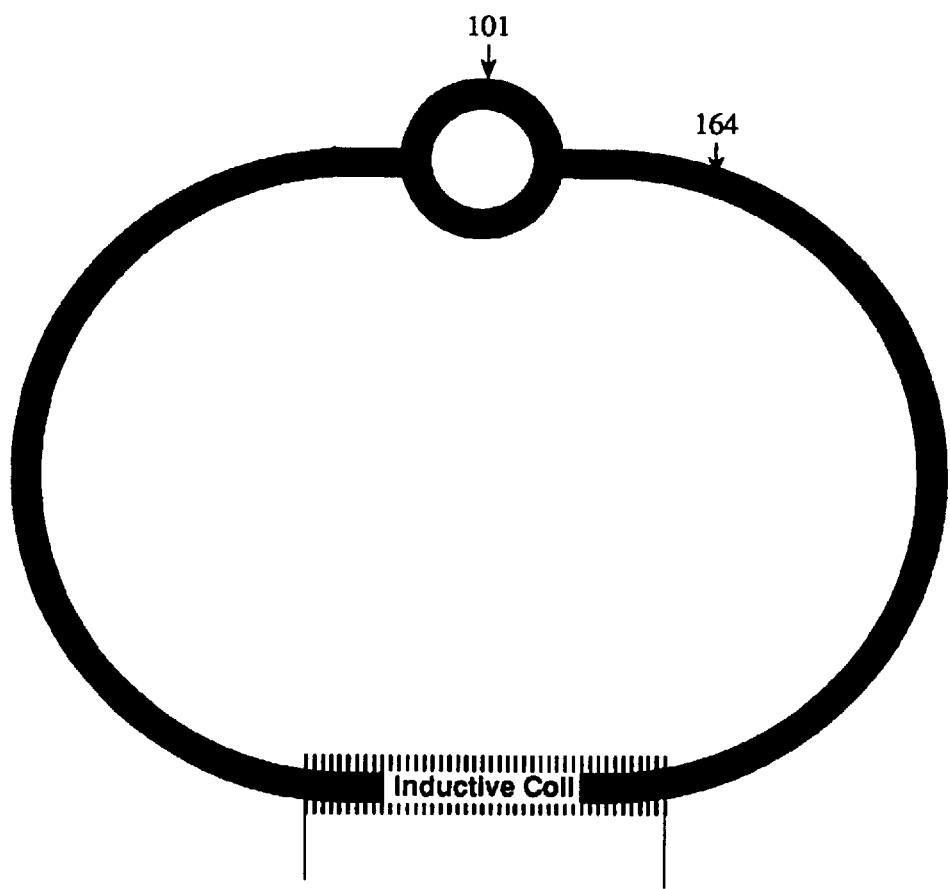
FIG. 73 is a top cut-away view of a solid wire-type conducting circuit with thicker wires.

2) A simple attempt at solving this problem might be to use a thicker conducting wire 164 as contained in FIG. 73. There are many problems with this approach. First, the massive energy will still be focused at the anodes and cathodes at the reactor core 101. Second, the larger the conducting wire 164, the less of a change in direction will occur at the reactor core 101 and the smaller will be the induced confining fields. Third, with thicker conducting wires 164, there will be more avenues for currents to "cut corners" and create eddy currents. There will be increased numbers of possible harmonic waves around the conducting wire 164 with corresponding increased numbers of nodes that will vaporize and explode the conducting wire 164.

3) One possible approach is to create a solid conductor 160 that is exactly as thick as the reactor core 101. However, there would be no induction of confinement fields. A fusion explosion in the reactor core 101 might be confined radially but not axially. It would explode in opposite directions, straight down the conductor in both directions. Besides, the reactor core 101 will still create waves of electromagnetic energy that will focus at nodes and explode the solid conductor 160.

Figure 74:
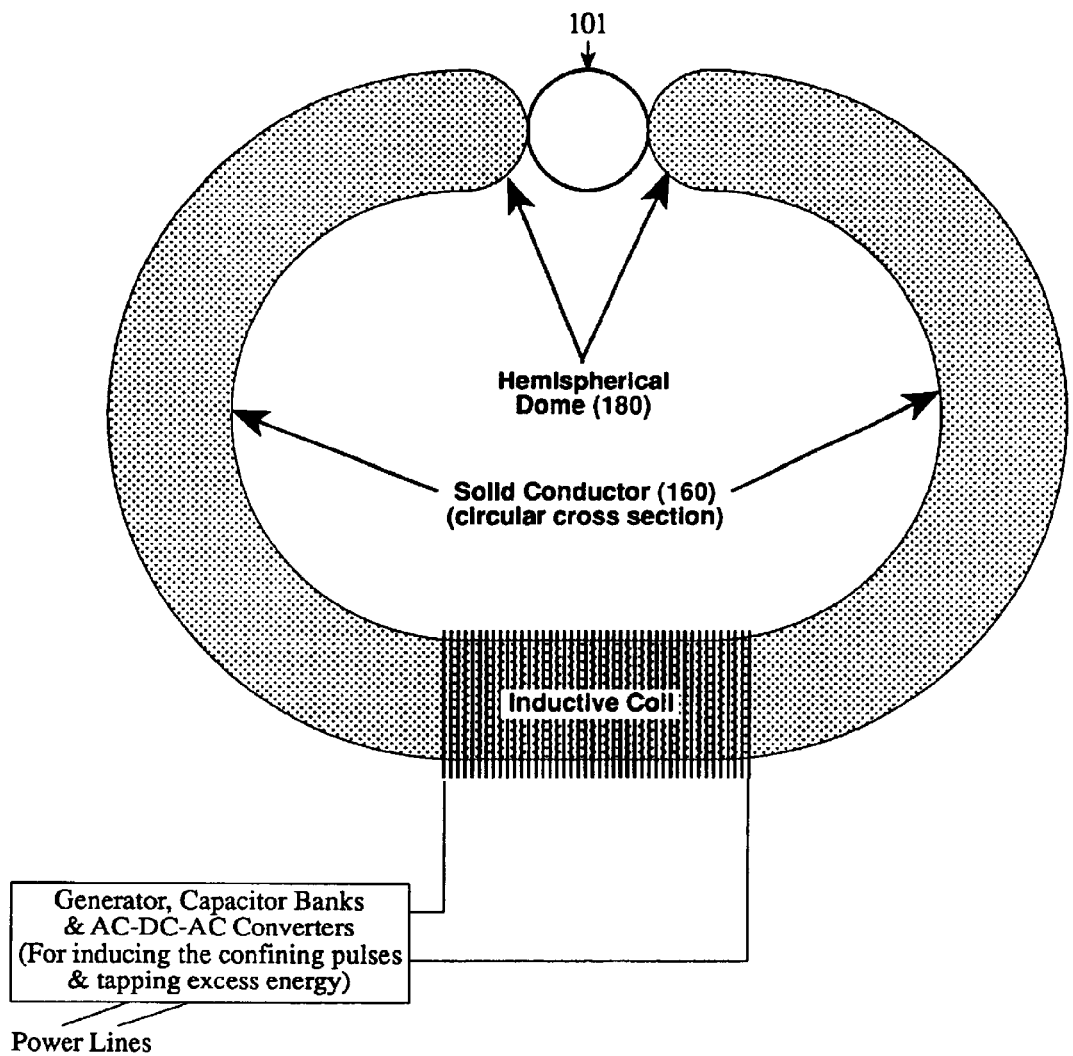
FIG. 74 is a top view of a solid wire-type conducting circuit where the wire diameter equals the thickness of the core wall.
Figure 75:
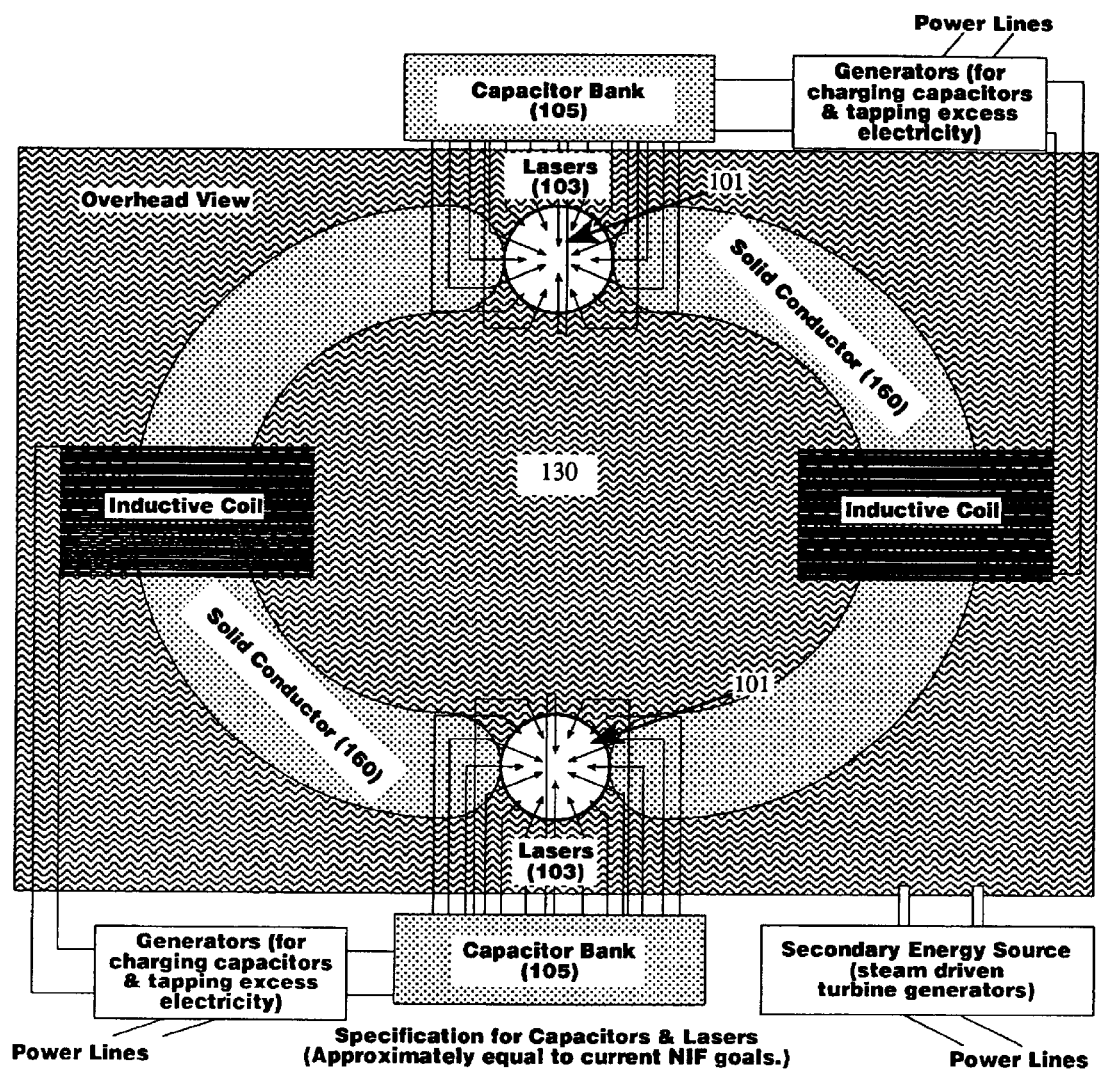
FIG. 75 is a top view of a two core solid wire-type conducting circuit where the wire diameter equals the thickness of the core wall.
Figure 76:
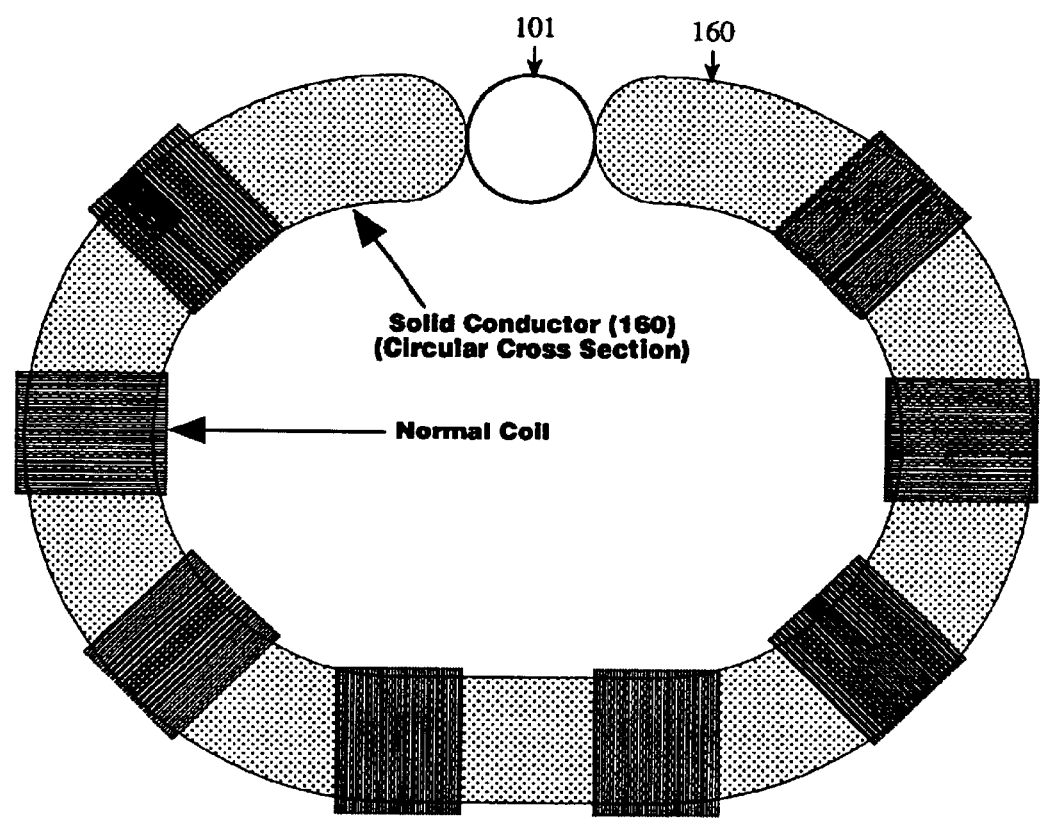
FIG. 76 is a top view of a solid wire-type conducting circuit where the wire diameter equals the thickness of the core wall and includes numerous coils.

4) To focus the energy, which would still allow the induction of the intense containment fields over the surface of the reactor core 101, the cathode and anode could be capped with a hemispherical dome 180 as shown in FIGS. 74, 75, and 76. This configuration could work if there was enough active cooling of the conductor/superconductor. However, the solid conductor 160 would be extremely massive and expensive. The overall length of the solid conductor 160 would need to be extremely precise, a multiple of the primary wavelength, to focus the energy. But when heated, the harmonics would be lost since the solid conductor 160 length would not be a multiple of the primary wavelength. Manufacturing the solid conductor 160 with the incorrect length would be very difficult to correct for. The exploding wire danger still exists at nodes of the primary electromagnetic wave. Finally, if damage did occur to either the solid conductor 160 or coil, in this design they would be extremely difficult to repair or replace. A two reactor core 101 version of this design is shown in FIG. 75.

5) As shown in FIG. 76, another possible arrangement would be to place numerous coils in series around the solid conductor 160 in an attempt to create electromagnetic pulses which have wavelengths equal to the diameter of the solid conductor 160 and reactor core 101, and then to try to actively cool the solid conductor 160 to prevent it from overheating and exploding. This technique does not appear feasible and would certainly be dangerous. The main advantage of this design is not its practicality but that it emphasizes the importance of analyzing the primary electromagnetic wave: its wavelength, its shape, the locations of nodes, the locations of eddy currents, the locations of intense temperatures, etc.

Figure 77:
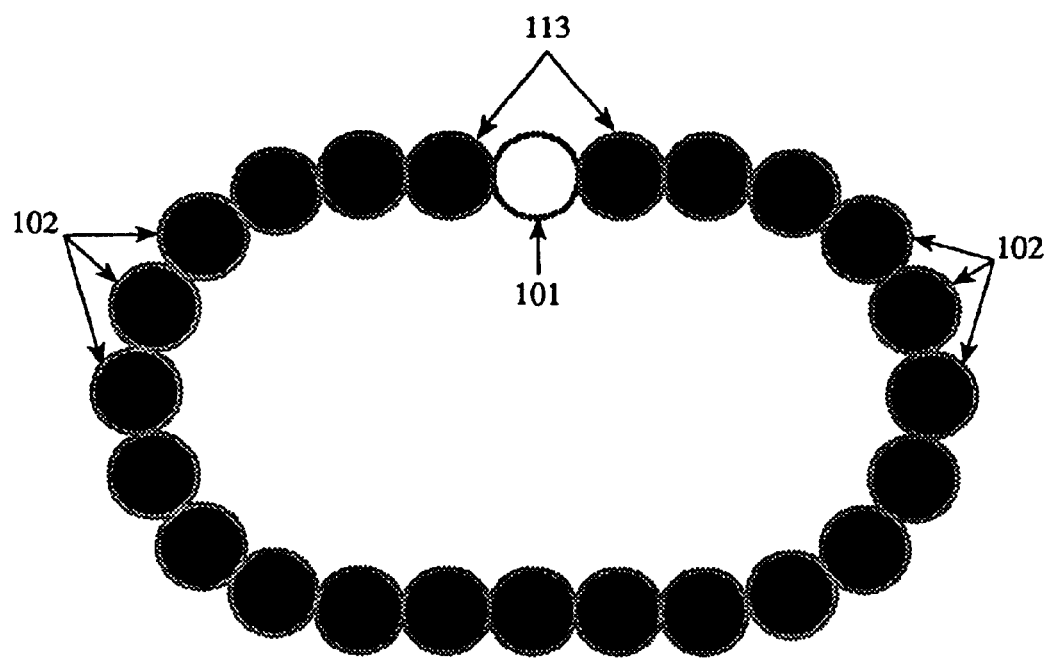
FIG. 77 is a top view of an oval pattern conducting circuit with conducting spheres.

6) This leads to the approach, as indicated earlier, of using conducting spheres 102 as shown in FIG. 77. With this approach, the emphasis is not on inducing a current around the circuit. Large-scale flow of electrons around the circuit is not really desired, rather, local, short-distanced but very fast flow of electrons is desired. The emphasis of this approach is creating massive standing, spherical waves of electromagnetic fields that result in a massive voltage across the containment sphere and massive containing fields, i.e., high voltage, high resistance, low current. (Or, massive magnetic differentials if the reactor is operating in the Magnetic Mode.)

7) Another possible concept contained in FIG. 18 for the electrical or magnetic conducting circuit would be to create an electrical or magnetic circuit using conducting spheres 102 as previously described, laid out in an oval conducting sphere track 104, and to place coils around one or both of the hemispheres of one or more of the conducting spheres 102. The coils will be used to induce the electromagnetic pulses and to tap excess energy. Using this overall concept, there are hundreds of possible wiring schemes where the coils are connected in series, in parallel, on separate circuits, or in combinations of these. This overall concept has many common advantages. They are in stark contrast to the disadvantages of the circuit described in 6 above. Advantages include:

The conducting spheres 102 would be relatively cheap and easy to manufacture.

It would not be a problem to lengthen or shorten the circuit.

New or old conducting spheres 102 could be added or removed.

While the harmonics of the heated circuit would change, it would change uniformly over the entire circuit because, by actively monitoring and equalizing coolant 130 temperatures, the expansion and contraction of the conducting spheres 102 could be controlled.

While localized eddy-currents from secondary currents still could melt or explode small areas of conducting spheres 102, the danger of the exploding wire phenomena would be minimized since the main electromagnetic wave would not explode huge sections of a conducting wire 164 or solid conductor 160.

Finally, the modular design would allow easy repair or replacement of conducting spheres 102 or coils.

With respect to the construction of the coil support material 166, the materials of construction may be chosen based upon the materials dielectric constant. For example, coil support material 166 in FIG. 14 may be chosen based upon its dielectric characteristics.

Wiring Pattern for Coils

How the coils are wired to each other around the conducting circuit is a key consideration. Each coil could be treated as a separate circuit. The coils could be wired in parallel, or in series. Or they could be wired in various combinations. No particular combination appears as the clear winner. Each example could work. However, it seems that the simplest circuit would have advantages for maintaining harmonic current flows and lower costs.

Figure 78:
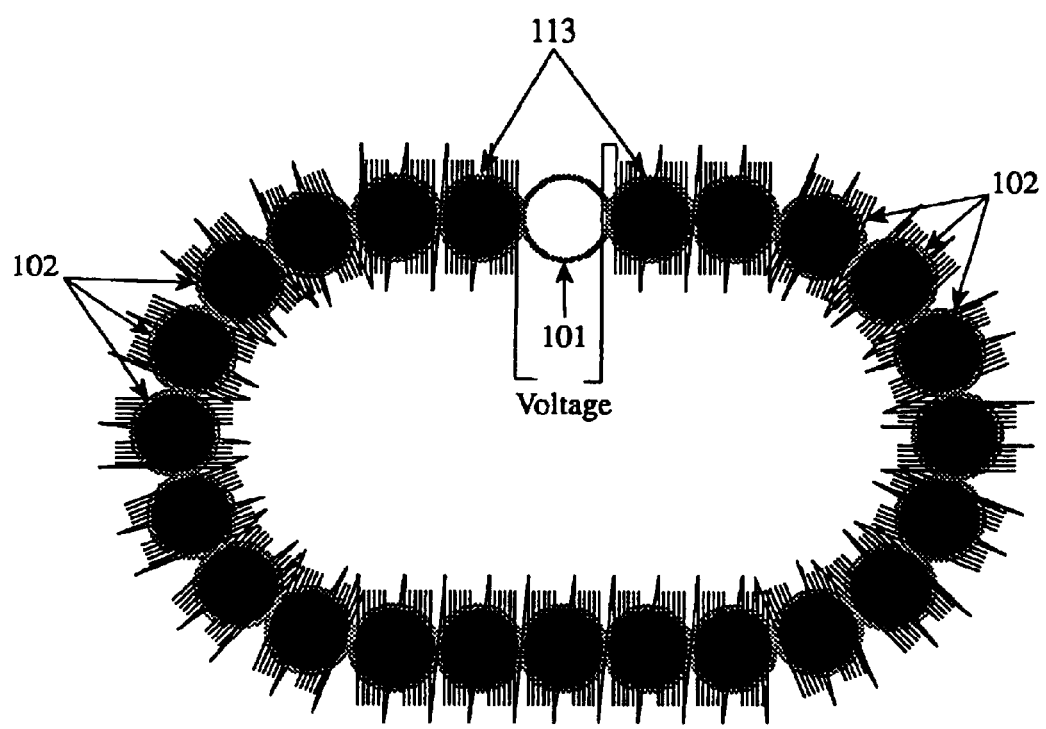
FIG. 78 is a top view of a reactor circuit with coils wired in series.
Figure 79:
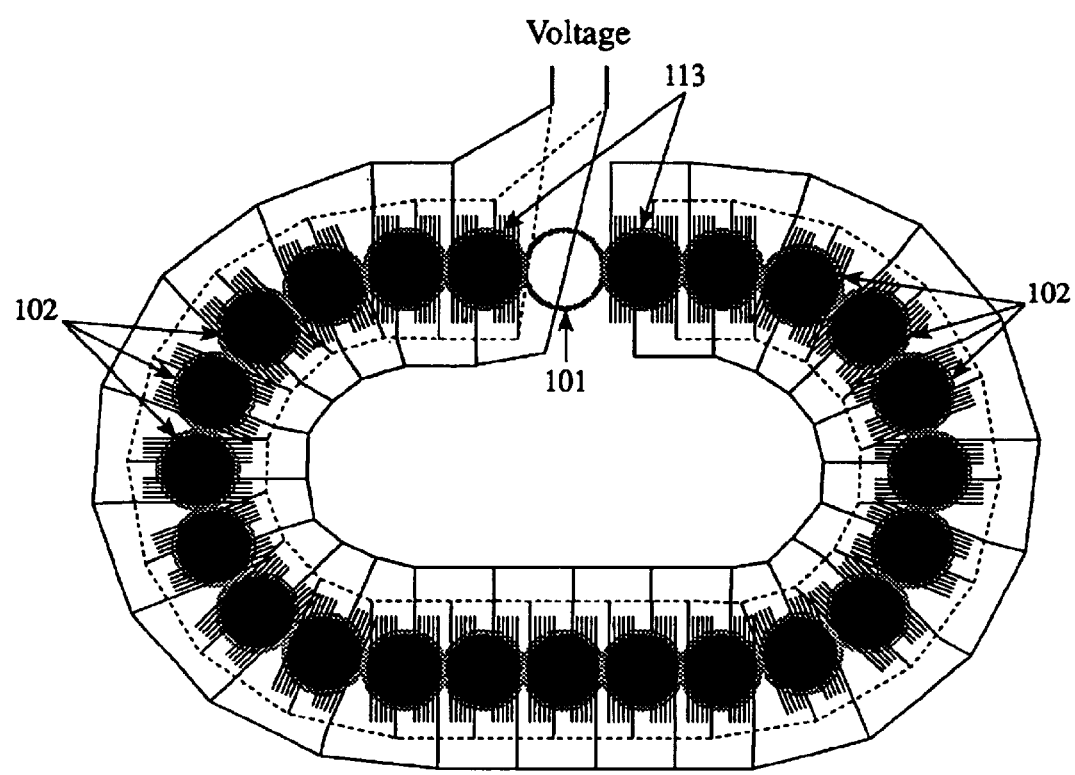
FIG. 79 is a top view of a reactor circuit with coils wired in parallel and series.
Figure 81:
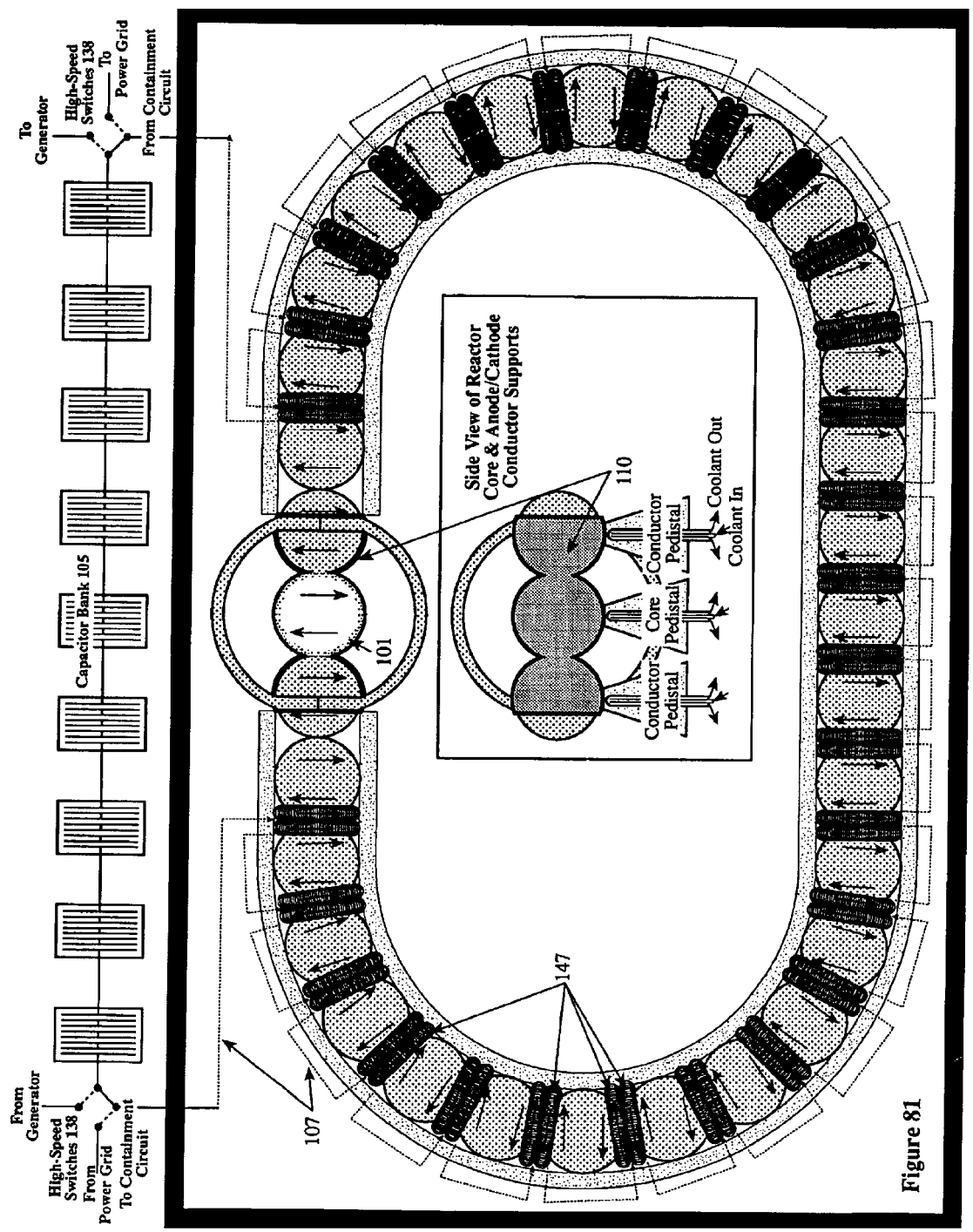
FIG. 81 is a top-view of an oval track, single core design with Rowland Ring coils.

FIG. 78 represents coils wired in series. FIG. 79 represents coils wired in parallel. One technique would be to use Rowland Ring coils 147 placed around an electrical circuit composed of conducting spheres 102, as previously described. A Rowland Ring coil 147 could be placed at one point along the electrical circuit, or multiple Rowland Ring coils 147 could be placed around one or both of the hemispheres of one or more of the conducting spheres 102. See FIG. 81. Again, there are hundreds of possible wiring schemes where the Rowland Ring coils 147 are connected in series, in parallel, on separate circuits, or in combinations of these. The Rowland Ring coils 147 may or may not have a soft iron core. Designs that have Rowland Ring coils 147 in series would be preferable to coils in parallel because their inductance will add thus creating a powerful voltage across the reactor core 101 that would be very difficult for the MHD effect to reverse direction.

Miscellaneous Insulation Notes

With respect to conducting spheres 102, they may need an outer layer of material to protect the conducting layer 118 from various problems. For example, the material in the conducting layer may be easily scratched or dented. It may deform from its own weight, especially when heated. Also, this layer of material could reduce or eliminate electrical arcing between the conducting spheres 102, coils, the conducting sphere track 104, coolant 130, or other components or objects in proximity to the conducting spheres 102. This layer, preferably, will not increase the distance between adjacent conducting spheres 102. It may be applied prior to the conducting spheres 102 being placed in the conducting sphere track 104 or after. This material may be chosen with respect to its dielectric constant as this may affect the electromagnetic interaction between reactor cores 101, coils, and conducting spheres 102. Alternately, a thicker insulating layer may be provided around each sphere 102 with a coupling arrangement between adjacent conducting spheres 102 to optimize the electromagnetic flow.

Power Source

Depending on the reactor dimensions and materials, and depending on the designed yield for the D-T plasma 150 or fuel pellet 136, there would be a characteristic electric voltage or magnetic differential required across the conducting sphere 102 just prior to the ignition of the fusion process. Obviously, an external power source is needed for providing power to the coils that provide the electromagnetic pulse that sweeps over the conducting layer 118 of the reactor core 101 in order to provide initial confinement and ignition, in the case of a purely inductive compressive technique, and the confining fields for the MHD effect. Also, in the case of using inertial techniques for initial ignition of a D-T fuel pellet 136, a power source would be needed for the lasers 103, or other beam devices.

Possible power sources could include:
1) Coal powered AC generators
2) Hydro powered AC generators
3) Nuclear fission powered AC generators
4) Coal powered DC generators
5) Hydro powered DC generators 6) Nuclear fission powered DC generators 7) Capacitor banks 105 charged by any of the above devices or: the commercial power grid; liquid fuel generators; solar panels; geothermal energy capture devices; or a variety of other energy sources.

For the purposes of describing this embodiment, a coal powered DC generator will be used.

Removing Power from the Conducting Circuit

Depending on the reactor dimensions and materials, and depending on the designed yield for the D-T plasma 150 or fuel pellet 136, there would be a characteristic voltage required across the conducting sphere 102 just prior to the ignition of the fusion process. Once the fusion process starts, the MHD process will induce a higher electric voltage or magnetic differential across the reactor core 101. All that is needed is the electrical circuitry to monitor this electric voltage or magnetic differential, and to use the excess to induce current in the coils and to move the current to the power grid.

One technique for tapping the correct amount of energy from the circuit might be to attach a set number of coils to the circuit and have about 60% of the coils maintaining the required containing voltage and about 40% of the coils tapping off excess voltage. One design would have:

2 reactor cores 101, it is a 2 cycle engine 30 conducting spheres 102, 15 per each half of an oval 48 total coils 32 coils for creating and maintaining the confining voltage, 16 per each half of the oval 16 coils for tapping off excess voltage, induced by the MHD effect from the fusion reaction.

Since 66% of the coils are for maintain voltage, and 33% of the coils are designed for tapping off excess voltage, the yield of the fusion burn should not exceed 29% of the total capacity of the circuit. This value of 29% would allow up to 2 of the tap coils to burn out and still be able to draw off the MHD energy.

This example gives insight on the best wiring techniques. What should happen if coils burn out? If one containment coil burns out, then the whole containment circuit should shut down. This would allow the fusion plasma 150 to expand, cool, and stop the fusion burn. However, if a tap coil burns out, then an opposite coil in the circuit should go down to keep a symmetric voltage. But to insure the ability of the circuit to keep drawing off excess MHD power, the tapping coils should not all be wired in series. If all of the tapping coils went down, the MHD fields might be powerful enough to flip the polarity of the entire conducting circuit, with the resulting danger of the rapid voltage flip-flop.

DC Versus AC

There are possible designs, using one or more reactor cores 101, that would, for these types of fusion reactors, create DC currents. In such cases, an AC inverter would be required. There are possible designs, using two or more reactor cores 101, that would create AC currents. In such cases, if the frequency is appropriate, the current could go directly to the power grid. If the frequency is not correct, then additional circuitry would be required for changing the frequency.

Major Nuclear Fusion Reactor Types

Figure 82:
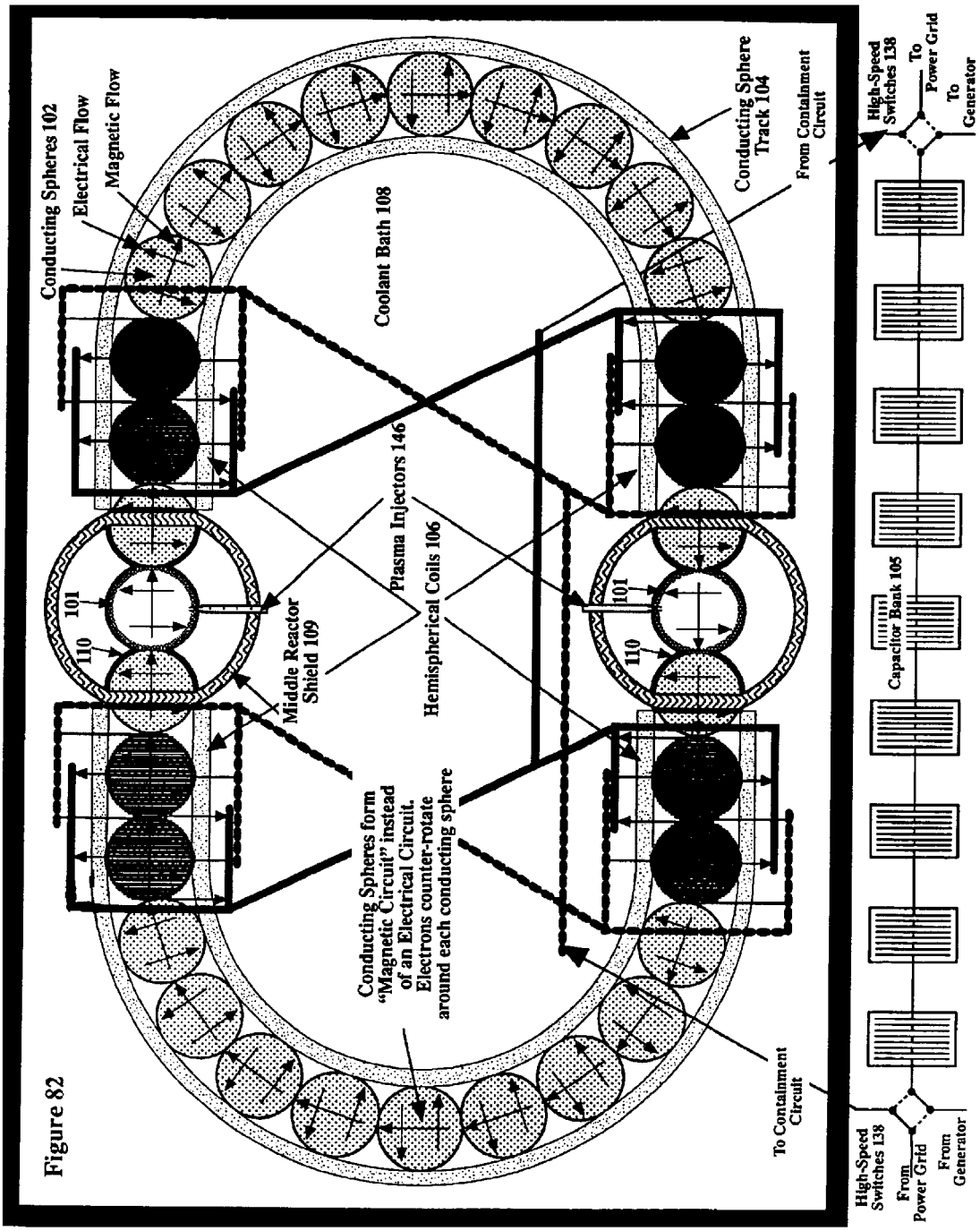
FIG. 82 is a top-view of an oval track with two cores.

The major types of nuclear fusion reactors in these designs all use a spherical electromagnetic confinement field 140 for the purposes of confining the fusion burn and for MHD conversion of energy. Most designs also use spherical conducting spheres 102 to create a harmonic pulse that sweeps over the reactor core 101 area. It has been mentioned that a design with a minimum of one core covered with two hemispheric coils with no conducting spheres is possible. Within these overall parameters, there are many possible nuclear reactor design variations possible, using various combinations of components available. Some of the variables in the reactor design include:

1) Fusion fuel: D-T, D—D, and D-He, and other elements
2) Fusion fuel type: plasma 150 or fuel pellet 136
3) Reactor core confinement field alignment: magnetic mode, electrical mode
4) Ignition technique: electromagnetic induction; laser 103 inertial; ion beam inertial, spherical wire implosion cage 151
5) Reactor confinement material: solid conductor 160, solid superconductor, plasma 150, liquid, gas, "No Core"
6) Various reactor core 101 wall material choices, or "No-Core" design
7) Confinement circuit shape: oval, circular, straight
8) Confinement coil type: normal cylindrical coil; normal concentric cylindrical coils; normal (single) helical coils; normal (multiple) parallel helical coils; Rowland Ring coils 147 with soft iron cores; Rowland Ring coils 147 without soft iron cores; individual hemispheric coils 106; grouped hemispheric coils 106 (cup-in-a-cup layout)
9) Conducting sphere 102 type: hollow center with a vacuum; solid filled
10) Conducting sphere 102 fill material
11) AC or DC output design
12) One, two, three, four, or more reactor cores 101
13) Burn length: pulsed, quasi-continuous, or continuous operation
14) Cooling technique: pulsed, quasi-continuous, or continuous operation Some Major Design Choices One Reactor Core 101, Plasma Fuel Designs:

1) One reactor core 101, ignition by induced compression, plasma 150 fuel (D—D, D-He, D-T), confinement by circuit using spherical conducting coils arranged in a circular or oval pattern, confinement fields induced by Rowland Ring coils 147 with a soft iron core, pulsed or quasi-continuous DC operation 2) One reactor core 101, ignition by induced compression, plasma 150 fuel (D—D, D-He, D-T), confinement by circuit using spherical conducting coils arranged in a circular or oval pattern, confinement fields induced by Rowland Ring coils 147 without a soft iron core, pulsed or quasi-continuous DC operation. See FIG. 81 as an example of this configuration 3) One reactor core 101, ignition by induced compression, plasma 150 fuel (D—D, D-He, D-T), confinement by circuit using spherical conducting coils arranged in a circular or oval pattern, confinement fields induced by traditional coils, pulsed or quasi-continuous DC operation 4) One reactor core 101, ignition by induced compression, plasma 150 fuel (D—D, D-He, D-T), confinement by circuit using spherical conducting coils arranged in a circular or oval pattern, confinement fields induced by hemispherical coils 106, pulsed, quasi-continuous, or continuous DC operation Two or More Reactor Core 101, Plasma Fuel Designs:

5) Two or more reactor cores 101, ignition by induced compression, plasma 150 fuel (D—D, D-He, D-T), confinement by circuit using spherical conducting coils arranged in a circular or oval pattern, confinement fields induced by Rowland Ring coils 147 with a soft iron core, pulsed or quasi-continuous AC operation 6) Two or more reactor cores 101, ignition by induced compression, plasma 150 fuel (D—D, D-He, D-T), confinement by circuit using spherical conducting coils arranged in a circular or oval pattern, confinement fields induced by Rowland Ring coils 147 without a soft iron core, pulsed or quasi-continuous AC operation 7) Two or more reactor cores 101, ignition by induced compression, plasma 150 fuel (D—D, D-He, D-T), confinement by circuit using spherical conducting coils arranged in a circular or oval pattern, confinement fields induced by traditional coils, pulsed or quasi-continuous AC operation 8) Two or more reactor cores 101, ignition by induced compression, plasma 150 fuel (D—D, D-He, D-T), confinement by circuit using spherical conducting coils arranged in a circular or oval pattern, confinement fields induced by hemispherical coils 106, pulsed or quasi-continuous AC operation. See FIG. 82 as an example of this configuration
One Core, Pellet Fuel Designs:

9) One reactor core 101, ignition by inertial beam technique, fuel pellet 136 (D—D, D-He, D-T), confinement by circuit using spherical conducting coils arranged in a circular or oval pattern, confinement fields induced by Rowland Ring coils 147 with a soft iron core, pulsed DC operation 10) One reactor core 101, ignition by inertial beam technique, fuel pellet 136 (D—D, D-He, D-T), confinement by circuit using spherical conducting coils arranged in a circular or oval pattern, confinement fields induced by Rowland Ring coils 147 without a soft iron core, pulsed DC operation 11) One reactor core 101, ignition by inertial beam technique, fuel pellet 136 (D—D, D-He, D-T), confinement by circuit using spherical conducting coils arranged in a circular or oval pattern, confinement fields induced by traditional coils, pulsed DC operation 12) One reactor core 101, ignition by inertial beam technique, fuel pellet (D—D, D-He, D-T), confinement by circuit using spherical conducting coils arranged in a circular or oval pattern, confinement fields induced by hemispherical coils 106, pulsed DC operation. See the preferred embodiment in FIG. 1 as an example of this configuration.
Two or More Cores, Pellet Fuel Designs:

13) Two or more reactor cores 101, ignition by inertial beam technique, fuel pellet 136 (D—D, D-He, D-T), confinement by circuit using spherical conducting coils arranged in a circular or oval pattern, confinement fields induced by Rowland Ring coils 147 with a soft iron core, pulsed AC operation 14) Two or more reactor cores 101, ignition by inertial beam technique, fuel pellet 136 (D—D, D-He, D-T), confinement by circuit using spherical conducting coils arranged in a circular or oval pattern, confinement fields induced by Rowland Ring coils 147 without a soft iron core, pulsed AC operation 15) Two or more reactor cores 101, ignition by inertial beam technique, fuel pellet 136 (D—D, D-He, D-T), confinement by circuit using spherical conducting coils arranged in a circular or oval pattern, confinement fields induced by traditional coils, pulsed AC operation 16) Two or more reactor cores 101, ignition by inertial beam technique, fuel pellet 136 (D—D, D-He, D-T), confinement by circuit using spherical conducting coils arranged in a circular or oval pattern, confinement fields induced by hemispherical coils 106, pulsed AC operation. See FIG. 83 as an example of this configuration.
One No-Core Core Plasma Fuel Designs in Electric Mode:

17) One No-Core core, plasma 150 fuel gradually added to chamber by injection, ignition by induced compression, continuous voltage provided by circuit using spherical conducting coils arranged in a circular or oval pattern, confinement field voltage provided by Rowland Ring coils 147 with soft iron core, continuous DC operation.

18) One No-Core core, plasma 150 fuel gradually added to chamber by injection, ignition by induced compression, continuous voltage provided by circuit using spherical conducting coils arranged in a circular or oval pattern, confinement field voltage provided by Rowland Ring coils 147 without soft iron core, continuous DC operation.

19) One No-Core core, plasma 150 fuel gradually added to chamber by injection, ignition by induced compression, continuous voltage provided by circuit using spherical conducting coils arranged in a circular or oval pattern, confinement field voltage provided by traditional coils, continuous DC operation.
One No-Core Core Plasma Fuel Designs in Magnetic Mode:

20) One No-Core core, plasma 150 fuel gradually added to chamber by injection, ignition by induced compression, continuous magnetic differential provided by circuit using spherical conducting coils arranged in a circular or oval pattern, confinement field voltage provided by traditional coils, continuous DC operation.

21) One No-Core core, plasma 150 fuel gradually added to chamber by injection, ignition by induced compression, continuous magnetic differential provided by circuit using spherical conducting coils arranged in a circular or oval pattern, confinement field voltage provided by hemispherical coils 106, continuous DC operation. See FIG. 80 as an example of this configuration.
Two No-Core Cores Plasma Fuel Designs in Magnetic Mode:

22) Two No-Core cores, plasma 150 fuel gradually added to chambers by injection, ignition by induced compression, continuous magnetic differential provided by circuit using spherical conducting coils arranged in a circular or oval pattern, confinement field voltage provided by traditional coils, continuous AC operation.

23) Two No-Core cores, plasma 150 fuel gradually added to chambers by injection, ignition by induced compression, continuous magnetic differential provided by circuit using spherical conducting coils arranged in a circular or oval pattern, confinement field voltage provided by hemispherical coils 106, continuous AC operation. See FIG. 68 as an example of this configuration.
One No-Core Core Plasma Fuel Straight-Line Designs:

24) One No-Core core, plasma 150 fuel gradually added to chamber by injection, ignition by induced compression, continuous magnetic differential provided by circuit using spherical conducting coils arranged in a straight-line pattern, confinement field voltage provided by traditional coils, continuous DC operation.

25) One No-Core core, plasma 150 fuel gradually added to chamber by injection, ignition by induced compression, continuous magnetic differential provided by circuit using spherical conducting coils arranged in a straight-line pattern, confinement field voltage provided by hemispherical coils 106, continuous DC operation.

It is believed the best design of the present invention is reactor design 12 using D-T fusion fuel pellets 136 and laser 103 inertial beams, as shown in the preferred embodiment in FIG. 1. The confinement circuit described here could potentially be added to the National Ignition Facility currently being built. Or, a similar facility, using the same type of laser inertial confinement could be built, but with the added confinement circuit. The benefits of this design are: the simplicity of one reactor core 101; the lower magnetic fields required due to inertial ignition techniques; and the smooth harmonics of the hemispherical coils 106.

In the mid-term, it is believed that design number 8 would be best. It has: 2 reactor cores 101; uses D—D plasma 150 fuel; uses hemispherical coils 106; and is optimized for 60 MHz pulsed (AC) operation. The benefits of this design are: efficient use of one reactor core's MHD fields for creating the other reactor core's confinement fields (like a two cylinder gasoline engine); quasi-continuous operation (i.e., requiring periodic replacement of reactor cores 101 and other components) using injected plasma 150; and optimization for 60 MHz AC power for direct commercial electrical grid utilization.

In the long range, it is believed that design number 23 using 2 reactor cores 101 based on the adjustable wavelength "No-Core" design in FIG. 68 may be the best design. This design has many advantages: the ability to operate almost nonstop since there are no reactor cores 101 to wear out; the magnetic circuit does not entail large-scale movements of electrons that could burn out conducting spheres 102; the hemispherical coils 106 should provide smooth confining fields; the conducting spheres 102 and hemispherical coils 106 could be continuously cooled; the use of pulse injected D—D plasma 150 fuel into the confining fields allows the central burning mini-stars to continuously burn; the mini-stars would pulse with opposite beats (i.e., as one star expands, inducing a MHD field, this induced MHD field will induce confining fields that compress the other star, then the cycle reverses); and the induced current that is tapped off will be AC. The diameter of anode/cathode conducting spheres are larger than the diameters of the "No-Core" reactor core, amplifying the power of the spherical electromagnetic field, containment field. And finally, the wavelength of the reactor core 101 area can be adjusted to take into account thermal heating and cooling. All that would be needed would be periodic replacement of conducting spheres 102; shield materials; miscellaneous electrical components, and cooling system components.

What is claimed:

1. A system for magnetically generating a spherical electromagnetic field comprising:
   a power supply operably attached to a coil;
   at least two conducting spheres arranged such that the conducting sphere centers reside on a common plane; and
   a core area in which ions are located, the core being located between the at least two conducting spheres such that a core center resides on the common plane,
   wherein the coil is wrapped around at least a portion of one of the conducting spheres such that when the power supply energizes the coil, the coil generates a spherical electromagnetic field surrounding the core area such that ions present within the core area interact in a magnetohydrodynamic fashion with the spherical electromagnetic field.

2. The system of claim 1, wherein the at least two conducting spheres are of a uniform size.

3. The system of claim 1, wherein the at least two conducting spheres comprise hollow copper spheres, each sphere being filled with a mixture of $SiO_2$ ceramic and sand.

4. The system of claim 1, wherein the at least two conducting spheres comprises sixteen conducting spheres wherein one of the sixteen conducting spheres functions as the core area.

5. The system of claim 4, wherein the 16 conducing spheres are retainably arranged in a non-conducting trough.

6. The system of claim 5, wherein the trough comprises:
   an oval arrangement with 5 conducting spheres along each of a pair of straight-line sections and 3 conducing spheres on each of a pair of curved sections;
   wherein the conducting sphere functioning as the core area is located in a middle position on one of the straight-line sections.

7. The system of claim 1, wherein the core area comprises a vacuum chamber.

8. The system of claim 7, wherein the vacuum chamber is fabricated of a borosilicate glass.

9. The system of claim 1, wherein the coil comprises a hemispheric coil.

10. The system of claim 1, wherein the power supply comprises a charged capacitor bank.

11. A system for electrically generating a spherical electromagnetic field comprising:
    at least one conducting sphere;
    a power supply operably connected to opposed poles of the conducting sphere by a pair of conductors such that a spherical electromagnetic field is generated over the conducing sphere when the power supply is energized; and
    ions located within the spherical electromagnetic field that interact in a magnetohydrodynamic manner with the spherical electromagnetic field.

12. The system of claim 11, comprising a plurality of conducting spheres arranged in a straight-line arrangement with adjacent conducting spheres in adjacent contact such that the conducting sphere centers reside on a common plane and wherein the pair of conductors are placed at opposing ends of the straight-line arrangement.

13. The system of claim 11, wherein the at least one conducting sphere comprises a hollow, copper sphere.

14. A system for magnetically generating a spherical electromagnetic field comprising:
    a power supply operably attached to a spherical coil, the spherical coil completely surrounding a spherical volume containing a plurality of ions such that energizing the coil causes a spherical electromagnetic field to form about the spherical volume such that the plurality of ions within the spherical volume interact in a magnetohydrodynamic manner with the spherical electromagnetic field.

15. The system of claim 14, wherein the power supply comprises a charged capacitor bank.

16. The system of claim 14, wherein the spherical volume comprises a hollow conducting sphere.

17. The system of claim 16, wherein the hollow conducting sphere is fabricated of copper or copper-alloy.

18. The system of claim 14, wherein the spherical volume comprises a vacuum chamber.

19. The system of claim 18, wherein the vacuum chamber is fabricated of a borosilicate glass.

* * * * *